US012603057B2

(12) United States Patent
No et al.

(10) Patent No.: US 12,603,057 B2
(45) Date of Patent: Apr. 14, 2026

(54) DISPLAY DEVICE

(71) Applicant: Samsung Display Co., Ltd., Yongin-Si (KR)

(72) Inventors: Sang Yong No, Yongin-si (KR); Dong Hee Shin, Yongin-si (KR); Sunkwun Son, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/633,435

(22) Filed: Apr. 11, 2024

(65) Prior Publication Data

US 2025/0014523 A1 Jan. 9, 2025

(30) Foreign Application Priority Data

Jul. 5, 2023 (KR) ........................ 10-2023-0087355

(51) Int. Cl.
*G09G 3/3266* (2016.01)

(52) U.S. Cl.
CPC ... *G09G 3/3266* (2013.01); *G09G 2310/0272* (2013.01); *G09G 2310/08* (2013.01); *G09G 2320/0233* (2013.01)

(58) Field of Classification Search
CPC ......... G09G 3/3266; G09G 2310/0272; G09G 2310/08; G09G 2320/0233; G09G 3/3677; G09G 3/32; G09G 3/3208; G09G 3/3225; G09G 3/3258; G09G 2320/02; G09G 3/3233; G09G 2310/0286; G09G 2310/06; H10K 59/131
See application file for complete search history.

(56) References Cited

U.S. PATENT DOCUMENTS

| | | | | |
|---|---|---|---|---|
| 8,686,990 | B2 | 4/2014 | Yamamoto | |
| 10,056,052 | B2 | 8/2018 | Shin et al. | |
| 11,211,013 | B2 | 12/2021 | Kim et al. | |
| 2012/0169687 | A1* | 7/2012 | Huang ................. | G09G 3/3677 345/94 |
| 2012/0293536 | A1* | 11/2012 | Yonemaru ............ | G09G 3/3648 345/589 |
| 2017/0103695 | A1* | 4/2017 | Nishimura ........... | G09G 3/2018 |
| 2022/0383821 | A1* | 12/2022 | No ....................... | G11C 19/184 |

FOREIGN PATENT DOCUMENTS

| | | | |
|---|---|---|---|
| KR | 10-1310004 | B1 | 9/2013 |
| KR | 10-1419225 | B1 | 7/2014 |
| KR | 10-2019-0080269 | A | 7/2019 |
| KR | 10-2261352 | B1 | 6/2021 |
| KR | 10-2021-0086295 | A | 7/2021 |
| KR | 10-2379778 | B1 | 3/2022 |

* cited by examiner

*Primary Examiner* — Chanh D Nguyen
*Assistant Examiner* — Gloryvid Figueroa-Gibson
(74) *Attorney, Agent, or Firm* — Innovation Counsel LLP

(57) ABSTRACT

Disclosed is a display device including a display panel including a plurality of pixels, a plurality of scan lines, and a scan driver. The plurality of pixels includes a first pixel, a second pixel, a third pixel, and a fourth pixel. The plurality of scan lines includes a first scan line, a second scan line, a third scan line, and a fourth scan line. The scan driver includes a plurality of stages that are respectively connected to the plurality of scan lines and outputs a plurality of scan signals. Active periods of scan signals of scan lines adjacent to each other among a plurality of scan lines do not overlap each other.

8 Claims, 29 Drawing Sheets

DISPLAY DEVICE

CROSS-REFERENCE TO RELATED APPLICATIONS

This application claims priority under 35 U.S.C. § 119 to Korean Patent Application No. 10-2023-0087355 filed on Jul. 5, 2023 in the Korean Intellectual Property Office, the disclosure of which is incorporated by reference herein in its entirety.

BACKGROUND

Embodiments of the present disclosure described herein relate to a display device having improved display quality.

Generally, electronic devices that provide images to users such as a smartphone, a digital camera, a notebook computer, a navigation system, and a smart television include a display device for displaying the images. The display device generates an image and provides the users with the generated image through a display screen.

The display device includes a display panel including a plurality of pixels for generating an image, a scan driver for applying scan signals to the pixels, a data driver for applying data voltages to the pixels, and a voltage generator for applying an operating voltage to the pixels. The pixels may receive the data voltages in response to the scan signals, and then may generate an image by using the data voltages and the operating voltage.

SUMMARY

Embodiments of the present disclosure provide a display device with improved display quality.

According to an embodiment, a display device includes a display panel including a plurality of pixels, a plurality of scan lines, and a scan driver. The plurality of pixels includes a first pixel, a second pixel, a third pixel, and a fourth pixel spaced apart from one another and arranged in a matrix configuration. The plurality of scan lines includes a first scan line including a first main line extending in the first direction, and a first branch line electrically connected to the first main line and the first pixel and extending in the second direction crossing the first direction, a second scan line including a second main line spaced from the first scan line in the second direction and extending in the first direction, and a second branch line electrically connected to the second main line and the second pixel and extending in the second direction, a third scan line including a third main line spaced from the second scan line in the second direction and extending in the first direction, and a third branch line electrically connected to the third main line and extending in the second direction, a fourth scan line including a fourth main line spaced from the third scan line in the second direction and extending in the first direction, and a fourth branch line electrically connected to the fourth main line and extending in the second direction. The scan driver includes a plurality of stages that are respectively connected to the plurality of scan lines and outputs a plurality of scan signals. The plurality of scan lines are arranged in the order of the first scan line, the second scan line, the third scan line, and the fourth scan line along the second direction. Scan lines that are positioned adjacent to each other among the plurality of scan lines receive signals of active period at mutually exclusive times.

The display device may further include a data line extending in the second direction. The data line may be electrically connected to the first pixel, the second pixel, the third pixel, and the fourth pixel.

The third branch line may be electrically connected to the fourth pixel, and the fourth branch line may be electrically connected to the third pixel.

The third branch line may be electrically connected to the third pixel, and the fourth branch line may be electrically connected to the fourth pixel.

Each of the plurality of scan signals may have a pulse width greater than 1 horizontal period. Odd-numbered stages among the plurality of stages may be defined as a first stage group. Even-numbered stages among the plurality of stages may be defined as a second stage group. The plurality of scan signals may include a plurality of first scan signals output from the first stage group, and a plurality of second scan signals output from the second stage group. The plurality of first scan signals and the plurality of second scan signals may be alternately output, respectively.

The scan driver may further include at least one dummy stage, and the at least one dummy stage may output a dummy scan signal to a next dummy stage or a stage.

A 1-1st scan signal having a first active period among the plurality of first scan signals may be applied to the first scan line. A 2-1st scan signal having a second active period among the plurality of second scan signals may be applied to the second scan line. A 1-2nd scan signal having a third active period among the plurality of first scan signals may be applied to the third scan line, and the first active period, the second active period, and the third active period are mutually exclusive time periods.

The plurality of scan signals may be output in an order of the 2-1st scan signal, the 1-1st scan signal, and the 1-2nd scan signal, and the at least one dummy stage may be connected to a first odd-numbered stage among the odd-numbered stages.

The plurality of scan signals may be output in an order of the 1-1st scan signal, the 1-2nd scan signal, and the 2-1st scan signal.

The at least one dummy stage may be connected to a first even-numbered stage among the even-numbered stages.

A 1-1st scan signal having a first active period among the plurality of first scan signals may be applied to the first scan line, a 2-1st scan signal having a second active period among the plurality of second scan signals may be applied to the second scan line, a 1-2nd scan signal having a third active period among the plurality of first scan signals may be applied to the third scan line, at least part of the first active period may overlap the third active period, and the second active period may not overlap the first active period and the third active period, and the at least one dummy stage may be connected to a first even-numbered stage among the even-numbered stages.

The first stage group may be defined as a 1-1st stage group including a part of the odd-numbered stages and a 1-2nd stage group including the others of the odd-numbered stages. The plurality of first scan signals may include a plurality of first sub-scan signals output from the 1-1st stage group and a plurality of second sub-scan signals output from the 1-2nd stage group.

A 1-1st scan signal having a first active period among the plurality of first sub-scan signals may be applied to the first scan line, a 2-1st scan signal having a second active period among the plurality of second scan signals may be applied to the second scan line, a 1-2nd scan signal having a third active period among the plurality of second sub-scan signals may be applied to the third scan line, and the first active period, the second active period, and the third active period may not overlap one another.

The plurality of scan signals may be output in an order of the 1-1st scan signal, the 2-1st scan signal, and the 1-2nd scan signal.

One scan signal of the plurality of scan signals may be provided to one scan line of the plurality of scan lines, and a next scan signal, which is output immediately after the one scan signal from among the plurality of scan signals may be provided to another scan line that is spaced apart from the one scan line with at least one intervening scan line among the other scan lines of the plurality of scan lines interposed between the another scan line and the one scan line.

The plurality of pixels may further include a fifth pixel spaced from the third pixel in the second direction, and a sixth pixel spaced from the fifth pixel in the first direction, an order in which the first pixel, the second pixel, the third pixel, the fourth pixel, the fifth pixel, and the sixth pixel are driven may be defined as a plurality of patterns, and the scan driver may drive the plurality of pixels by using each of the plurality of patterns as one cycle.

One of the plurality of patterns may be driven in an order of the third pixel, the sixth pixel, the second pixel, the fifth pixel, the fourth pixel, and the first pixel.

Another one of the plurality of patterns may be driven in an order of the sixth pixel, the second pixel, the fourth pixel, the first pixel, the fifth pixel, and the third pixel.

According to an embodiment, a display device includes a display panel including a plurality of pixels, a plurality of scan lines, and a scan driver. The plurality of pixels includes a first pixel, a second pixel, a third pixel, and a fourth pixel spaced apart from one another and arranged in a matrix configuration. The plurality of scan lines includes a first scan line including a first main line extending in the first direction, and a first branch line electrically connected to the first main line and the first pixel and extending in the second direction, a second scan line including a second main line spaced from the first scan line in the second direction and extending in the first direction, and a second branch line electrically connected to the second main line and the second pixel and extending in the second direction, a third scan line including a third main line spaced from the second scan line in the second direction and extending in the first direction, and a third branch line electrically connected to the third main line and extending in the second direction, a fourth scan line including a fourth main line spaced from the third scan line in the second direction and extending in the first direction, and a fourth branch line electrically connected to the fourth main line and extending in the second direction. The scan driver outputs a first scan signal and a second scan signal that is output continuously after the first scan signal. At least one scan line is placed between a scan line where the second scan signal is provided and a scan line where the first scan signal is provided.

The display device may further include a data line extending in the second direction. The data line may be electrically connected to the first pixel, the second pixel, the third pixel, and the fourth pixel.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
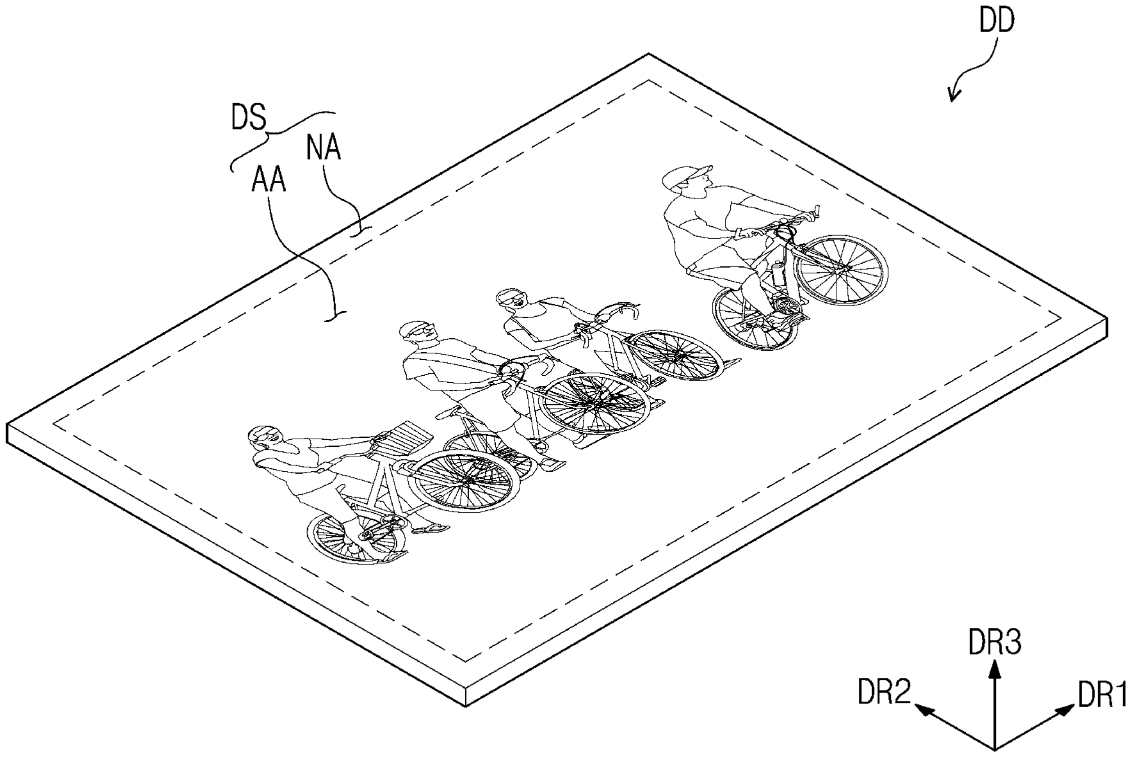
FIG. 1 is a perspective view of a display device, according to an embodiment of the present disclosure.

In the specification, a first component (or region, layer, part, portion, etc.) being "on", "connected with", or "coupled with" a second component refers to both the case where the first component is directly on, connected with, or coupled with the second component and the case where a third component is interposed therebetween.

The same reference numerals refer to the same components. In the drawings, the thickness, ratio, and dimension of components are exaggerated for clarity of description of technical contents. The expression "and/or" includes one or more combinations which associated components are capable of defining.

Although the terms "first," "second," etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms are relative and are described with reference to a direction indicated in the drawing.

It will be understood that the terms "include", "comprise", "have", etc. specify the presence of features, numbers, steps, operations, elements, or components described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal manner unless explicitly defined herein.

Hereinafter, embodiments of the present disclosure will be described with reference to accompanying drawings.

FIG. 1 is a perspective view of a display device, according to an embodiment of the present disclosure.

Referring to FIG. 1, a display device DD may have a plane defined by a first direction DR1 and a second direction DR2. The display device DD may have a rectangular shape with long sides extending in the first direction DR1 and short sides extending in the second direction DR2. However, this is an example, and a shape of the display device DD according to an embodiment of the present disclosure is not limited thereto. For example, the display device DD may have various shapes such as a circle or a polygon.

An upper surface of the display device DD may herein be referred to as a "display surface" DS. The display surface DS may have a plane defined by the first direction DR1 and the second direction DR2. An image generated by the display device DD may be provided to a user through the display surface DS.

The display surface DS may include an active area AA and a peripheral area NA adjacent to the active area AA.

The active area AA may display an image. The direction that is orthogonal to the display surface DS (i.e., the thickness direction of a display panel DP) may be defined as a third direction DR3. A front surface (or an upper surface) and a back surface (or a lower surface) of each member may be identified by the third direction DR3. "In plan view" may mean "when viewed in the third direction DR3".

The peripheral area NA may not display an image. The peripheral area NA may surround the active area AA and may define a border of the display device DD printed in a predetermined color. However, an embodiment is not limited thereto. For example, a shape of the active area AA and a shape of the peripheral area NA may be designed to be relative to each other. In an embodiment of the present disclosure, the peripheral area NA may be omitted.

The display device DD may be used for a large electronic device such as a television, a monitor, or an outer billboard. Moreover, the display device DD may be used for small and medium electronic devices such as a personal computer, a notebook computer, a personal digital terminal, an automotive navigation system, a game console, a smartphone, a tablet, or a camera. However, the above examples are provided only as an embodiment, and it is obvious that the display device DD may be applied to any other electronic device(s) without departing from the concept of the present disclosure.

Figure 2:
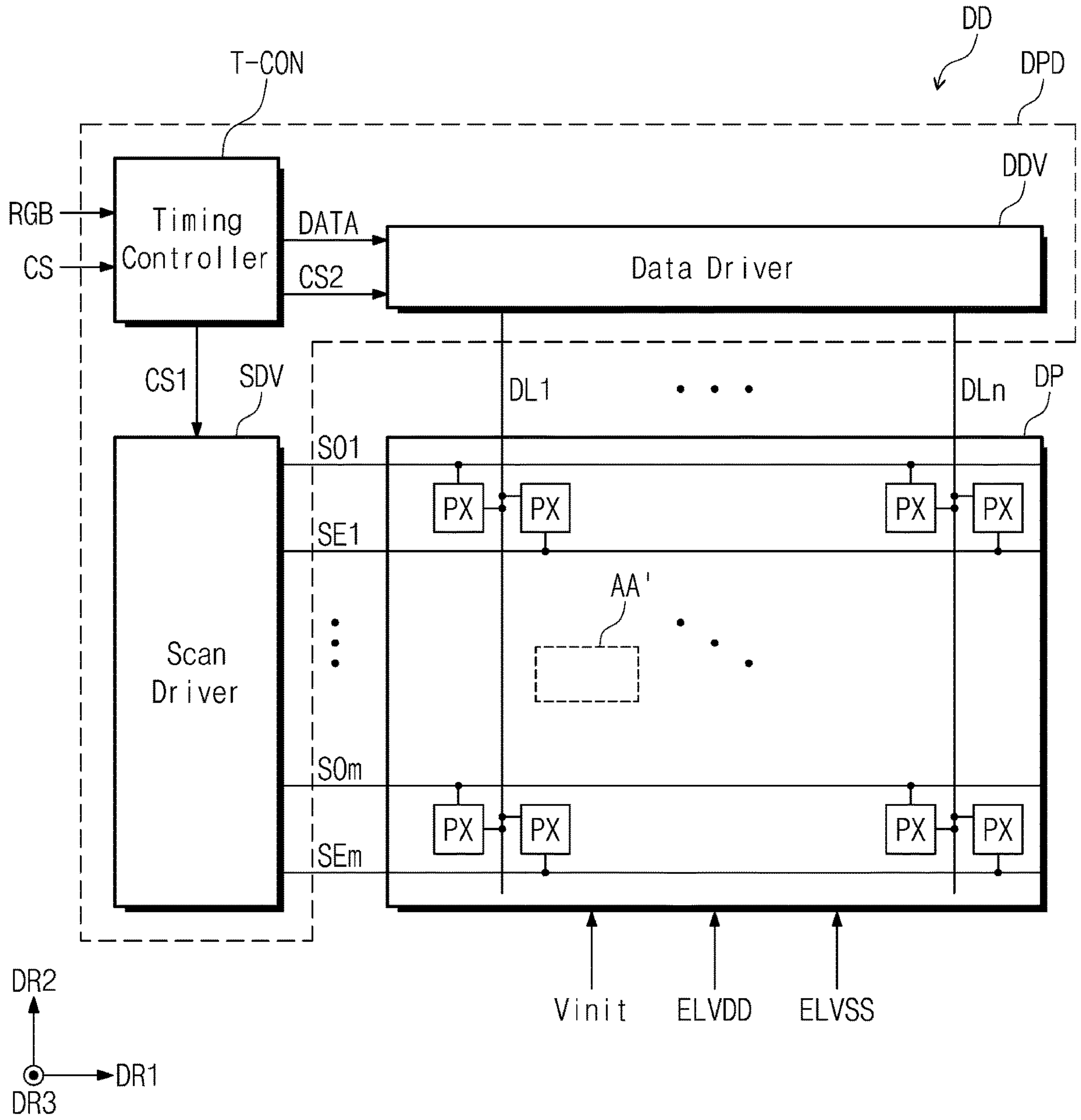
FIG. 2 is a block diagram of a display device, according to an embodiment of the present disclosure.

FIG. 2 is a block diagram of a display device, according to an embodiment of the present disclosure.

Referring to FIG. 2, the display device DD may include the display panel DP and a display panel driving circuit DPD. The display panel driving circuit DPD may include a scan driver SDV, a data driver DDV, and a timing controller T-CON. The display panel DP may include a plurality of pixels PX, a plurality of scan lines SO1 to SOm and SE1 to SEm, and a plurality of data lines DL1 to DLn. Each of 'm' and 'n' is a natural number.

The display panel DP according to an embodiment of the present disclosure may be a light emitting display panel, but is not particularly limited thereto. For example, the display panel DP may be an organic light emitting display panel, an inorganic light emitting display panel, a micro-LED display panel, or a nano-LED display panel. A light emitting element of the organic light emitting display panel may include an organic light emitting material. A light emitting element of the inorganic light emitting display panel may include a quantum dot, a quantum rod, or the like. The light emitting element of the micro-LED display panel may include a micro-LED. The light emitting element of the nano-LED display panel may include a nano-LED.

The plurality of scan lines SO1 to SOm and SE1 to SEm may be connected to the plurality of pixels PX and the scan driver SDV. Each of the plurality of scan lines SO1 to SOm and SE1 to SEm may extend in the first direction DR1.

The plurality of scan lines SO1 to SOm and SE1 to SEm may include the plurality of odd-numbered scan lines SO1 to SOm and the plurality of even-numbered scan lines SE1 to SEm. Each of the plurality of odd-numbered scan lines SO1 to SOm may be a scan line arranged in odd-numbered scan lines among a plurality of scan lines. Each of the plurality of even-numbered scan lines SE1 to SEm may be a scan line arranged in even-numbered scan lines among a plurality of scan lines. The plurality of odd-numbered scan lines SO1 to SOm and the plurality of even-numbered scan lines SE1 to SEm may be alternately spaced from each other in the second direction DR2. Each of the plurality of odd-numbered scan lines SO1 to SOm may be connected to odd-numbered pixels of each of a plurality of pixel rows arranged in the first direction DR1. Each of the plurality of even-numbered scan lines SE1 to SEm may be connected to even-numbered pixels of each of a plurality of pixel rows arranged in the first direction DR1.

The plurality of data lines DL1 to DLn may be connected to the two adjacent pixels PX and a data driver DDV. Each of the plurality of data lines DL1 to DLn may extend in the second direction DR2. The plurality of data lines DL1 to DLn may be spaced from each other in the first direction DR1.

A first power supply ELVDD, a second power supply ELVSS, and an initialization voltage Vinit may be applied to the display panel DP. The second power supply ELVSS may have a lower level than the first power supply ELVDD. The first power supply ELVDD, the second power supply ELVSS, and the initialization voltage Vinit may be applied to the plurality of pixels PX.

The timing controller T-CON may receive image signals RGB and a control signal CS from the outside (e.g., a system board). The timing controller T-CON may generate pieces of image data DATA by converting data formats of the image signals RGB so as to be suitable for an interface specification with the data driver DDV. The timing controller T-CON may provide the data driver DDV with the pieces of image data DATA, of which data formats are converted.

The timing controller T-CON may generate and output a first control signal CS1 and a second control signal CS2 in response to the control signal CS provided from the outside. The first control signal CS1 may be defined as a scan control signal. The second control signal CS2 may be defined as a data control signal. The first control signal CS1 may be provided to the scan driver SDV. The second control signal CS2 may be provided to the data driver DDV.

The scan driver SDV may generate a plurality of scan signals in response to the first control signal CS1. The plurality of scan signals may be applied to the plurality of pixels PX through the plurality of scan lines SO1 to SOm and SE1 to SEm.

The data driver DDV may generate a plurality of data voltages corresponding to the pieces of image data DATA in response to the second control signal CS2. The plurality of data voltages may be applied to the plurality of pixels PX through the data lines DL1 to DLn.

The plurality of pixels PX may receive the plurality of data voltages in response to the plurality of scan signals. The plurality of pixels PX may display images by emitting light of luminance corresponding to the plurality of data voltages.

Figure 3:
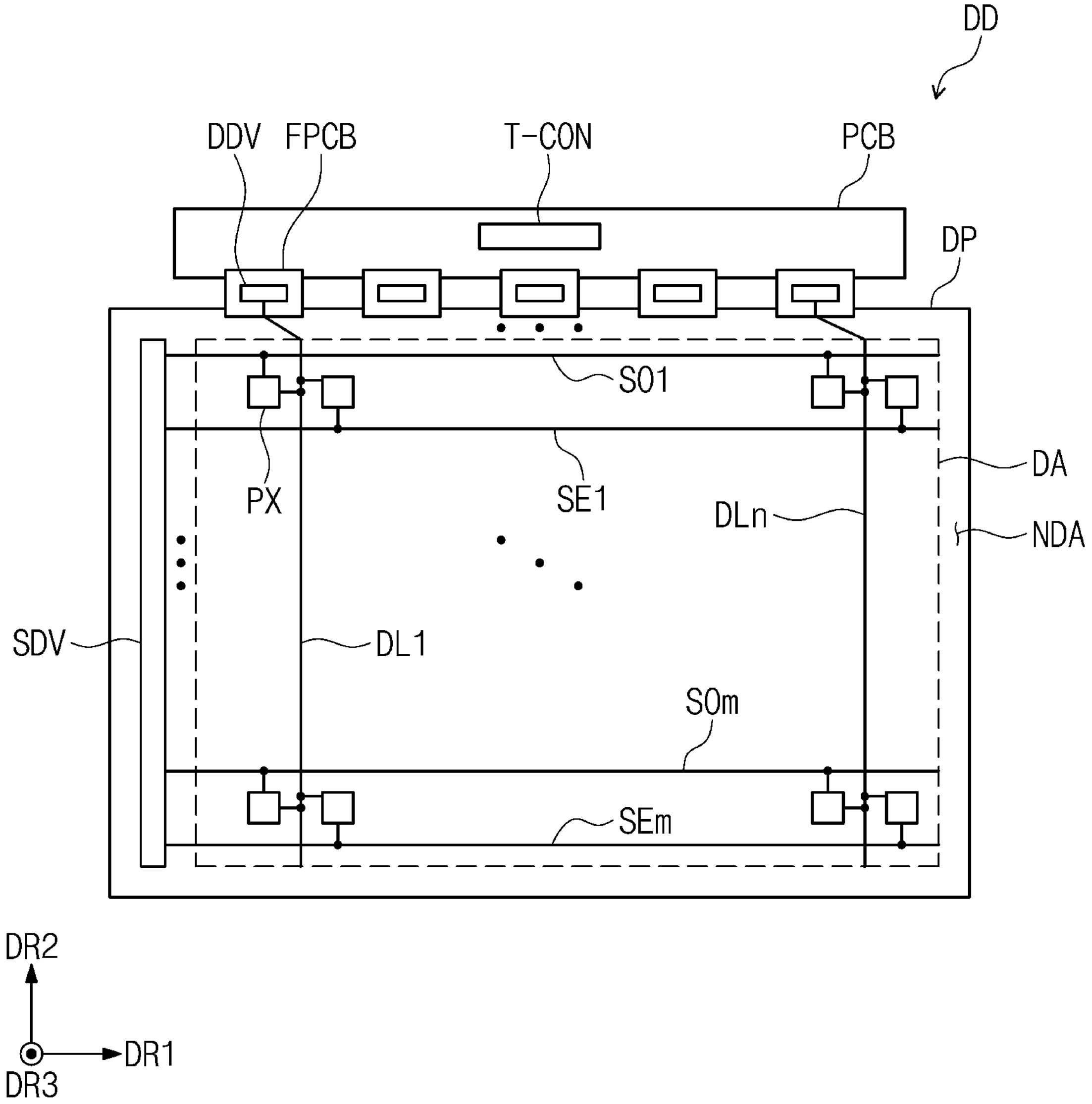
FIG. 3 is a plan view of a display device, according to an embodiment of the present disclosure.

FIG. 3 is a plan view of a display device, according to an embodiment of the present disclosure. In the description of FIG. 3, the same reference numerals are assigned to the same components described with reference to FIG. 2, and thus the descriptions thereof are omitted to avoid redundancy.

Referring to FIG. 3, the display device DD may include the display panel DP, the scan driver SDV, the data driver DDV, a plurality of flexible printed circuit boards FPCB, the timing controller T-CON, and a printed circuit board PCB.

A display area DA and a non-display area NDA surrounding the display area DA may be defined in the display panel DP. The display panel DP may have a rectangular shape having long sides extending in the first direction DR1 and short sides extending in the second direction DR2. However, the shape of the display panel DP is not limited thereto.

The pixels PX may be positioned in the display area DA. The scan driver SDV may be positioned in the non-display area NDA adjacent to one of the short sides of the display panel DP. The plurality of data drivers DDV may be provided. The data drivers DDV may be positioned adjacent to an upper side of the display panel DP, which is one of the long sides of the display panel DP as depicted in FIG. 2.

The printed circuit board PCB may be positioned adjacent to the upper side of the display panel DP. The printed circuit board PCB may be connected to the display panel DP through the flexible printed circuit boards FPCB. The flexible printed circuit board FPCB may be connected between the upper side of the display panel DP and the printed circuit board PCB. The plurality of data drivers DDV may be respectively mounted on the flexible printed circuit boards FPCB. Each of the plurality of data drivers DDV may include a readout chip. The readout chip may be manufactured and provided in a form of an integrated circuit chip. The readout chip may simultaneously perform a function of outputting data voltage to the display panel DP and a function of receiving a sensing signal from the display panel DP.

The plurality of data lines DL1 to DLn may extend from the display panel DP to the flexible printed circuit board FPCB and be connected to the plurality of data drivers DDV by the flexible printed circuit board FPCB. For example, the two data lines DL1 and DLn respectively positioned on the leftmost and rightmost sides and connected to the data drivers DDV are shown. However, a plurality of data lines may be connected to each of the data drivers DDV.

The timing controller T-CON may be manufactured in a form of an integrated circuit chip and mounted on the printed circuit board PCB.

Figure 4A:
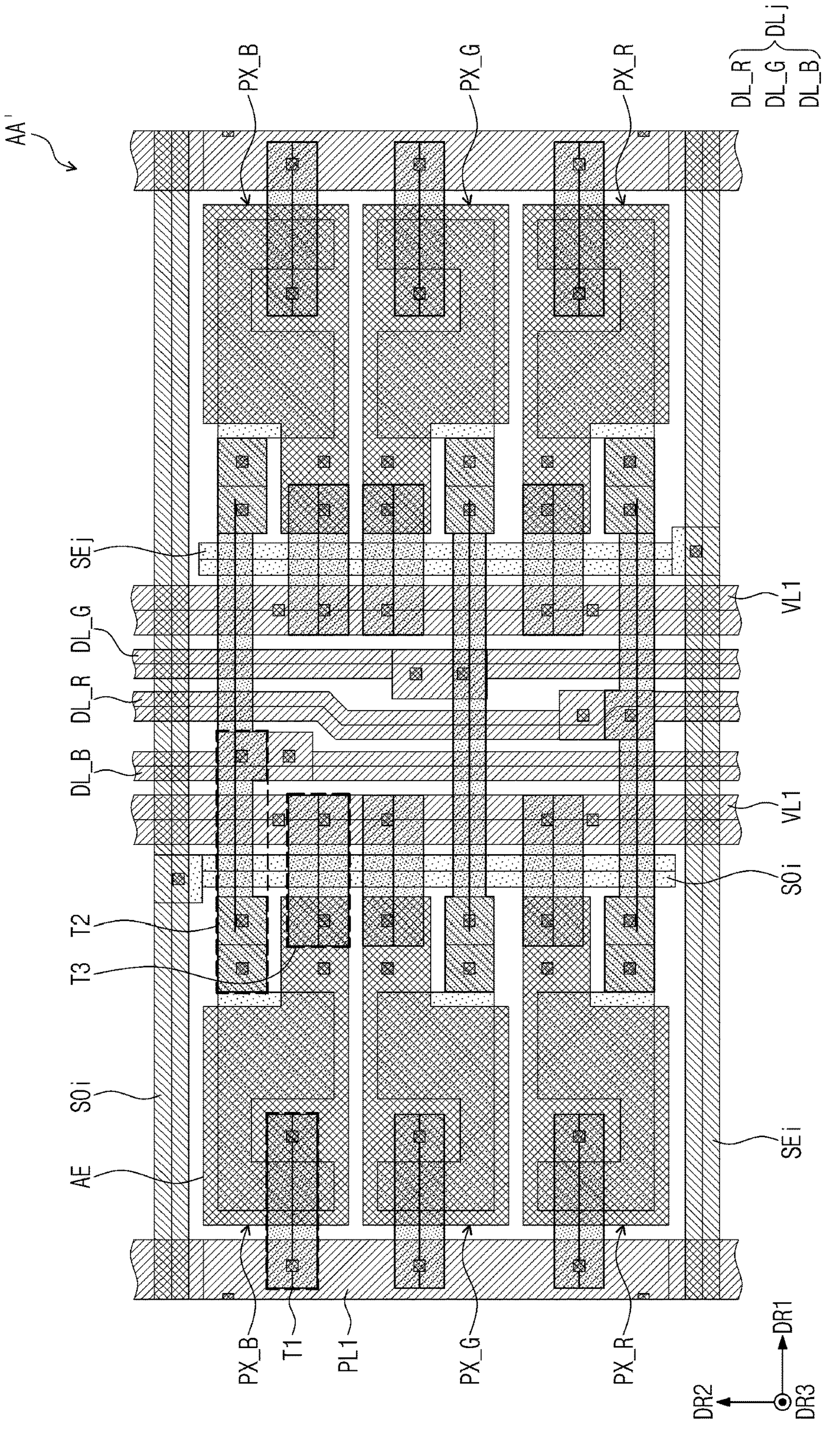
FIG. 4A is a plan view illustrating a layout of pixels by enlarging area AA' of FIG. 2, according to an embodiment of the present disclosure.
Figure 4B:
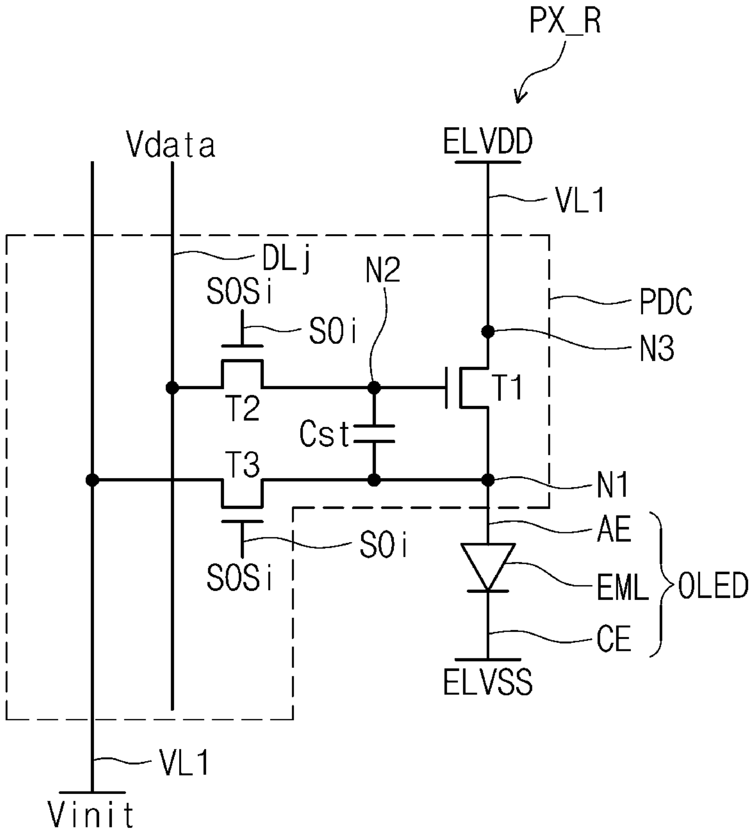
FIG. 4B is an equivalent circuit diagram of a sub-pixel, according to an embodiment of the present disclosure.

FIG. 4A is a plan view illustrating a layout of pixels by enlarging area AA' of FIG. 2, according to an embodiment of the present disclosure. FIG. 4B is an equivalent circuit diagram of a sub-pixel, according to an embodiment of the present disclosure.

Referring to FIGS. 2, 4A, and 4B, each of the plurality of pixels PX may include a first sub-pixel PX_R, a second sub-pixel PX_G, and a third sub-pixel PX_B. The first sub-pixel PX_R may be a pixel that emits red light. The second sub-pixel PX_G may be a pixel that emits green light. The third sub-pixel PX_B may be a pixel that emits blue light. The first sub-pixel PX_R, the second sub-pixel PX_G, and the third sub-pixel PX_B may be arranged in the second direction DR2.

FIG. 4A shows the j-th data line DLj among the plurality of data lines DL1 to DLn. In this case, 'j' may be a natural number. The data line DLj may include a first data line DL_R, a second data line DL_G, and a third data line DL_B. The first data line DL_R, the second data line DL_G, and the third data line DL_B may extend in the second direction DR2. The third data line DL_B, the first data line DL_R, and the second data line DL_G may be arranged in the first direction DR1.

The first data line DL_R may be electrically connected to the two adjacent first sub-pixels PX_R in the first direction DR1. The second data line DL_G may be electrically connected to the two adjacent second sub-pixels PX_G in the first direction DR1. The third data line DL_B may be electrically connected to the two adjacent third sub-pixels PX_B in the first direction DR1.

According to an embodiment of the present disclosure, the one data line DLj may be electrically connected to two adjacent pixels in each of a plurality of pixel rows. As compared to a case where one data line is electrically connected to one pixel in each of a plurality of pixel rows, the number of data lines DL1 to DLn output from the data driver DDV may be relatively small. The number of data lines DL1 to DLn connected to the data driver DDV may be reduced. For this reason, the size of the data driver DDV may be reduced. Accordingly, an area size of the peripheral area NA (see FIG. 1) of the display device DD (see FIG. 1) may be reduced.

A first power supply line PL1 may extend in the second direction DR2.

The first power supply ELVDD may be provided to the first power supply line PL1. The first power supply line PL1 may be electrically connected to the first sub-pixel PX_R, the second sub-pixel PX_G, and the third sub-pixel PX_B.

The initialization voltage line VL1 may extend in the second direction DR2. The initialization voltage Vinit may be provided to the initialization voltage line VL1. The initialization voltage line VL1 may be electrically connected to the first sub-pixel PX_R, the second sub-pixel PX_G, and the third sub-pixel PX_B.

FIG. 4A shows the i-th odd-numbered scan line SOi among the plurality of odd-numbered scan lines SO1 to SOm. In this case, 'i' may be a natural number. The odd-numbered scan line SOi may extend in the first direction DR1. A part of the odd-numbered scan line SOi may protrude in a negative second direction DR2. The odd-numbered scan line SOi may be electrically connected to the first sub-pixel PX_R, the second sub-pixel PX_G, and the third sub-pixel PX_B of one pixel positioned in an odd-numbered line among the plurality of pixels PX arranged in the first direction DR1. A "negative second direction DR2," as used herein, refers to a direction along the second direction DR2 that is opposite of the direction of the arrow shown in the coordinates. The arrow of the axis representing DR2 points in a positive second direction DR2."

FIG. 4A shows an i-th even-numbered scan line SEi among the plurality of even-numbered scan lines SE1 to SEm. The even-numbered scan line SEi may extend in the first direction DR1. A part of the even-numbered scan line SEi may protrude in the second direction DR2. The even-numbered scan lines SE1 to SEm may be electrically connected to the first sub-pixel PX_R, the second sub-pixel PX_G, and the third sub-pixel PX_B of one pixel positioned in an even-numbered line among the plurality of pixels PX arranged in the first direction DR1.

FIG. 4B shows an equivalent circuit diagram of the first sub-pixel PX_R of one pixel among the odd-numbered pixels arranged in the first direction DR1. However, the equivalent circuit diagram of FIG. 4B according to an embodiment of the present disclosure is not limited thereto and may also be applied to the second sub-pixel PX_G and the third sub-pixel PX_B.

The first sub-pixel PX_R may include a pixel driving circuit PDC and a light emitting diode OLED.

For example, the pixel driving circuit PDC according to an embodiment of the present disclosure may include three transistors and one capacitor. In this way, the pixel PX including three transistors and one capacitor may be referred to as "having a 3T1C structure." However, this is an example and the number of transistors and the number of capacitors of the pixel driving circuit PDC according to an embodiment of the present disclosure is not limited thereto.

The pixel driving circuit PDC may include a driving transistor T1, a switching transistor T2, a sensing transistor T3, a capacitor Cst, and the initialization voltage line VL1.

The light emitting diode OLED may operate in an on state or off state. The light emitting diode OLED may include a first electrode AE, a light emitting layer EML, and a second electrode CE. The first electrode AE may be referred to as an "anode". The second electrode CE may be referred to as a "cathode".

The first electrode AE may be electrically connected to a source node or drain node of the driving transistor T1. The second power supply ELVSS may be provided to the second electrode CE.

The driving transistor T1 may supply a driving current to the light emitting diode OLED to drive the light emitting diode OLED.

The driving transistor T1 may have a first node N1 corresponding to a source node or drain node, a second node N2 corresponding to a gate node, and a third node N3 corresponding to a drain node or source node. FIG. 4B illustrates the driving transistor T1 where the first node N1 is a source node, the second node N2 is a gate node, and the third node N3 is a drain node. The source node of the driving transistor T1 may be referred to as a "source S" (see FIG. 5). The drain node of the driving transistor T1 may be referred to as a "drain D" (see FIG. 5). The gate node of the driving transistor T1 may be referred to as a "gate G" (see FIG. 5).

The first node N1 may be electrically connected to the first electrode AE of the light emitting diode OLED. The first power supply ELVDD may be provided to the third node N3.

The switching transistor T2 may be a transistor for delivering a data voltage Vdata to the second node N2. The switching transistor T2 may be controlled by a first scan signal SOSi provided to the gate node, and may be electrically connected between the second node N2 and the data line DLj. However, this is an example, and when the first sub-pixel PX_R according to an embodiment of the present disclosure is the first sub-pixel PX_R of the even-numbered pixel arranged in the first direction DR1, the switching transistor T2 may be controlled by a second scan signal SESi provided to the gate node.

The capacitor Cst may be electrically connected between the first node N1 and the second node N2 of the driving transistor T1. The capacitor Cst may be referred to as the "storage capacitor Cst". The capacitor Cst may maintain a constant voltage during one frame time.

The sensing transistor T3 may be controlled by the first scan signal SOSi provided to the gate node, and may be electrically connected between the initialization voltage line VL1 and the first node N1.

The sensing transistor T3 may be turned on to provide the initialization voltage Vinit supplied through the initialization voltage line VL1 to the first node N1 of the driving transistor T1.

The sensing transistor T3 may be a transistor related to a compensation function for a unique characteristic value of the driving transistor T1. The unique characteristic value of the driving transistor T1 may include, for example, a threshold voltage Vth, mobility, and the like.

A source following operation in which a voltage Vs of the first node N1 follows a voltage Vg of the second node N2 may be performed by using the sensing transistor T3 by sensing the unique characteristic value of the driving transistor T1 of each of the plurality of sub-pixels PX_R, PX_G, and PX_B, and the sensing transistor T3 may sense the voltage of the first node N1 of the driving transistor T1 as a sensing voltage. A change in a threshold voltage of the driving transistor T1 may be sensed based on the sensing voltage thus sensed at this time.

According to an embodiment of the present disclosure, the unique characteristic value (a threshold voltage or mobility) of the driving transistor T1 may be sensed by the sensing transistor T3 of each of the plurality of pixels PX. Brightness uniformity may be improved by compensating for the unique characteristics between the driving transistors T1.

Accordingly, the display device DD (see FIG. 1) with improved display quality may be provided.

Figure 4C:
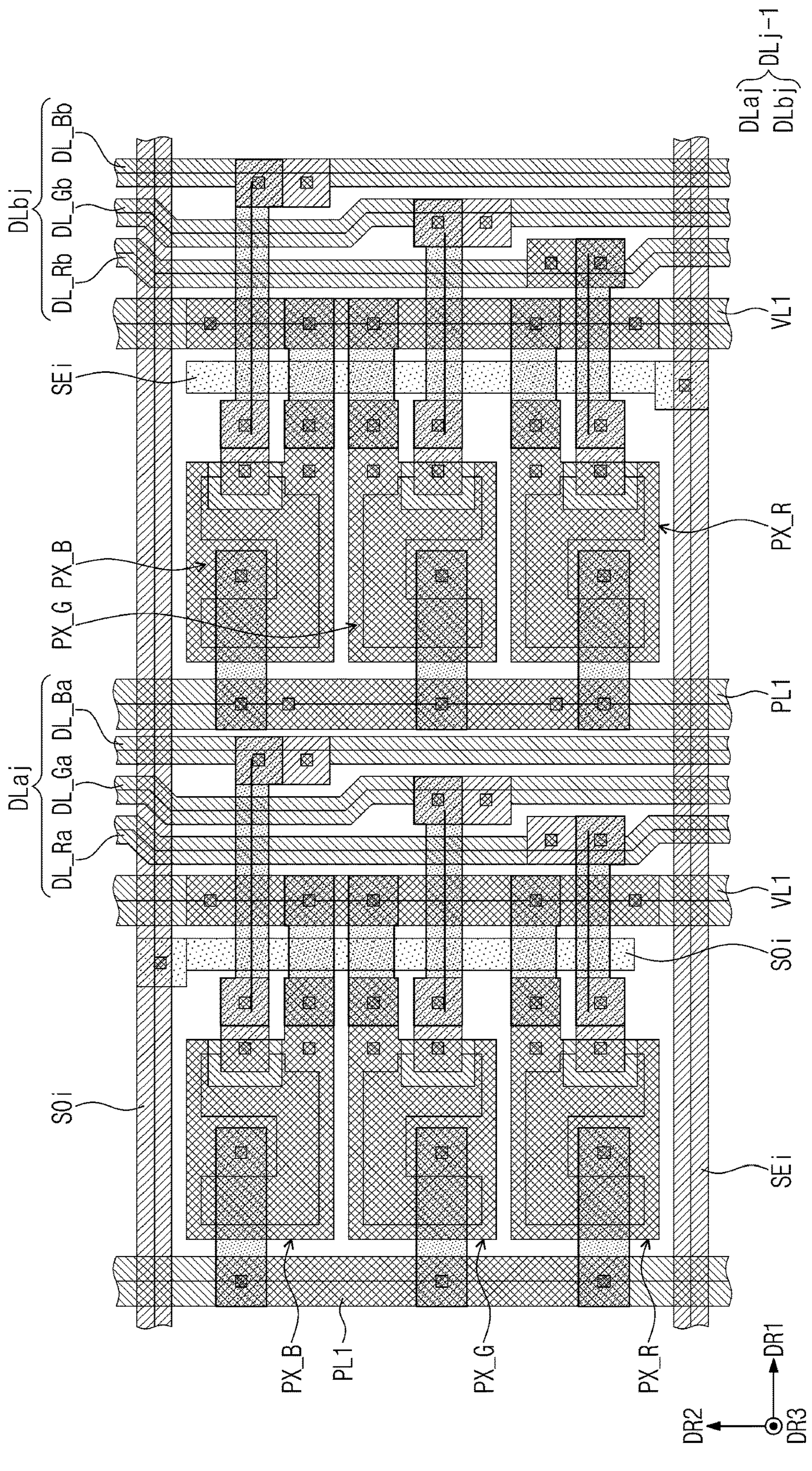
FIG. 4C is a plan view illustrating a layout of pixels by enlarging an area corresponding to area AA' of FIG. 2, according to an embodiment of the present disclosure.

FIG. 4C is a plan view illustrating a layout of pixels by enlarging an area corresponding to area AA' of FIG. 2, according to an embodiment of the present disclosure. In the description of FIG. 4C, the same reference numerals are assigned to the same components described with reference to FIGS. 4A and 4B, and thus the descriptions thereof are omitted to avoid redundancy.

Referring to FIG. 4C, a data line DLj-1 may include an odd-numbered data line DLaj and an even-numbered data line DLbj arranged alternately in the first direction DR1. One pixel may be placed between the odd-numbered data line DLaj and the even-numbered data line DLbj. The odd-numbered data line DLaj and the even-numbered data line DLbj may be connected in the non-display area NDA (see FIG. 3).

According to an embodiment of the present disclosure, the odd-numbered data line DLaj and the even-numbered data line DLbj may be electrically connected to pixels, and the odd-numbered data line DLaj and the even-numbered data line DLbj may be provided to the data driver DDV through one data line DLj-1 in the non-display area NDA (see FIG. 3). As compared to a case where one data line is electrically connected to one pixel in each of a plurality of pixel rows, the number of data lines DL1 to DLn output from the data driver DDV may be relatively small. The number of data lines DL1 to DLn connected to the data driver DDV may be reduced. For this reason, the size of the data driver DDV may be reduced. Accordingly, an area size of the peripheral area NA (see FIG. 1) of the display device DD (see FIG. 1) may be reduced.

The odd-numbered data line DLaj may include a first odd-numbered data line DL_Ra, a second odd-numbered data line DL_Ga, and a third odd-numbered data line DL_Ba.

The first odd-numbered data line DL_Ra may be electrically connected to the first sub-pixel PX_R of the odd-numbered pixel in one pixel row arranged in the first direction DR1. The second odd-numbered data line DL_Ga may be electrically connected to the second sub-pixel PX_G of the odd-numbered pixel. The third odd-numbered data line DL_Ba may be electrically connected to the third sub-pixel PX_B of the odd-numbered pixel.

The even-numbered data line DLbj may include a first even-numbered data line DL_Rb, a second even-numbered data line DL_Gb, and a third even-numbered data line DL_Bb.

The first even-numbered data line DL_Rb may be electrically connected to the first sub-pixel PX_R of the even-numbered pixel in one pixel row arranged in the first direction DR1. The second even-numbered data line DL_Gb may be electrically connected to the second sub-pixel PX_G of the even-numbered pixel. The third even-numbered data line DL_Bb may be electrically connected to the third sub-pixel PX_B of the even-numbered pixel.

Figure 5:
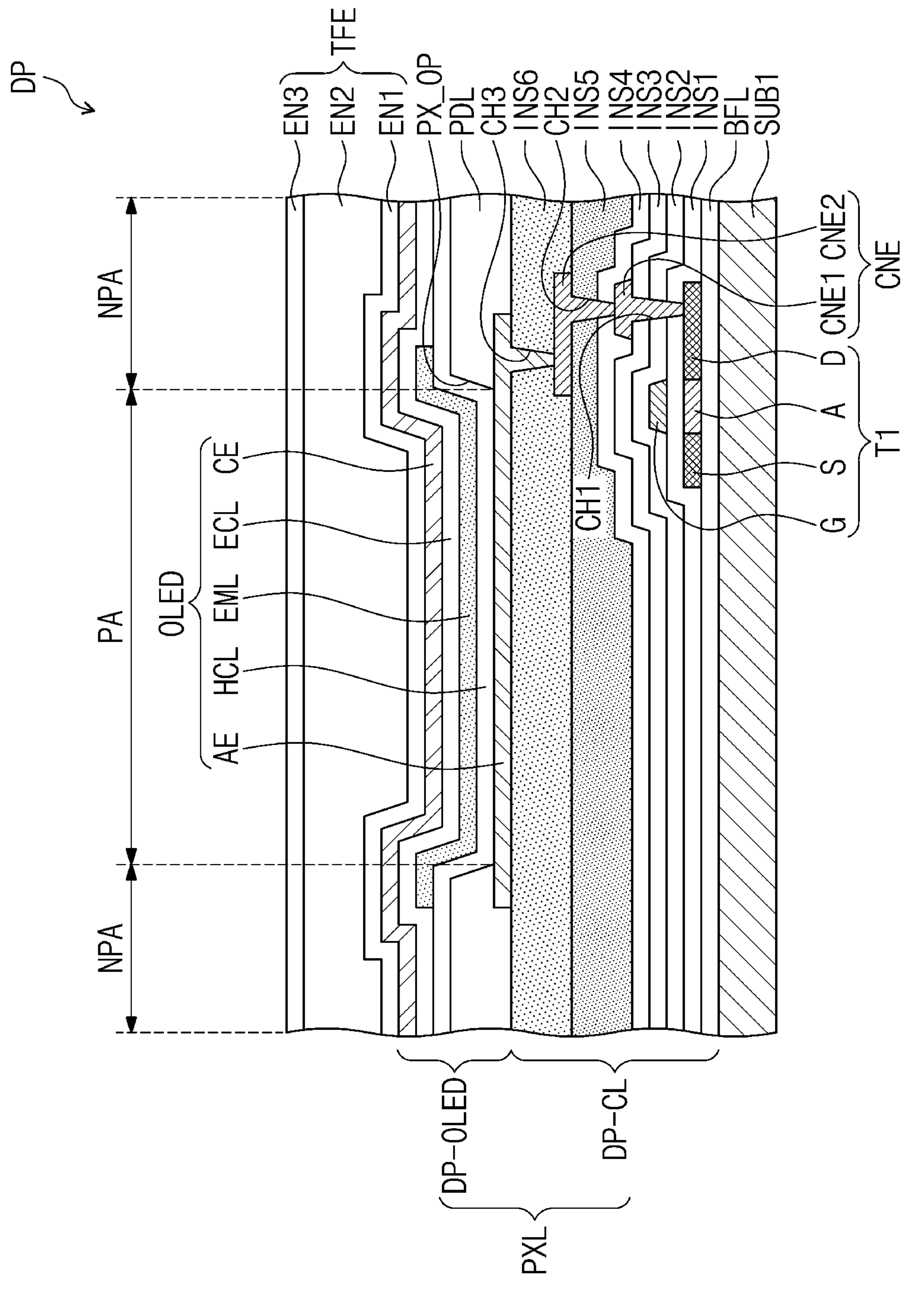
FIG. 5 is a cross-sectional view of a portion of a display panel, according to an embodiment of the present disclosure.

FIG. 5 is a cross-sectional view of a portion of a display panel, according to an embodiment of the present disclosure.

Referring to FIGS. 4B and 5, the display panel DP may include a first substrate SUB1, a pixel layer PXL, and a thin film encapsulation layer TFE.

The pixel layer PXL may be disposed on the first substrate SUB1. The pixel layer PXL may include a circuit element layer DP-CL and a display element layer DP-OLED.

The circuit element layer DP-CL may include a buffer layer BFL, first to sixth insulating layers INS1 to INS6, a transistor TR, and a connection electrode CNE.

The buffer layer BFL may be disposed on the first substrate SUB1. The buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly-doped area and a lightly-doped area. Conductivity of the highly-doped area may be greater than that of the lightly-doped area. The highly-doped area may substantially operate as a source electrode or a drain electrode of the transistor TR. The lightly-doped area may substantially correspond to an active (or channel) of a transistor.

A source S, an active area A, and a drain D of the driving transistor T1 may be formed from the semiconductor pattern. The first insulating layer INS1 may be disposed on the semiconductor pattern. A gate G of the driving transistor T1 may be disposed on the first insulating layer INS1. The second insulating layer INS2 may be disposed on the gate G. A third insulating layer INS3 may be disposed on the second insulating layer INS2.

The connection electrode CNE may connect the driving transistor T1 to the light emitting diode OLED. The connection electrode CNE may include a first connection electrode CNE1 and a second connection electrode CNE2. The first connection electrode CNE1 may be disposed on the third insulating layer INS3 and may be connected to the drain D through a first contact hole CH1 defined in the first to third insulating layers INS1 to INS3.

The fourth insulating layer INS4 may be disposed on the first connection electrode CNE1. The fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

The sixth insulating layer INS6 may be disposed on the second connection electrode CNE2. The first to sixth insulating layers INS1 to INS6 may be inorganic layers or organic layers.

The display element layer DP-OLED may be disposed on the circuit element layer DP-CL. The display element layer DP-OLED may include a light emitting diode OLED and a pixel defining layer PDL.

The light emitting diode OLED may include a first electrode AE (or an anode), a second electrode CE, a hole control layer HCL, an electron control layer ECL, and a light emitting layer EML.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL in which an opening PX_OP is formed above a predetermined portion of the first electrode AE may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The light emitting layer EML may be disposed on the hole control layer HCL. The light emitting layer EML may be disposed in an area corresponding to an opening PX_OP. The light emitting layer EML may include a light emitting element. The light emitting element may include organic and/or inorganic materials.

The electron control layer ECL may be disposed on the light emitting layer EML and the hole control layer HCL. The electron control layer ECL may include an electron transport layer and an electron injection layer. The hole control layer HCL and the electron control layer ECL may be disposed in common in an emission area PA and a non-emission area NPA.

The second electrode CE may be disposed on the electron control layer ECL. The second electrode CE may be disposed in the pixels PX in common.

The thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2. Each of the first and third encapsulation layers EN1 and EN3 may include an inorganic insulating layer, and may protect the pixel PX from moisture/oxygen. The second encapsulation layer EN2 includes an organic insulating layer and may protect the pixel PX from foreign objects such as dust particles.

The first power supply ELVDD may be applied to the first electrode AE through the driving transistor T1, and the second power supply ELVSS may be applied to the second electrode CE. Excitons may be formed by coupling holes and electrons injected into the light emitting layer EML. As the excitons transition to a ground state, the light emitting diode OLED may emit light.

The emission area PA and the non-emission area NPA around the emission area PA may be defined in a planar area of the display panel DP. The light emitting diode OLED may be positioned in the emission area PA.

Figure 6A:
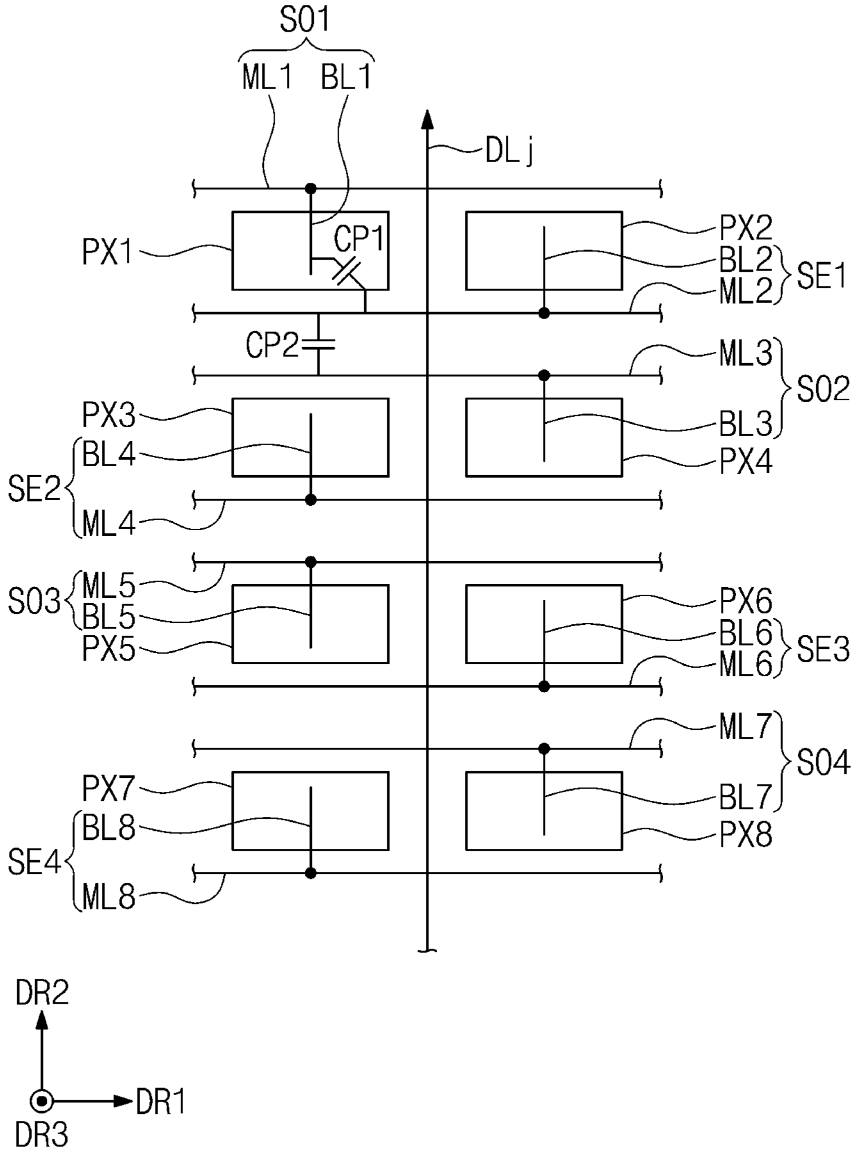
FIG. 6A is a schematic diagram showing a connection relationship between a plurality of pixels and a plurality of scan lines, according to an embodiment of the present disclosure.

FIG. 6A is a schematic diagram showing a connection relationship between a plurality of pixels and a plurality of scan lines, according to an embodiment of the present disclosure.

Referring to FIGS. 2 and 6A, the plurality of pixels PX may include a first pixel PX1, a second pixel PX2, a third pixel PX3, a fourth pixel PX4, a fifth pixel PX5, a sixth pixel PX6, a seventh pixel PX7, and an eighth pixel PX8. The plurality of pixels PX may have a shape in which the first to eighth pixels PX1 to PX8 are repeatedly arranged in the first direction DR1.

The second pixel PX2 may be spaced from the first pixel PX1 in the first direction DR1. The third pixel PX3 may be spaced from the first pixel PX1 in the second direction DR2. The fourth pixel PX4 may be spaced from the third pixel PX3 in the first direction DR1, and may be spaced from the second pixel PX2 in the second direction DR2. The fifth pixel PX5 may be spaced from the third pixel PX3 in the second direction DR2. The sixth pixel PX6 may be spaced from the fifth pixel PX5 in the first direction DR1. The seventh pixel PX7 may be spaced from the fifth pixel PX5 in the second direction DR2. The eighth pixel PX8 may be spaced from the seventh pixel PX7 in the first direction DR1, and may be spaced from the sixth pixel PX6 in the second direction DR2. The pixels are spaced apart from one another and arranged in a matrix configuration.

The data line DLj may extend in the second direction DR2. The data line DLj may be electrically connected to two adjacent pixels in the first direction DR1. The data line DLj may be electrically connected to the first to eighth pixels PX1 to PX8.

The plurality of scan lines SO1 to SOm and SE1 to SEm may include the plurality of odd-numbered scan lines SO1 to SOm and the plurality of even-numbered scan lines SE1 to SEm.

The plurality of odd-numbered scan lines SO1 to SOm may include a first scan line SO1, a third scan line SO2, a fifth scan line SO3, and a seventh scan line SO4.

The first scan line SO1 may include a first main line ML1 and a first branch line BL1. The first main line ML1 may extend in the first direction DR1. The first branch line BL1 may extend in the second direction DR2 from a point on the first main line ML1. The first branch line BL1 may extend in the negative second direction DR2. The first branch line BL1 may face a second branch line BL2 in the first direction DR1. The first branch line BL1 may be electrically connected to the first pixel PX1.

The third scan line SO2 may be spaced from the first scan line SO1 with a second scan line SE1 interposed therebetween. The third scan line SO2 may be spaced from the first scan line SO1 in the second direction DR2. The third scan line SO2 may include a third main line ML3 and a third branch line BL3. The third main line ML3 may extend in the first direction DR1. The third branch line BL3 may extend in the second direction DR2. The third branch line BL3 may protrude from the third main line ML3 toward the fourth main line ML4 in the negative second direction DR2. The third branch line BL3 may be electrically connected to the fourth pixel PX4.

The fifth scan line SO3 may be spaced from the third scan line SO2 with a fourth scan line SE2 interposed therebetween. The fifth scan line SO3 may be spaced from the third scan line SO2 in the second direction DR2. The fifth scan line SO3 may include a fifth main line ML5 and a fifth branch line BL5. The fifth main line ML5 may extend in the first direction DR1. The fifth branch line BL5 may extend toward the sixth main line ML6 in the negative second direction DR2 from a point on the fifth main line ML5. The fifth branch line BL5 may be electrically connected to the fifth pixel PX5.

The seventh scan line SO4 may be spaced from the fifth scan line SO3 with a sixth scan line SE3 interposed therebetween. The seventh scan line SO4 may be spaced from the fifth scan line SO3 in the second direction DR2. The seventh scan line SO4 may include a seventh main line ML7 and a seventh branch line BL7. The seventh main line ML7 may extend in the first direction DR1. The seventh branch line BL7 may extend in the second direction DR2. The seventh branch line BL7 may protrude from the seventh main line ML7 in the negative second direction DR2. The seventh branch line BL7 may be electrically connected to the eighth pixel PX8.

The plurality of even-numbered scan lines SE1 to SEm may include the second scan line SE1, the fourth scan line SE2, the sixth scan line SE3, and an eighth scan line SE4.

The second scan line SE1 may be spaced from the first scan line SO1 in the second direction DR2. The seventh scan line SE1 may include a second main line ML2 and a second branch line BL2. The second main line ML2 may extend in the first direction DR1. The second main line ML2 may be spaced from the first main line ML1 with the first pixel PX1 and the second pixel PX2 interposed therebetween. The second branch line BL2 may extend in the second direction DR2. The second branch line BL2 may protrude from the second main line ML2 toward the first main line ML1 in the second direction DR2, without reaching the first main line ML1. The second branch line BL2 may be electrically connected to the second pixel PX2.

A parasitic capacitor may be formed between one scan line and an adjacent scan line. For example, a first parasitic capacitor CP1 may be formed between the second scan line SE1 and the first scan line SO1. A second parasitic capacitor CP2 may be formed between the second scan line SE1 and the third scan line SO2.

Unlike an embodiment of the present disclosure, a second scan signal provided to the second scan line SE1 may be affected by a first scan signal provided to the first scan line SO1 by the first parasitic capacitor CP1, and may be affected by a third scan signal provided to the third scan line SO2 by the second parasitic capacitor CP2. For example, in the case where a level of the first scan signal is changed from a turn-on level to a turn-off level while the second scan signal has a turn-on (active) level, a voltage of the gate node of the driving transistor T1 (see FIG. 5) of the second pixel PX2 may be changed by the first parasitic capacitor CP1. Moreover, in the case where a level of the second scan signal is changed from a turn-on level to a turn-off level while the third scan signal has a turn-on (active) level, the voltage of the gate node of the driving transistor T1 (see FIG. 5) of the third pixel PX3 may be changed by the second parasitic capacitor CP2. That is, when active periods of scan signals on adjacently positioned scan lines among the plurality of scan lines SO1 to SO4 and SE1 to SE4 overlap each other, the voltage of the gate node of the driving transistor T1 (see FIG. 5) may be affected. As a result, a luminance difference may occur between the plurality of pixels PX1 to PX8 electrically connected to the plurality of scan lines SO1 to SO4 and SE1 to SE4. However, according to an embodiment of the present disclosure, active periods of scan signals of scan lines adjacent to each other among the plurality of scan lines SO1 to SO4 and SE1 to SE4 may not overlap each other at the same time. The influence of a parasitic capacitor formed between one scan line and another adjacent scan line may be reduced or prevented. Accordingly, the display device DD (see FIG. 1) with improved display quality may be provided. This will be described later.

In FIG. 6A, the parasitic capacitors CP1 and CP2 formed in the second scan line SE1 are described. However, the parasitic capacitors CP1 and CP2 according to an embodiment of the present disclosure may be formed between adjacent scan lines.

The fourth scan line SE2 may be spaced from the third scan line SO2 in the second direction DR2. The fourth scan line SE2 may include a fourth main line ML4 and the fourth branch line BL4. The fourth main line ML4 may extend in the first direction DR1. The fourth main line ML4 may be spaced from the third main line ML3 with the third pixel PX3 and the fourth pixel PX4 interposed therebetween. The fourth branch line BL4 may extend in the second direction DR2. The fourth branch line BL4 may protrude from a point on the fourth main line ML4 toward the third main line ML3 in the second direction DR2 without reaching the third main line ML3. The fourth branch line BL4 may be electrically connected to the third pixel PX3.

The sixth scan line SE3 may be spaced from the fifth scan line SO3 in the second direction DR2. The sixth scan line SE3 may include a sixth main line ML6 and the sixth branch line BL6. The sixth main line ML6 may extend in the first direction DR1. The sixth main line ML6 may be spaced from the fifth main line ML5 with the fifth pixel PX5 and the sixth pixel PX6 interposed therebetween. The sixth branch line BL6 may extend from the sixth main line ML6 toward the fifth main line ML5 in the second direction DR2 without reaching the fifth main line ML5. The sixth branch line BL6 may be electrically connected to the sixth pixel PX6.

The eighth scan line SE4 may be spaced from the seventh scan line SO4 in the second direction DR2. The eighth scan line SE4 may include an eighth main line ML8 and the eighth branch line BL8. The eighth main line ML8 may extend in the first direction DR1. The eighth main line ML8 may be spaced from the seventh main line ML7 with the seventh pixel PX7 and the eighth pixel PX8 interposed therebetween. The eighth branch line BL8 may extend in the second direction DR2. The eighth branch line BL8 may protrude from the eighth main line ML8 toward the seventh main line ML7 in the second direction DR2 without reaching the seventh main line ML7. The eighth branch line BL8 may be electrically connected to the seventh pixel PX7.

Figure 6B:
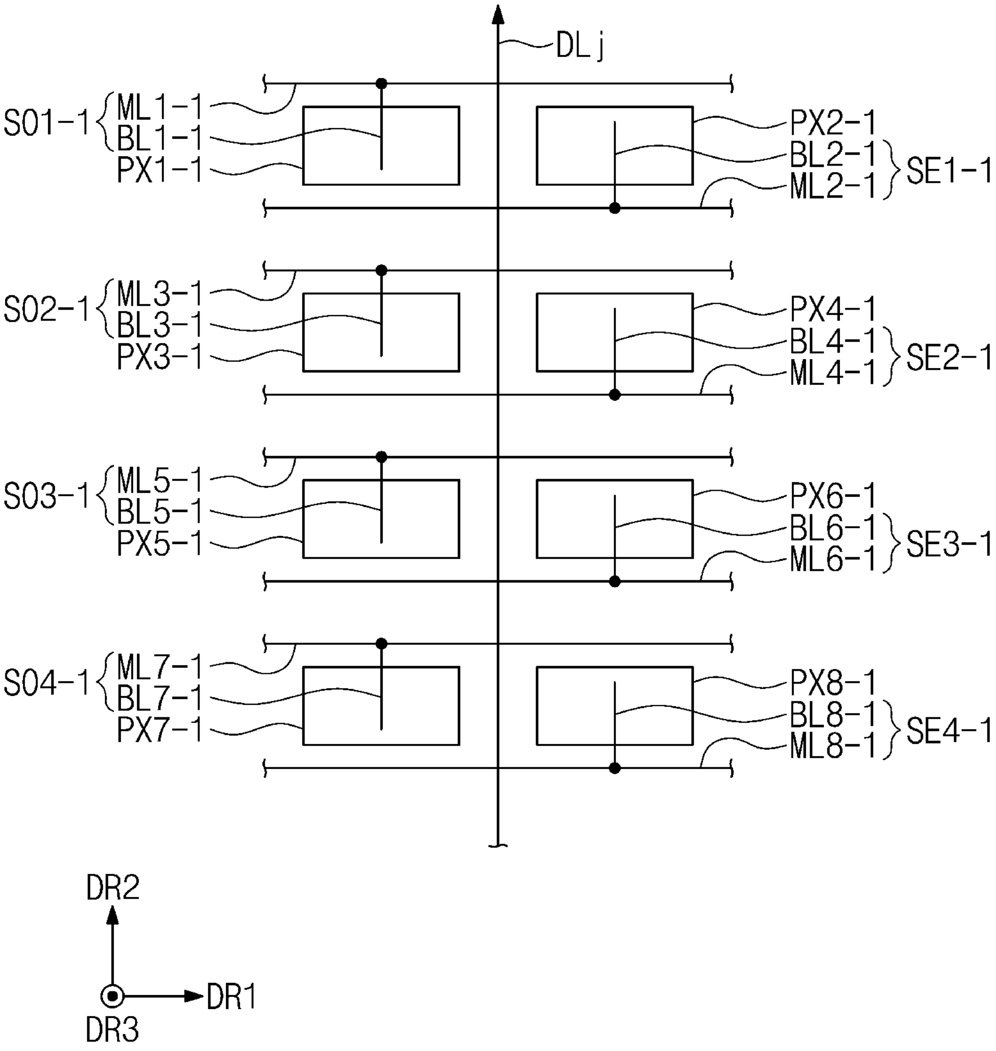
FIG. 6B is a schematic diagram showing a connection relationship between a plurality of pixels and a plurality of scan lines, according to an embodiment of the present disclosure.

FIG. 6B is a schematic diagram showing a connection relationship between a plurality of pixels and a plurality of scan lines, according to an embodiment of the present disclosure.

Referring to FIGS. 2 and 6B, the plurality of pixels PX may include a first pixel PX1-1, a second pixel PX2-1, a third pixel PX3-1, a fourth pixel PX4-1, a fifth pixel PX5-1, a sixth pixel PX6-1, a seventh pixel PX7-1, and an eighth pixel PX8-1.

The plurality of odd-numbered scan lines SO1 to SOm may include a first scan line SO1-1, a third scan line SO2-1, a fifth scan line SO3-1, and a seventh scan line SO4-1, which are explicitly shown in FIG. 6B.

The first scan line SO1-1 may include a first main line ML1-1 and a first branch line BL1-1 that protrudes from the first main line ML1-1 toward the second main line ML2-1 in the negative second direction DR2. The first branch line BL1-1 may be electrically connected to the first pixel PX1-1. The first branch line BL1-1 does not electrically connect to the second main line ML2-1.

The third scan line SO2-1 may include a third main line ML3-1 and a third branch line BL3-1 that protrudes from the third main line ML3-toward the fourth main line ML4-1 in the negative second direction DR2. The third branch line BL3-1 may be electrically connected to the third pixel PX3-1. The third branch line BL3-1 does not electrically connect to the fourth main line MLA-1.

The fifth scan line SO3-1 may include a fifth main line ML5-1 and a fifth branch line BL5-1 that protrudes from the fifth main line ML5-1 toward the sixth main line ML6-1 in the negative second direction DR2. The fifth branch line BL5-1 may be electrically connected to the fifth pixel PX5-1. The fifth branch line BL5-1 does not electrically connect to the sixth main line ML6-1.

The seventh scan line SO4-1 may include a seventh main line ML7-1 and a seventh branch line BL7-1 that protrudes from the seventh main line ML7-1 toward the eighth main line ML8-1 in the negative second direction DR2. The seventh branch line BL7-1 may be electrically connected to the seventh pixel PX7-1. The seventh branch line BL7-1 does not electrically connect to the eight main line ML8-1.

The plurality of even-numbered scan lines SE1 to SEm may include a second scan line SE1-1, a fourth scan line SE2-1, a sixth scan line SE3-1, and an eighth scan line SE4-1.

The second scan line SE1-1 may include a second main line ML2-1 and a second branch line BL2-1 that protrudes from the second main line ML2-1 toward the first main line ML1-1 in the second direction DR2. The second branch line BL2-1 may be electrically connected to the second pixel PX2-1. The second branch line BL2-1 does not electrically connect to the first main line ML1-1.

The fourth scan line SE2-1 may include a fourth main line MLA-1 and a fourth branch line BL4-1 that protrudes from the fourth main line ML4-1 toward the third main line ML3-1 in the second direction DR2. The fourth branch line BL4-1 may be electrically connected to the fourth pixel PX4-1. The fourth branch line BL4-1 does not electrically connect to the third main line ML3-1.

The sixth scan line SE3-1 may include a sixth main line ML6-1 and a sixth branch line BL6-1 that protrudes from the sixth main line ML6-1 toward the fifth branch line ML5-1 in the second direction DR2. The sixth branch line BL6-1 may be electrically connected to the sixth pixel PX6-1. The sixth branch line BL does not electrically connect to the fifth main line ML5-1.

The eighth scan line SE4-1 may include an eighth main line ML8-1 and an eighth branch line BL8-1 that protrudes from the eighth main line ML8-1 toward the seventh main line ML7-1 in the second direction DR2. The eighth branch line BL8-1 may be electrically connected to the eighth pixel PX8-1. The eighth branch line BL8-1 does not electrically connect to the seventh main line ML7-1.

Figure 6C:
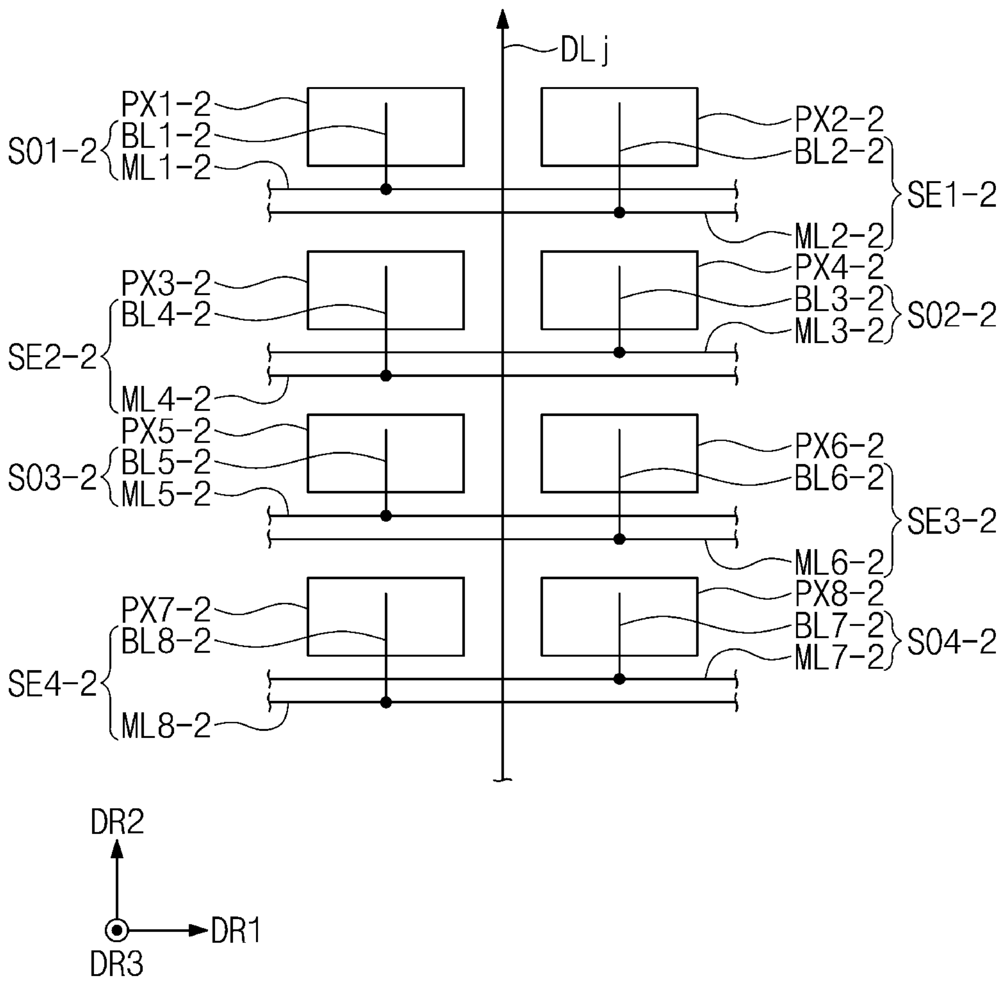
FIG. 6C is a schematic diagram showing a connection relationship between a plurality of pixels and a plurality of scan lines, according to an embodiment of the present disclosure.

FIG. 6C is a schematic diagram showing a connection relationship between a plurality of pixels and a plurality of scan lines, according to an embodiment of the present disclosure.

Referring to FIGS. 2 and 6C, the plurality of pixels PX may include a first pixel PX1-2, a second pixel PX2-2, a third pixel PX3-2, a fourth pixel PX4-2, a fifth pixel PX5-2, a sixth pixel PX6-2, a seventh pixel PX7-2, and an eighth pixel PX8-2. In the embodiment of FIG. 6C, the branch lines of the odd-numbered scan lines SO1 to SOm extend in the same direction as the branch lines of the even-numbered scan lines SE1 to SEm. In the embodiment of FIG. 6C, the odd-numbered scan lines SO1 to SOm switches columns in each subsequent row. Similarly, the even-numbered scan lines SE1 to SEm switches columns in each subsequent row, creating columns that have a mix of odd-numbered and even-numbered scan lines.

The plurality of odd-numbered scan lines SO1 to SOm may include a first scan line SO1-2, a third scan line SO2-2, a fifth scan line SO3-2, and a seventh scan line SO4-2 that are explicitly depicted in FIG. 6C.

The first scan line SO1-2 may include a first main line ML1-2 and a first branch line BL1-2 that protrudes from the first main line ML1-2 in the second direction DR2. The first branch line BL1-2 may be electrically connected to the first pixel PX1-2.

The third scan line SO2-2 may include a third main line ML3-2 and a third branch line BL3-2 that protrudes from the third main line ML3-2 in the second direction DR2. The third branch line BL3-2 may be electrically connected to the fourth pixel PX4-2.

The fifth scan line SO3-2 may include a fifth main line ML5-2 and a fifth branch line BL5-2 that protrudes from the fifth main line ML5-2 in the second direction DR2. The fifth branch line BL5-2 may be electrically connected to the fifth pixel PX5-2.

The seventh scan line SO4-2 may include a seventh main line ML7-2 and a seventh branch line BL7-2 that protrudes from the seventh main line ML7-2 in the second direction DR2. The seventh branch line BL7-2 may be electrically connected to the eighth pixel PX8-2.

The plurality of even-numbered scan lines SE1 to SEm may include a second scan line SE1-2, a fourth scan line SE2-2, a sixth scan line SE3-2, and an eighth scan line SE4-2 that are explicitly depicted in FIG. 6C.

The second scan line SE1-2 may be placed adjacent to the first scan line SO1-2. The second scan line SE1-2 may include a second main line ML2-2 and a second branch line BL2-2 that protrudes from the second main line ML2-2 in the second direction DR2. The second branch line BL2-2 may be electrically connected to the second pixel PX2-2.

The fourth scan line SE2-2 may be placed adjacent to the third scan line SO2-2. The fourth scan line SE2-2 may include a fourth main line ML4-2 and a fourth branch line BL4-2 that protrudes from the fourth main line ML4-2 in the second direction DR2. The fourth branch line BL4-2 may be electrically connected to the third pixel PX3-2.

The sixth scan line SE3-2 may be placed adjacent to the fifth scan line SO3-2. The sixth scan line SE3-2 may include a sixth main line ML6-2 and a sixth branch line BL6-2 that protrudes from the sixth main line ML6-2 in the second direction DR2. The sixth branch line BL6-2 may be electrically connected to the sixth pixel PX6-2.

The eighth scan line SE4-2 may be placed adjacent to the seventh scan line SO4-2. The eighth scan line SE4-2 may include an eighth main line ML8-2 and an eighth branch line BL8-2 that protrudes from the eighth main line ML8-2 in the second direction DR2. The eighth branch line BL8-2 may be electrically connected to the seventh pixel PX7-2.

Figure 6D:
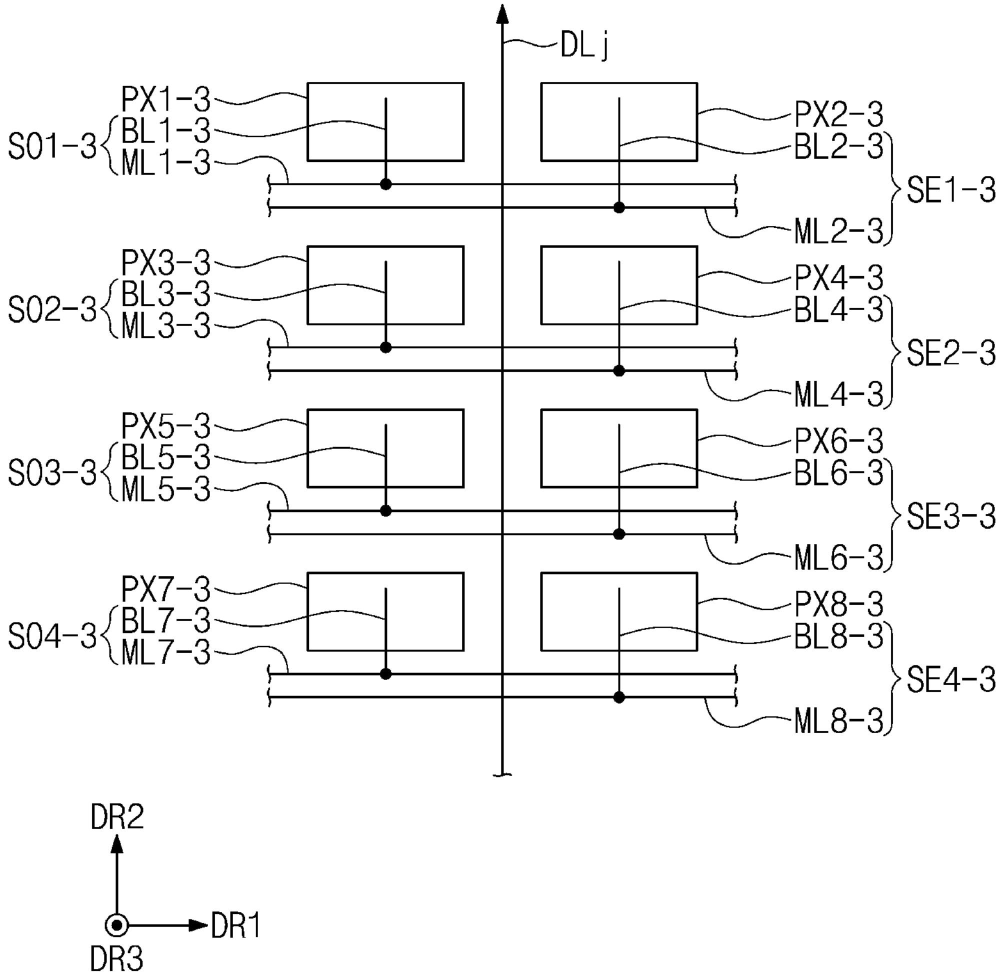
FIG. 6D is a schematic diagram showing a connection relationship between a plurality of pixels and a plurality of scan lines, according to an embodiment of the present disclosure.

FIG. 6D is a schematic diagram showing a connection relationship between a plurality of pixels and a plurality of scan lines, according to an embodiment of the present disclosure.

Referring to FIGS. 2 and 6D, the plurality of pixels PX may include a first pixel PX1-3, a second pixel PX2-3, a third pixel PX3-3, a fourth pixel PX4-3, a fifth pixel PX5-3, a sixth pixel PX6-3, a seventh pixel PX7-3, and an eighth pixel PX8-3. In the embodiment of FIG. 6D, the branch lines of the odd-numbered scan lines SO1 to SOm extend in the same direction as the branch lines of the even-numbered scan lines SE1 to SEm. Unlike in the embodiment of FIG. 6C, the odd-numbered scan lines SO1 to SOm are arranged in one column, and the even-numbered scan lines SE1 to SEm are arranged in another column.

The plurality of odd-numbered scan lines SO1 to SOm may include a first scan line SO1-3, a third scan line SO2-3, a fifth scan line SO3-3, and a seventh scan line SO4-3.

The first scan line SO1-3 may include a first main line ML1-3 and a first branch line BL1-3 that protrudes from the first main line ML1-3 in the second direction DR2. The first branch line BL1-3 may be electrically connected to the first pixel PX1-3.

The third scan line SO2-3 may include a third main line ML3-3 and a third branch line BL3-3 that protrudes from the third main line ML3-3 in the second direction DR2. The third branch line BL3-3 may be electrically connected to the third pixel PX3-3.

The fifth scan line SO3-3 may include a fifth main line ML5-3 and a fifth branch line BL5-3 that protrudes from the fifth main line ML5-3 in the second direction DR2. The fifth branch line BL5-3 may be electrically connected to the fifth pixel PX5-3.

The seventh scan line SO4-3 may include a seventh main line ML7-3 and a seventh branch line BL7-3 that protrudes from the seventh main line ML7-3 in the second direction DR2. The seventh branch line BL7-3 may be electrically connected to the seventh pixel PX7-3.

The plurality of even-numbered scan lines SE1 to SEm may include a second scan line SE1-3, a fourth scan line SE2-3, a sixth scan line SE3-3, and an eighth scan line SE4-3.

The second scan line SE1-3 may be placed adjacent to the first scan line SO1-3. The second scan line SE1-3 may include a second main line ML2-3 and a second branch line BL2-3 that protrudes from the second main line ML2-3 in the second direction DR2. The second branch line BL2-3 may be electrically connected to the second pixel PX2-3.

The fourth scan line SE2-3 may be placed adjacent to the third scan line SO2-3. The fourth scan line SE2-3 may include a fourth main line ML4-3 and a fourth branch line BL4-3 that protrudes from the fourth main line ML4-3 in the second direction DR2. The fourth branch line BL4-3 may be electrically connected to the fourth pixel PX4-3.

The sixth scan line SE3-3 may be placed adjacent to the fifth scan line SO3-3. The sixth scan line SE3-3 may include a sixth main line ML6-3 and a sixth branch line BL6-3 that protrudes from the sixth main line ML6-3 in the second direction DR2. The sixth branch line BL6-3 may be electrically connected to the sixth pixel PX6-3.

The eighth scan line SE4-3 may be placed adjacent to the seventh scan line SO4-3. The eighth scan line SE4-3 may include an eighth main line ML8-3 and an eighth branch line BL8-3 that protrudes from the eighth main line ML8-3 in the second direction DR2. The eighth branch line BL8-3 may be electrically connected to the eighth pixel PX8-3.

Figure 7A:
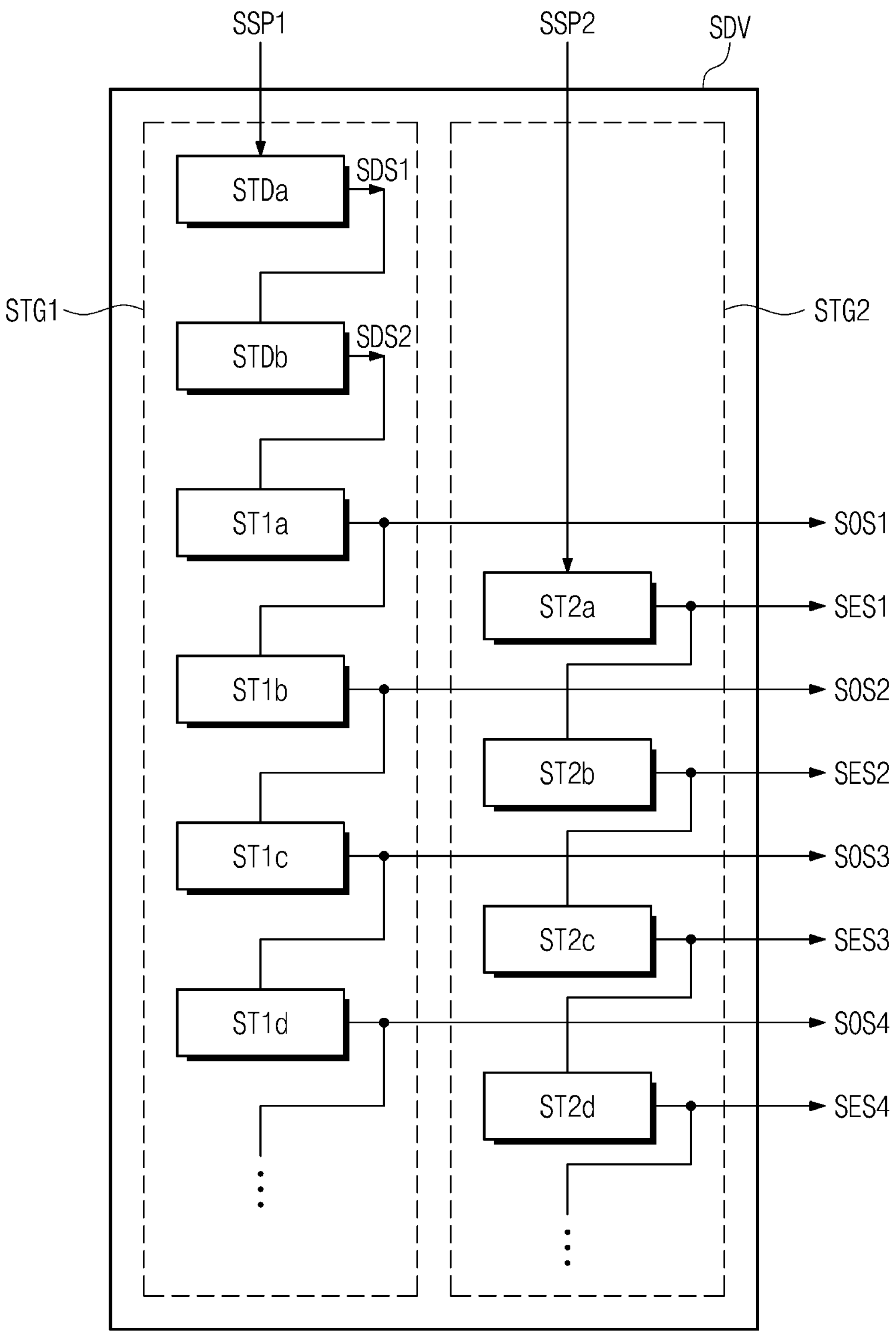
FIG. 7A is a schematic block diagram of a scan driver, according to an embodiment of the present disclosure.
Figure 7B:
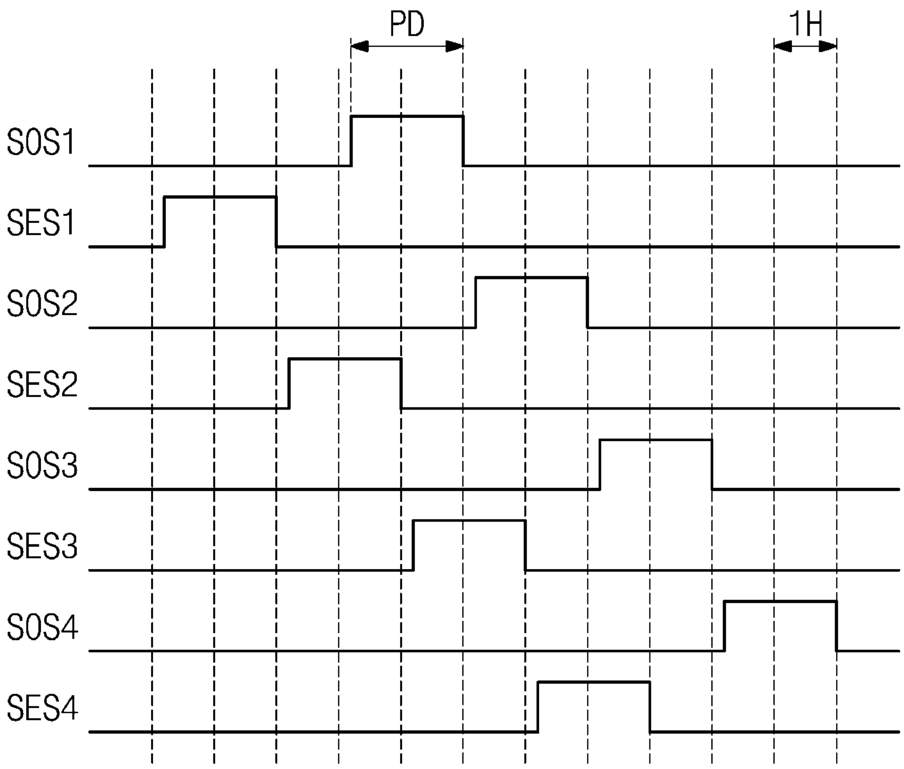
FIG. 7B is a timing diagram illustrating an operation of a scan driver, according to an embodiment of the present disclosure.

FIG. 7A is a schematic block diagram of a scan driver, according to an embodiment of the present disclosure. FIG. 7B is a timing diagram illustrating an operation of a scan driver, according to an embodiment of the present disclosure.

Referring to FIGS. 6A, 7A, and 7B, the scan driver SDV may operate as a shift register, and may include a plurality of stages ST1*a* to ST1*d* and ST2*a* to ST2*d* that respectively provide scan signals SOS1, SES1, SOS2, SES2, SOS3, SES3, SOS4, and SES4 to the plurality of scan lines SO1, SE1, SO2, SE2, SO3, SE3, SO4, and SE4.

Each of the plurality of stages ST1*a* to ST1*d* and ST2*a* to ST2*d* may be connected to a clock line (not shown) to receive a clock signal, of which the phase is delayed by more than 1 horizontal period 1H, from the clock line and to output a scan signal having a pulse width PD greater than 1 horizontal period 1H to the corresponding scan line. In this case, 1 horizontal period 1H may be 1.47 microseconds (μs). The pulse width PD may be greater than 1 horizontal period and less than 2 horizontal periods. For example, the pulse width PD may have 1.8 horizontal periods.

The plurality of stages ST1*a* to ST1*d* and ST2*a* to ST2*d* may include the first stage ST1*a*, the second stage ST2*a*, the third stage ST1*b*, the fourth stage ST2*b*, the fifth stage ST1*c*, the sixth stage ST2*c*, the seventh stage ST1*d*, and the eighth stage ST2*d*.

The plurality of stages ST1*a* to ST1*d* and ST2*a* to ST2*d* may belong to a first stage group STG1 or a second stage group STG2 that are connected. Among the plurality of stages ST1*a* to ST1*d* and ST2*a* to ST2*d*, the odd-numbered stages ST1*a* to ST1*d* may be defined as the first stage group STG1. For example, the first stage ST1*a*, the third stage ST1*b*, the fifth stage ST1*c*, and the seventh stage ST1*d* may be defined as the first stage group STG1. Among the plurality of stages ST1*a* to ST1*d* and ST2*a* to ST2*d*, the even-numbered stages ST2*a* to ST2*d* may be defined as the second stage group STG2. For example, the second stage ST2*a*, the fourth stage ST2*b*, the sixth stage ST2*c*, and the eighth stage ST2*d* may be defined as the second stage group STG2.

The plurality of stages ST1*a* to ST1*d* and ST2*a* to ST2*d* may output the plurality of scan signals SOS1, SES1, SOS2, SES2, SOS3, SES3, SOS4, and SES4, respectively. Each of the plurality of scan signals SOS1, SES1, SOS2, SES2, SOS3, SES3, SOS4, and SES4 may have a pulse width PD greater than 1 horizontal period 1H and less than 2 horizontal periods. For example, the pulse width PD may have 1.8 horizontal periods. The scan signals SOS1, SES1, SOS2, SES2, SOS3, SES3, SOS4, and SES4 output to output terminals of the stages ST1*a* to ST1*d* and ST2*a* to ST2*d* may be supplied to the corresponding scan lines, and, at the same time, may be provided to input terminals of subsequent stages as start signals of the subsequent stages.

The plurality of scan signals SOS1, SES1, SOS2, SES2, SOS3, SES3, SOS4, and SES4 may include the plurality of first scan signals SOS1, SOS2, SOS3, and SOS4 output from the first stage group STG1, and the plurality of second scan signals SES1, SES2, SES3, and SES4 output from the second stage group STG2. The plurality of first scan signals SOS1, SOS2, SOS3, and SOS4 may include the 1-1st scan signal SOS1, the 1-2nd scan signal SOS2, the 1-3rd scan signal SOS3, and the 1-4th scan signal SOS4. The plurality of second scan signals SES1, SES2, SES3, and SES4 may include the 2-1st scan signal SES1, the 2-2nd scan signal SES2, the 2-3rd scan signal SES3, and the 2-4th scan signal SES4.

The plurality of first scan signals SOS1, SOS2, SOS3, and SOS4 and the plurality of second scan signals SES1, SES2, SES3, and SES4 may be alternately output, respectively. In this case, first to n-th data signals corresponding to first to m-th scan lines are sequentially applied to data lines based on the plurality of scan signals SOS1, SES1, SOS2, SES2, SOS3, SES3, SOS4, and SES4.

The scan driver SDV may further include at least one dummy stage STDa or STDb. FIG. 7A shows a configuration further including the two dummy stages STDa and STDb.

The dummy stages STDa and STDb according to an embodiment of the present disclosure may belong to the first stage group STG1. The dummy stages STDa and STDb may include the first dummy stage STDa and the second dummy stage STDb. The first dummy stage STDa may be connected to the second dummy stage STDb. The second dummy stage STDb may be connected to the first stage ST1*a*. The dummy stages STDa and STDb may shift the timing at which the 1-1st scan signal SOS1 is provided.

One dummy stage may output a dummy scan signal SDS1 or SDS2 to the next dummy stage or the next stage.

The first dummy stage STDa may receive a first start signal SSP1 from the timing controller T-CON (see FIG. 2). The first dummy stage STDa may output the first dummy scan signal SDS1.

The second dummy stage STDb may be connected to the first dummy stage STDa. The second dummy stage STDb may receive the first dummy scan signal SDS1. The second dummy stage STDb may output the second dummy scan signal SDS2.

The first stage ST1*a* may be connected to the second dummy stage STDb. The first stage ST1*a* may receive the second dummy scan signal SDS2. The first stage ST1*a* may be connected to the first scan line SO1. The first stage ST1*a* may output the 1-1st scan signal SOS1.

The third stage ST1*b* may be connected to the first stage ST1*a*. The third stage ST1*b* may receive the 1-1st scan signal SOS1. The third stage ST1*b* may be connected to the third scan line SO2. The third stage ST1*b* may output the 1-2nd scan signal SOS2.

The fifth stage ST1*c* may be connected to the third stage ST1*b*. The fifth stage ST1*c* may receive the 1-2nd scan signal SOS2. The fifth stage ST1*c* may be connected to the fifth scan line SO3. The fifth stage ST1*c* may output the 1-3rd scan signal SOS3.

The seventh stage ST1*d* may be connected to the fifth stage ST1*c*. The seventh stage ST1*d* may receive the 1-3rd scan signal SOS3. The seventh stage ST1*d* may be connected to the seventh scan line SO4. The seventh stage ST1*d* may output the 1-4th scan signal SOS4.

The second stage ST2*a* may receive a second start signal SSP2 from the timing controller T-CON (see FIG. 2). The second start signal SSP2 may be output at a different point in time from the first start signal SSP1. For example, the second start signal SSP2 may be shifted by 1 horizontal period 1H from the first start signal SSP1. The second stage ST2*a* may be connected to the second scan line SE1. The second stage ST2*a* may output the 2-1st scan signal SES1.

The fourth stage ST2*b* may be connected to the second stage ST2*a*. The fourth stage ST2*b* may receive the 2-1st scan signal SES1. The fourth stage ST2*b* may be connected to the fourth scan line SE2. The fourth stage ST2*b* may output the 2-2nd scan signal SES2.

The sixth stage ST2*c* may be connected to the fourth stage ST2*b*. The sixth stage ST2*c* may receive the 2-2nd scan signal SES2. The sixth stage ST2*c* may be connected to the sixth scan line SE3. The sixth stage ST2*c* may output the 2-3rd scan signal SES3.

The eighth stage ST2*d* may be connected to the sixth stage ST2*c*. The eighth stage ST2*d* may receive the 2-3rd scan signal SES3. The eighth stage ST2*d* may be connected to the eighth scan line SE4. The eighth stage ST2*d* may output the 2-4th scan signal SES4.

The 1-1st scan signal SOS1 provided to the first scan line SO1 may be delayed by 3 horizontal periods or more as compared to the 2-1st scan signal SES1 provided to the second scan line SE1. For this reason, active periods of scan signals on scan lines adjacent to each other among the plurality of scan lines SO1 to SO4 and SE1 to SE4 may not overlap each other. For example, the active period of the 2-1st scan signal SES1 provided to the second scan line SE1 may not overlap the active period of each of the 1-1st scan signal SOS1 provided to the adjacent first scan line SO1 and the 1-2nd scan signal SOS2 provided to the adjacent third scan line SO2.

For example, the 2-1st scan signal SES1, the 1-1st scan signal SOS1, and the 1-2nd scan signal SOS2 may be output in the order of the 2-1st scan signal SES1, the 1-1st scan signal SOS1, and the 1-2nd scan signal SOS2. When the 1-1st scan signal SOS1 has a first active period, the 2-1st scan signal SES1 has a second active period, and the 1-2nd scan signal SOS2 has a third active period, and the first active period, the second active period, and the third active period may not overlap each other. In other words, no more than one of the activescan signals SES1, SOS1, and SOS2 provided to adjacent scan lines may be active at a given time.

One scan signal of the plurality of scan signals SOS1, SES1, SOS2, SES2, SOS3, SES3, SOS4, and SES4 may be provided to one scan line of the plurality of scan lines SO1 to SO4 and SE1 to SE4. The next scan signal that is output immediately after the one scan signal of the plurality of scan signals SOS1, SES1, SOS2, SES2, SOS3, SES3, SOS4, and SES4 may be provided to another scan line spaced from the one scan line with at least one intervening scan line among the others of the plurality of scan lines SO1 to SO4 and SE1 to SE4 interposed between the one scan line and the another scan line.

For example, the 2-3rd scan signal SES3 may be provided to the sixth scan line SE3. The 1-2nd scan signal SOS2, which is the next scan signal that is output immediately after the 2-3rd scan signal SES3, is provided to the third scan line SO2, which is spaced from the sixth scan line SE3 with at least one scan line (e.g., SE2 and SO3) interposed therebetween.

Referring to FIG. 7B, the active periods of one scan signal that is output and a next scan signal that is output immediately after the one scan signal may partially overlap. However, active periods of scan signals that are output to adjacent scan lines do not overlap, and the active period of the next scan signal may be delayed by 1 horizontal period 1H from the one scan signal. When a next scan signal is output "immediately after" one scan signal, that means there is no intervening scan signal that goes active between the one scan signal and the next scan signal.

Unlike an embodiment of the present disclosure, when active periods of scan signals on scan lines adjacent to each other among the plurality of scan lines SO1 to SO4 and SE1 to SE4 overlap each other, the gate node of the driving transistor T1 (see FIG. 5) may be affected by a kickback voltage by a signal provided to a gate node of another adjacent driving transistor. However, according to an embodiment of the present disclosure, active periods of scan signals of scan lines adjacent to each other among the plurality of scan lines SO1 to SO4 and SE1 to SE4 may not overlap each other, so that no more than one of any adjacently-positioned scan lines SO1 to SO4 and SE1 to SE4 is active at a given time. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Moreover, according to an embodiment of the present disclosure, scan lines that receive scan signals with active periods that overlap each other may be spaced from each other by a predetermined minimum distance to reduce or remove the influence of the parasitic capacitors CP1 and CP2. The predetermined minimum distance may be 50 μm. The scan driver SDV may be driven such that a distance between scan lines receiving scan signals with overlapping active periods satisfies the predetermined minimum distance. The degradation of display quality due to a kickback voltage may be prevented. Accordingly, the display device DD (see FIG. 1) with improved display quality may be provided.

In FIGS. 7A and 7B, the operation of the scan driver SDV together with a connection relationship between the plurality of pixels PX and the plurality of scan lines SO1 to SOm and SE1 to SEm in FIG. 6A is described. However, according to an embodiment of the present disclosure, the operation of scan driver SDV is not limited thereto. For example, the operation of the scan driver SDV in FIG. 7B may be applied to the connection relationship of the plurality of pixels PX and the plurality of scan lines SO1 to SOm and SE1 to SEm in FIGS. 6A and 6B.

Figure 8A:
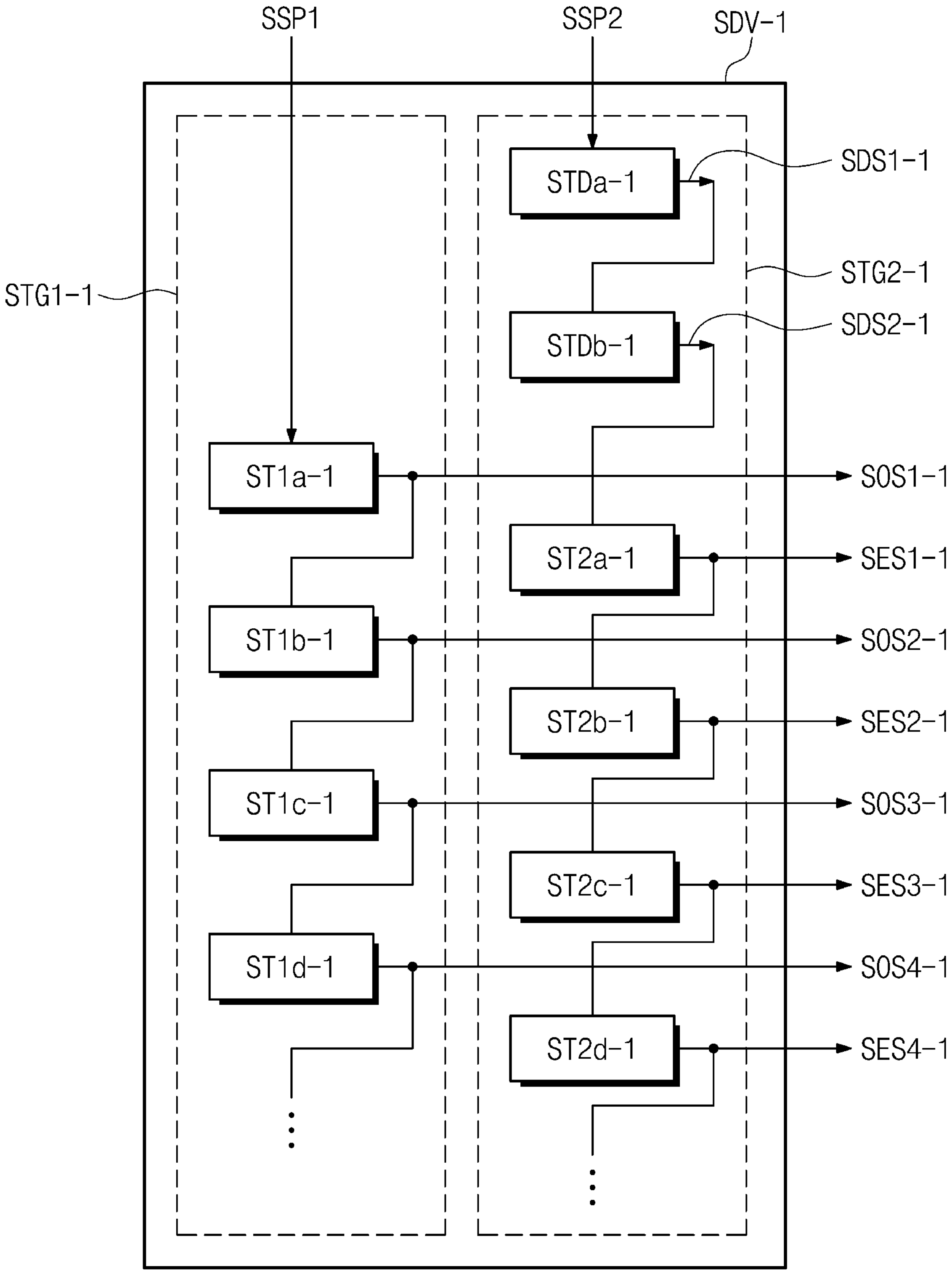
FIG. 8A is a schematic block diagram of a scan driver, according to an embodiment of the present disclosure.
Figure 8B:
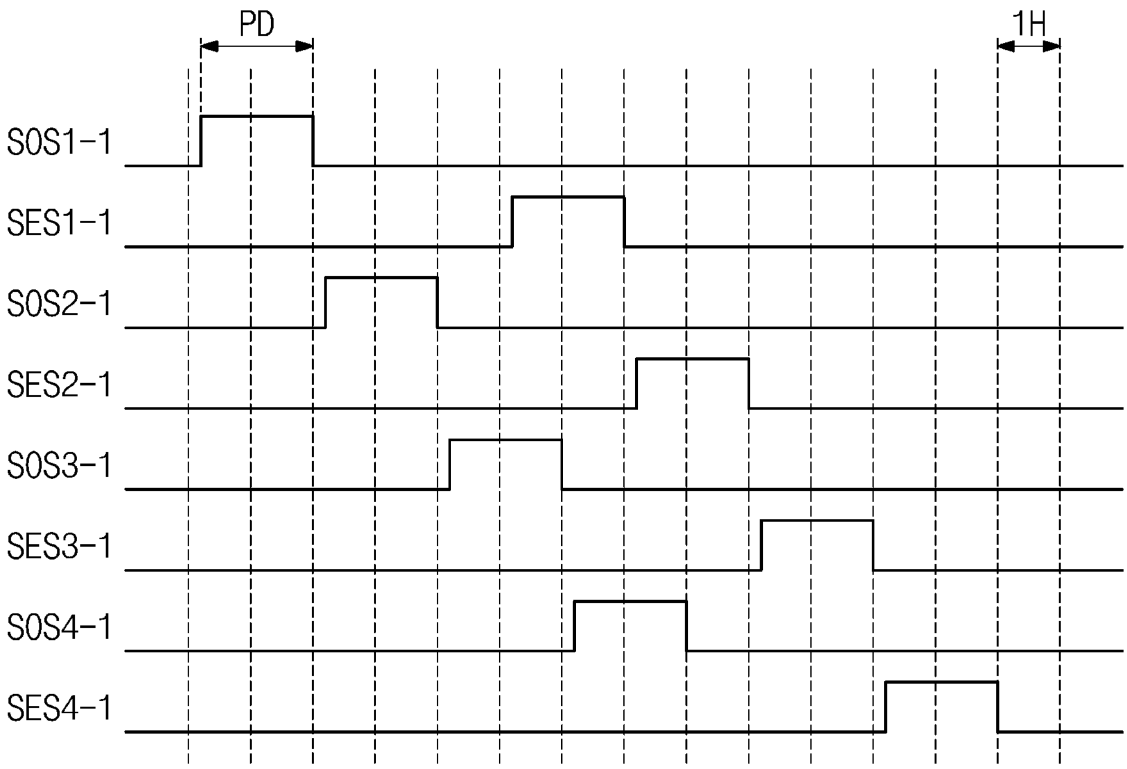
FIG. 8B is a timing diagram illustrating an operation of a scan driver, according to an embodiment of the present disclosure.

FIG. 8A is a schematic block diagram of a scan driver according to an embodiment of the present disclosure. FIG. 8B is a timing diagram illustrating an operation of a scan driver, according to an embodiment of the present disclosure. In the description of FIGS. 8A and 8B, the same reference numerals are assigned to the same components described with reference to FIGS. 7A and 7B, and thus the descriptions thereof are omitted to avoid redundancy.

Referring to FIGS. 6A, 8A, and 8B, a scan driver SDV-1 may include a plurality of stages ST1*a*-1 to ST1*d*-1 and ST2*a*-1 to ST2*d*-1 and at least one dummy stage STDa-1 or STDb-1.

The plurality of stages ST1*a*-1 to ST1*d*-1 and ST2*a*-1 to ST2*d*-1 may include the first stage ST1*a*-1, the second stage ST2*a*-1, the third stage ST1*b*-1, the fourth stage ST2*b*-1, the fifth stage ST1*c*-1, the sixth stage ST2*c*-1, the seventh stage ST1*d*-1, and the eighth stage ST2*d*-1.

The plurality of stages ST1*a*-1 to ST1*d*-1 and ST2*a*-1 to ST2*d*-1 may belong to a first stage group STG1-1 or a second stage group STG2-1 that are connected. Among the plurality of stages ST1*a*-1 to ST1*d*-1 and ST2*a*-1 to ST2*d*-1, the odd-numbered stages ST1*a*-1 to ST1*d*-1 may be defined as the first stage group STG1-1. For example, the first stage ST1*a*-1, the third stage ST1*b*-1, the fifth stage ST1*c*-1, and the seventh stage ST1*d*-1 may be defined as the first stage group STG1-1. Among the plurality of stages ST1*a*-1 to ST1*d*-1 and ST2*a*-1 to ST2*d*-1, the even-numbered stages ST2*a*-1 to ST2*d*-1 may be defined as the second stage group STG2-1. For example, the second stage ST2*a*-1, the fourth stage ST2*b*-1, the sixth stage ST2*c*-1, and the eighth stage ST2*d*-1 may be defined as the second stage group STG2-1.

The plurality of scan signals SOS1-1, SES1-1, SOS2-1, SES2-1, SOS3-1, SES3-1, SOS4-1, and SES4-1 may include the plurality of first scan signals SOS1-1, SOS2-1, SOS3-1, and SOS4-1 output from the first stage group STG1-1, and the plurality of second scan signals SES1-1, SES2-1, SES3-1, and SES4-1 output from the second stage group STG2-1. The plurality of first scan signals SOS1-1, SOS2-1, SOS3-1, and SOS4-1 may include the 1-1st scan signal SOS1-1, the 1-2nd scan signal SOS2-1, the 1-3rd scan signal SOS3-1, and the 1-4th scan signal SOS4-1. The plurality of second scan signals SES1-1, SES2-1, SES3-1, and SES4-1 may include the 2-1st scan signal SES1-1, the 2-2nd scan signal SES2-1, the 2-3rd scan signal SES3-1, and the 2-4th scan signal SES4-1.

The first stage ST1*a*-1 may receive the first start signal SSP1 from the timing controller T-CON (see FIG. 2). The first stage ST1*a*-1 may be connected to the first scan line SO1. The first stage ST1*a*-1 may output the 1-1st scan signal SOS1-1.

The third stage ST1*b*-1 may be connected to the first stage ST1*a*-1. The third stage ST1*b*-1 may receive the 1-1st scan signal SOS1-1. The third stage ST1*b*-1 may be connected to the third scan line SO2-1. The third stage ST1*b*-1 may output the 1-2nd scan signal SOS2-1.

The fifth stage ST1*c*-1 may be connected to the third stage ST1*b*-1. The fifth stage ST1*c*-1 may receive the 1-2nd scan signal SOS2-1. The fifth stage ST1*c*-1 may be connected to the fifth scan line SO3-1. The fifth stage ST1*c*-1 may output the 1-3rd scan signal SOS3-1.

The seventh stage ST1*d*-1 may be connected to the fifth stage ST1*c*-1. The seventh stage ST1*d*-1 may receive the 1-3rd scan signal SOS3-1. The seventh stage ST1*d*-1 may be connected to the seventh scan line SO4-1. The seventh stage ST1*d*-1 may output the 1-4th scan signal SOS4-1.

The dummy stages STDa-1 and STDb-1 according to an embodiment of the present disclosure may belong to the second stage group STG2-1.

The dummy stages STDa-1 and STDb-1 may include the first dummy stage STDa-1 and the second dummy stage STDb-1. The first dummy stage STDa-1 may be connected to the second dummy stage STDb-1. The second dummy stage STDb-1 may be connected to the first stage ST1*a*-1. The dummy stages STDa-1 and STDb-1 may shift the timing at which the 2-1st scan signal SES1-1 is provided.

The first dummy stage STDa-1 may receive the second start signal SSP2 from the timing controller T-CON (see FIG. 2). The first dummy stage STDa-1 may output the first dummy scan signal SDS1-1.

The second dummy stage STDb-1 may be connected to the first dummy stage STDa-1. The second dummy stage STDb-1 may receive the first dummy scan signal SDS1-1. The second dummy stage STDb-1 may output the second dummy scan signal SDS2-1.

The second stage ST2*a*-1 may be connected to the second dummy stage STDb-1. The second stage ST2*a*-1 may receive the second dummy scan signal SDS2-1. The second stage ST2*a*-1 may be connected to the second scan line SE1. The second stage ST2*a*-1 may output the 2-1st scan signal SES1-1.

The fourth stage ST2*b*-1 may be connected to the second stage ST2*a*-1. The fourth stage ST2*b*-1 may receive the 2-1st scan signal SES1-1. The fourth stage ST2*b*-1 may be connected to the fourth scan line SE2. The fourth stage ST2*b*-1 may output the 2-2nd scan signal SES2-1.

The sixth stage ST2*c*-1 may be connected to the fourth stage ST1*b*-1. The sixth stage ST2*c*-1 may receive the 2-2nd scan signal SES2-1. The sixth stage ST2*c*-1 may be connected to the sixth scan line SE3. The sixth stage ST2*c*-1 may output the 2-3rd scan signal SES3-1.

The eighth stage ST2*d*-1 may be connected to the sixth stage ST2*c*-1. The eighth stage ST2*d*-1 may receive the 2-3rd scan signal SES3-1. The eighth stage ST2*d*-1 may be connected to the eighth scan line SE4. The eighth stage ST2*d*-1 may output the 2-4th scan signal SES4-1.

The 2-1st scan signal SES1-1 provided to the first scan line SE1 may be delayed by 5 horizontal periods or more as compared to the 1-1st scan signal SOS1-1 provided to the second scan line SO1. For this reason, active periods of scan signals of scan lines adjacent to each other among the plurality of scan lines SO1 to SO4 and SE1 to SE4 may not overlap each other. For example, the active period of the 2-1st scan signal SES1-1 provided to the second scan line SE1 may not overlap the active period of each of the 1-1st scan signal SOS1-1 provided to the adjacent first scan line SO1 and the 1-2nd scan signal SOS2-1 provided to the adjacent third scan line SO2.

For example, the 1-1st scan signal SOS1-1, the 1-2nd scan signal SOS2-1, and the 2-1st scan signal SES1-1 may be output in the order of the 1-1st scan signal SOS1-1, the 1-2nd scan signal SOS2-1, and the 2-1st scan signal SES1-1.

One scan signal of the plurality of scan signals SOS1-1, SES1-1, SOS2-1, SES2-1, SOS3-1, SES3-1, SOS4-1, and SES4-1 may be provided to one scan line of the plurality of scan lines SO1 to SO4 and SE1 to SE4. A next scan signal that is output immediately after the scan signal of the plurality of scan signals SOS1-1, SES1-1, SOS2-1, SES2-1, SOS3-1, SES3-1, SOS4-1, and SES4-1 may be provided to another scan line spaced apart from the one scan line with at least one intervening scan line among the others of the plurality of scan lines SO1 to SO4 and SE1 to SE4 interposed between the one scan line and the another scan line.

For example, the 1-3rd scan signal SOS3-1 may be provided to the fifth scan line SO3. The 2-1st scan signal SES1-1, which is the first signal that is output after the 1-3rd scan signal SOS3-1, is provided to the second scan line SE1, which is spaced from the fifth scan line SO3 with at least one scan line (e.g., SE2 and SO2) interposed therebetween.

According to an embodiment of the present disclosure, active periods of scan signals on adjacently-positioned scan lines among the plurality of scan lines SO1 to SO4 and SE1 to SE4 may not overlap each other. This way, the influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

In FIGS. 8A and 8B, the operation of the scan driver SDV-1 together with a connection relationship between the plurality of pixels PX and the plurality of scan lines SO1 to SOm and SE1 to SEm in FIG. 6A is described. However, according to an embodiment of the present disclosure, the operation of scan driver SDV-1 is not limited thereto. For example, the operation of the scan driver SDV-1 in FIG. 8B may be applied to the connection relationship of the plurality of pixels PX and the plurality of scan lines SO1 to SOm and SE1 to SEm in FIGS. 6A to 6D.

Figure 9A:
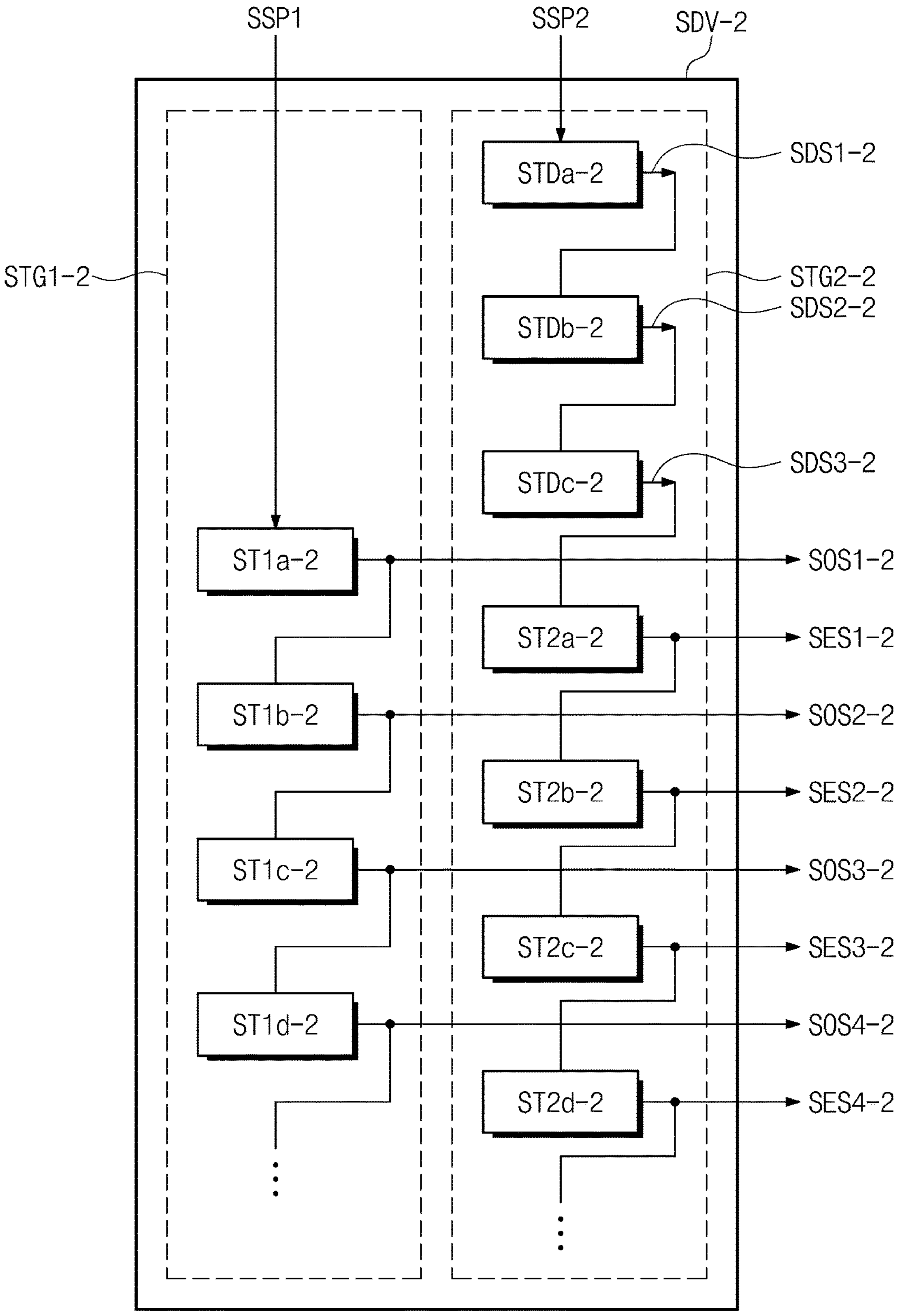
FIG. 9A is a schematic block diagram of a scan driver, according to an embodiment of the present disclosure.
Figure 9B:
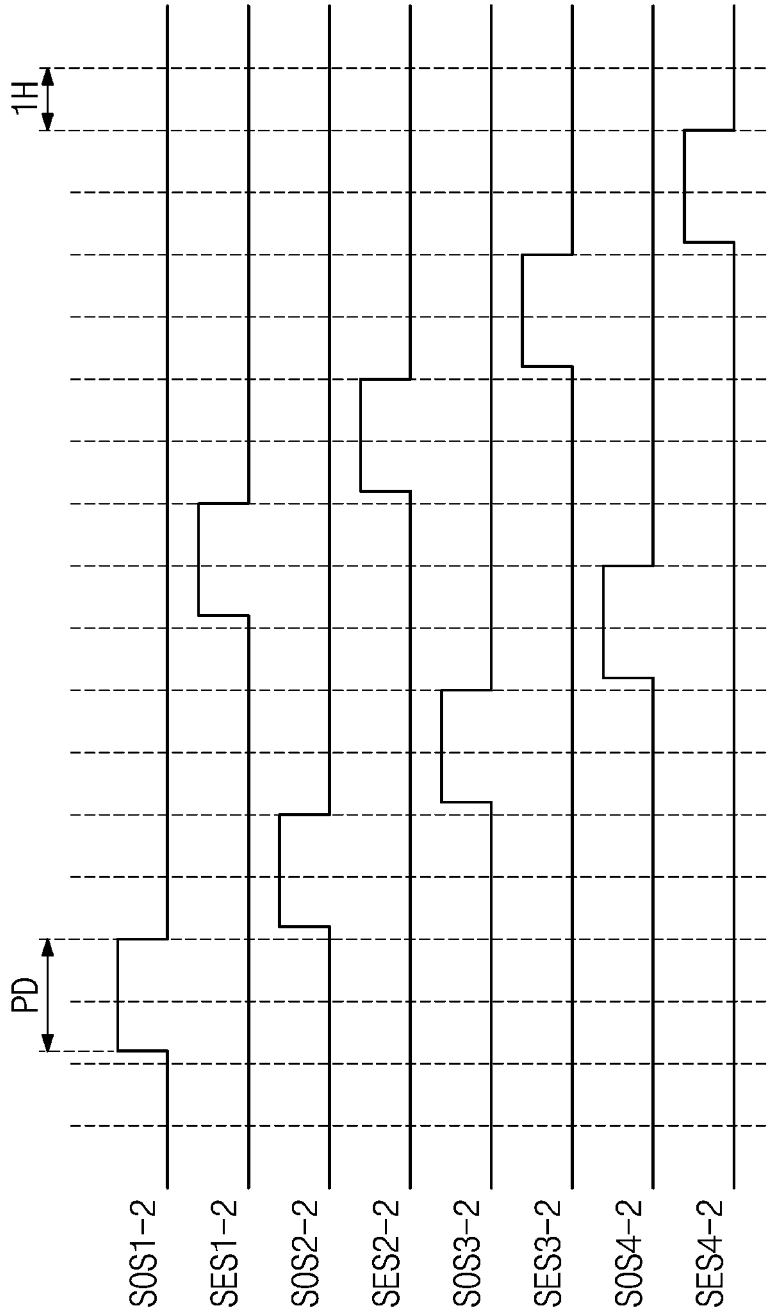
FIG. 9B is a timing diagram illustrating an operation of a scan driver, according to an embodiment of the present disclosure.

FIG. 9A is a schematic block diagram of a scan driver, according to an embodiment of the present disclosure. FIG. 9B is a timing diagram illustrating an operation of a scan driver, according to an embodiment of the present disclosure. In the description of FIGS. 9A and 9B, the same reference numerals are assigned to the same components described with reference to FIGS. 7A, 7B, and 8B, and thus the descriptions thereof are omitted to avoid redundancy.

Referring to FIGS. 6A, 9A, and 9B, a scan driver SDV-2 may include a plurality of stages ST1*a*-2 to ST1*d*-2 and ST2*a*-2 to ST2*d*-2 and at least one dummy stage of STDa-2, STDb-2, or STDc-2.

The plurality of dummy stages STDa-2, STDb-2, and STDc-2 may belong to a second stage group STG2-2.

The odd-numbered stages ST1*a*-2 to ST1*d*-2 may output a plurality of first scan signals SOS1-2, SOS2-2, SOS3-2, and SOS4-2, respectively. The even-numbered stages ST2*a*-2 to ST2*d*-2 may output a plurality of second scan signals SES1-2, SES2-2, SES3-2, and SES4-2, respectively.

The timing of the plurality of second scan signals SES1-2, SES2-2, SES3-2, and SES4-2 that are provided to a plurality of scan lines SE1 to SEm may be shifted by the plurality of dummy stages STDa-2, STDb-2, and STDc-2. The scan driver SDV-2 may control the amount of shift by the number of dummy stages. As compared to the scan driver SDV-1 (see FIG. 8A) shown in FIG. 8A, the scan driver SDV-2 shown in FIG. 9A may further include an additional dummy stage, and the 2-1st scan signal SES1-2 may be additionally shifted.

The plurality of dummy stages STDa-2, STDb-2, and STDc-2 may include the first dummy stage STDa-2, the second dummy stage STDb-2, and the third dummy stage STDc-2.

The first dummy stage STDa-2 may receive the second start signal SSP2 from the timing controller T-CON (see FIG. 2). The first dummy stage STDa-2 may output the first dummy scan signal SDS1-2.

The second dummy stage STDb-2 may be connected to the first dummy stage STDa-2. The second dummy stage STDb-2 may receive the first dummy scan signal SDS1-2. The second dummy stage STDb-2 may output the second dummy scan signal SDS2-2.

The third dummy stage STDc-2 may be connected to the second dummy stage STDb-2. The third dummy stage STDc-2 may receive the second dummy scan signal SDS2-2. The third dummy stage STDc-2 may output a third dummy scan signal SDS3-2.

The second stage ST2*a*-1 may be connected to the third dummy stage STDc-2. The second stage ST2*a*-1 may receive the third dummy scan signal SDS3-2.

The 2-1st scan signal SES1-2 provided to the first scan line SE1 may be delayed by 7 horizontal periods or more as compared to the 1-1st scan signal SOS1-2 provided to the second scan line SO1. For this reason, activee periods of scan signals of scan lines adjacent to each other among the plurality of scan lines SO1 to SO4 and SE1 to SE4 may not overlap each other. For example, the active period of the 2-1st scan signal SES1-2 provided to the second scan line SE1 may not overlap the active period of each of the 1-1st scan signal SOS1-2 provided to the adjacent first scan line SO1 and the 1-2nd scan signal SOS2-2 provided to the adjacent third scan line SO2.

For example, the 1-1st scan signal SOS1-2, the 1-2nd scan signal SOS2-2, and the 2-1st scan signal SES1-2 may be output in the order of the 1-1st scan signal SOS1-2, the 1-2nd scan signal SOS2-2, and the 2-1st scan signal SES1-2.

One scan signal of the plurality of scan signals SOS1-2, SES1-2, SOS2-2, SES2-2, SOS3-2, SES3-2, SOS4-2, and SES4-2 may be provided to one scan line of the plurality of scan lines SO1 to SO4 and SE1 to SE4. A next scan signal output immediately after the one scan signal of the plurality of scan signals SOS1-2, SES1-2, SOS2-2, SES2-2, SOS3-2, SES3-2, SOS4-2, and SES4-2 may be provided to another scan line spaced from the one scan line with at least one intervening scan line among the others of the plurality of scan lines SO1 to SO4 and SE1 to SE4 interposed between the one scan line and the another scan line.

For example, the 1-4th scan signal SOS4-2 may be provided to the seventh scan line SO4. The 2-1st scan signal SES1-2, which is the first signal to be output after the 1-4th scan signal SOS4-2, is provided to the second scan line SE1, which is spaced from the seventh scan line SO4 with at least one scan line (e.g., SO2, SE2, SO3, and SE3) interposed therebetween.

According to an embodiment of the present disclosure, active periods of scan signals on adjacently-positioned scan lines among the plurality of scan lines SO1 to SO4 and SE1 to SE4 may not overlap each other. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

In FIGS. 9A and 9B, the operation of the scan driver SDV-2 together with a connection relationship between the plurality of pixels PX and the plurality of scan lines SO1 to SOm and SE1 to SEm in FIG. 6A is described. However, according to an embodiment of the present disclosure, the operation of scan driver SDV-2 is not limited thereto. For example, the operation of the scan driver SDV-2 in FIG. 9B may be applied to the connection relationship of the plurality of pixels PX and the plurality of scan lines SO1 to SOm and SE1 to SEm in FIGS. 6A to 6D.

Figure 10A:
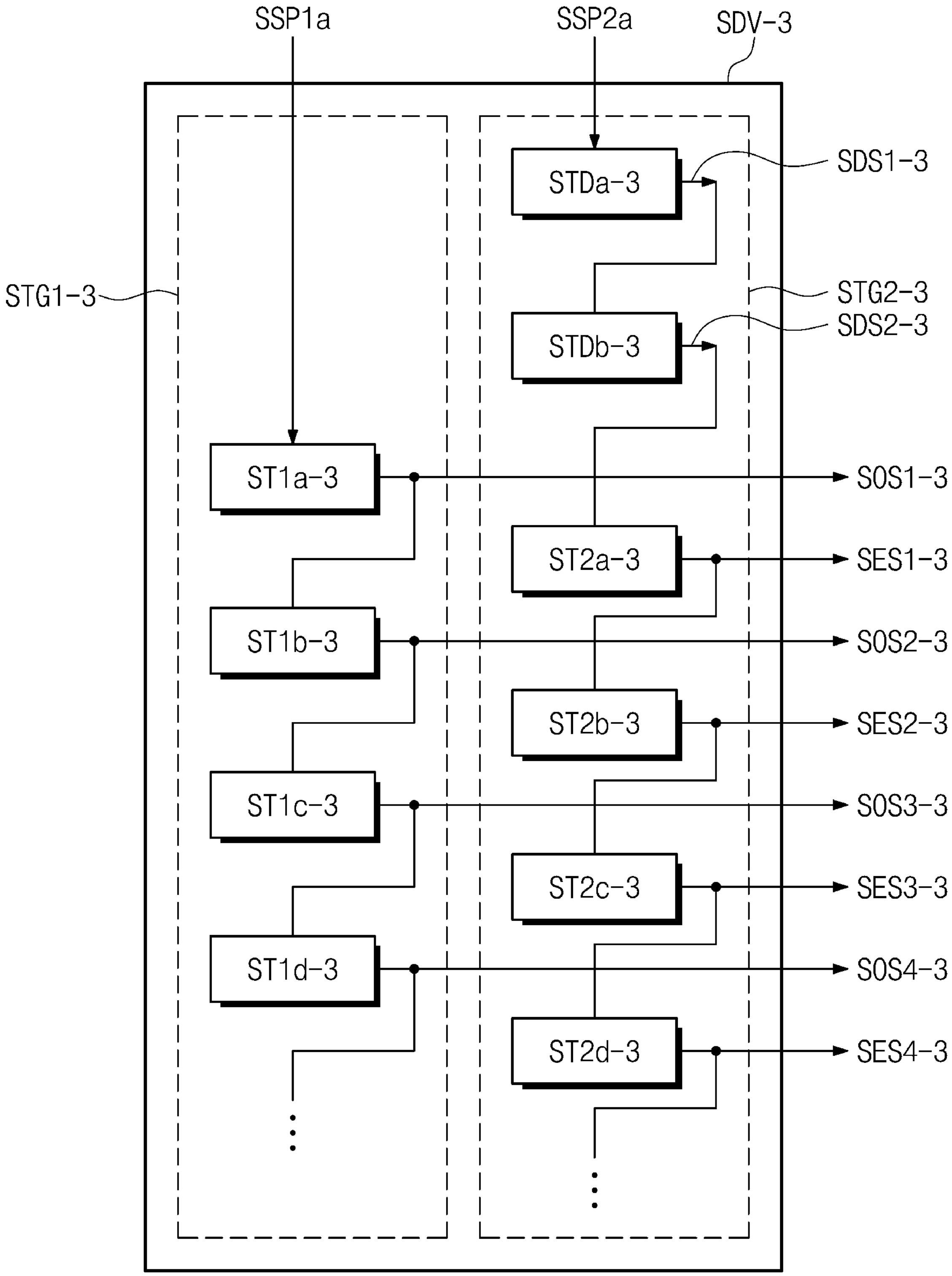
FIG. 10A is a schematic block diagram of a scan driver, according to an embodiment of the present disclosure.
Figure 10B:
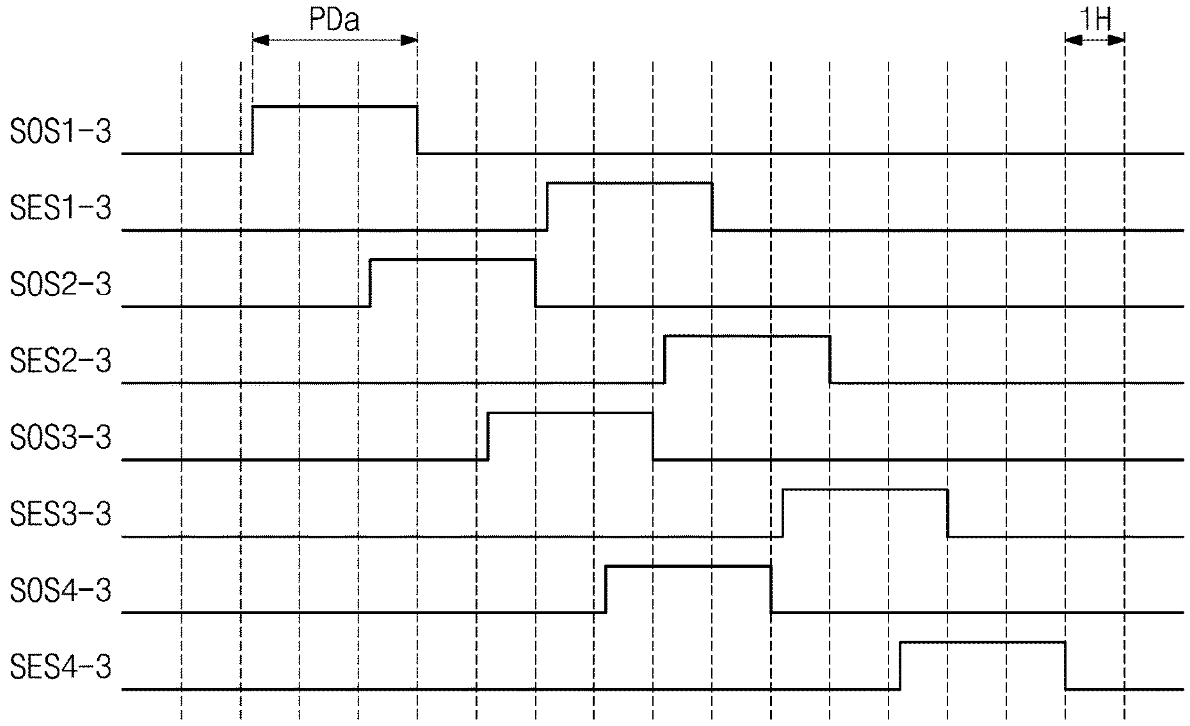
FIG. 10B is a timing diagram illustrating an operation of a scan driver, according to an embodiment of the present disclosure.

FIG. 10A is a schematic block diagram of a scan driver, according to an embodiment of the present disclosure. FIG. 10B is a timing diagram illustrating an operation of a scan driver, according to an embodiment of the present disclosure.

Referring to FIGS. 6A, 10A, and 10B, a scan driver SDV-3 may include a plurality of stages ST1*a*-3 to ST1*d*-3 and ST2*a*-3 to ST2*d*-3 and at least one dummy stage STDa-3 or STDb-3.

The plurality of stages ST1*a*-3 to ST1*d*-3 and ST2*a*-3 to ST2*d*-3 may output a plurality of scan signals SOS1-3, SES1-3, SOS2-3, SES2-3, SOS3-3, SES3-3, SOS4-3, and SES4-3, respectively. Each of the plurality of scan signals SOS1-3, SES1-3, SOS2-3, SES2-3, SOS3-3, SES3-3, SOS4-3, and SES4-3 may have a pulse width PDa greater than 2 horizontal periods and less than 3 horizontal periods. For example, the pulse width PDa may have 2.8 horizontal periods. The scan signals SOS1-3, SES1-3, SOS2-3, SES2-3, SOS3-3, SES3-3, SOS4-3, and SES4-3 output to output terminals of the stages ST1*a*-3 to ST1*d*-3 and ST2*a*-3 to ST2*d*-3 may be supplied to the corresponding scan lines, and, at the same time, may be provided to input terminals of subsequent stages as start signals of the subsequent stages.

Each of the plurality of stages ST1*a*-3 to ST1*d*-3 and ST2*a*-3 to ST2*d*-3 may be connected to a clock line (not shown) to receive a clock signal, of which the phase is delayed by more than 2 horizontal periods, from the clock line and to output a scan signal having a pulse width PD greater than 2 horizontal periods to the corresponding scan line. In this case, 1 horizontal period 1H may be 1.47 microseconds (μs). The pulse width PDa may be greater than 2 horizontal periods and less than 3 horizontal periods. For example, the pulse width PDa may have 2.8 horizontal periods.

The plurality of stages ST1*a*-3 to ST1*d*-3 and ST2*a*-3 to ST2*d*-3 may include the first stage ST1*a*-3, the second stage ST2*a*-3, the third stage ST1*b*-3, the fourth stage ST2*b*-3, the fifth stage ST1*c*-3, the sixth stage ST2*c*-3, the seventh stage ST1*d*-3, and the eighth stage ST2*d*-3.

The plurality of stages ST1*a*-3 to ST1*d*-3 and ST2*a*-3 to ST2*d*-3 may belong to a first stage group STG1-3 or a second stage group STG2-3 that are connected. Among the plurality of stages ST1*a*-3 to ST1*d*-3 and ST2*a*-3 to ST2*d*-3, the odd-numbered stages ST1*a*-3 to ST1*d*-3 may be defined as the first stage group STG1-3. For example, the first stage ST1*a*-3, the third stage ST1*b*-3, the fifth stage ST1*c*-3, and the seventh stage ST1*d*-3 may be defined as the first stage group STG1-3. Among the plurality of stages ST1*a*-3 to ST1*d*-3 and ST2*a*-3 to ST2*d*-3, the even-numbered stages ST2*a*-3 to ST2*d*-3 may be defined as the second stage group STG2-3. For example, the second stage ST2*a*-3, the fourth stage ST2*b*-3, the sixth stage ST2*c*-3, and the eighth stage ST2*d*-3 may be defined as the second stage group STG2-3.

The plurality of scan signals SOS1-3, SES1-3, SOS2-3, SES2-3, SOS3-3, SES3-3, SOS4-3, and SES4-3 may include the plurality of first scan signals SOS1-3, SOS2-3, SOS3-3, and SOS4-3 output from the first stage group STG1-3, and the plurality of second scan signals SES1-3, SES2-3, SES3-3, and SES4-3 output from the second stage group STG2-3. The plurality of first scan signals SOS1-3, SOS2-3, SOS3-3, and SOS4-3 may include the 1-1st scan signal SOS1-3, the 1-2nd scan signal SOS2-3, the 1-3rd scan signal SOS3-3, and the 1-4th scan signal SOS4-3. The plurality of second scan signals SES1-3, SES2-3, SES3-3, and SES4-3 may include the 2-1st scan signal SES1-3, the 2-2nd scan signal SES2-3, the 2-3rd scan signal SES3-3, and the 2-4th scan signal SES4-3.

The first stage ST1*a*-3 may receive the first start signal SSP1*a* from the timing controller T-CON (see FIG. 2). The first stage ST1*a*-3 may be connected to the first scan line SO1-2. The first stage ST1*a*-3 may output the 1-1st scan signal SOS1-3.

The third stage ST1*b*-3 may be connected to the first stage ST1*a*-3. The third stage ST1*b*-3 may receive the 1-1st scan signal SOS1-3. The third stage ST1*b*-3 may be connected to the third scan line SO2-2. The third stage ST1*b*-3 may output the 1-2nd scan signal SOS2-3.

The fifth stage ST1*c*-3 may be connected to the third stage ST1*b*-3. The fifth stage ST1*c*-3 may receive the 1-2nd scan signal SOS2-3. The fifth stage ST1*c*-3 may be connected to the fifth scan line SO3-2. The fifth stage ST1*c*-3 may output the 1-3rd scan signal SOS3-3.

The seventh stage ST1*d*-3 may be connected to the fifth stage ST1*c*-3. The seventh stage ST1*d*-3 may receive the 1-3rd scan signal SOS3-3. The seventh stage ST1*d*-3 may be connected to the seventh scan line SO4-2. The seventh stage ST1*d*-3 may output the 1-4th scan signal SOS4-3.

The dummy stages STDa-3 and STDb-3 according to an embodiment of the present disclosure may belong to the second stage group STG2-3.

The dummy stages STDa-3 and STDb-3 may include the first dummy stage STDa-3 and the second dummy stage STDb-3. The first dummy stage STDa-3 may be connected to the second dummy stage STDb-3. The second dummy stage STDb-3 may be connected to the first stage ST1*a*-3. The dummy stages STDa-3 and STDb-3 may shift the timing at which the 2-1st scan signal SES1-3 is provided.

The first dummy stage STDa-3 may receive the second start signal SSP2*a* from the timing controller T-CON (see FIG. 2). The second start signal SSP2*a* may be output at a different point in time from the first start signal SSP1*a*. For example, the second start signal SSP2*a* may be a signal shifted by 1 horizontal period 1H from the first start signal SSP1*a*. The first dummy stage STDa-3 may output the first dummy scan signal SDS1-3.

The second stage ST2*a*-3 may be connected to the second dummy stage STDb-3. The second stage ST2*a*-3 may receive the second dummy scan signal SDS2-3. The second stage ST2*a*-3 may be connected to the second scan line SE1-2. The second stage ST2*a*-3 may output the 2-1st scan signal SES1-3.

The fourth stage ST2*b*-3 may be connected to the second stage ST2*a*-3. The fourth stage ST2*b*-3 may receive the 2-1st scan signal SES1-3. The fourth stage ST2*b*-3 may be connected to the fourth scan line SE2-2. The fourth stage ST2*b*-3 may output the 2-2nd scan signal SES2-3.

The sixth stage ST2*c*-3 may be connected to the fourth stage ST1*b*-3. The sixth stage ST2*c*-3 may receive the 2-2nd scan signal SES2-3. The sixth stage ST2*c*-3 may be connected to the sixth scan line SE3-2. The sixth stage ST2*c*-3 may output the 2-3rd scan signal SES3-3.

The eighth stage ST2*d*-3 may be connected to the sixth stage ST2*c*-3. The eighth stage ST2*d*-3 may receive the 2-3rd scan signal SES3-3. The eighth stage ST2*d*-3 may be connected to the eighth scan line SE4-2. The eighth stage ST2*d*-3 may output the 2-4th scan signal SES4-3.

The 2-1st scan signal SES1-3 provided to the first scan line SE1-2 may be delayed by 5 horizontal periods or more as compared to the 1-1st scan signal SOS1-3 provided to the second scan line SO1-2. For this reason, active periods of scan signals of scan lines adjacent to each other among the plurality of scan lines SO1-2 to SO4-2 and SE1-2 to SE4-2 may not overlap each other. For example, the active period of the 2-1st scan signal SES1-3 provided to the second scan line SE1-2 may not overlap the active period of each of the 1-1st scan signal SOS1-3 provided to the adjacent first scan line SO1-2 and the 1-2nd scan signal SOS2-3 provided to the adjacent third scan line SO2-2.

For example, the 1-1st scan signal SOS1-3, the 1-2nd scan signal SOS2-3, and the 2-1st scan signal SES1-3 may be output in the order of the 1-1st scan signal SOS1-3, the 1-2nd scan signal SOS2-3, and the 2-1st scan signal SES1-3. When the 1-1st scan signal SOS1-3 has a first active period, the 2-1st scan signal SES1-3 has a second active period, and the 1-2nd scan signal SOS2-3 has a third active period, the first active period may at least partially overlap the third active period, but the second active period may not overlap the first active period or the third active period.

One scan signal of the plurality of scan signals SOS1-3, SES1-3, SOS2-3, SES2-3, SOS3-3, SES3-3, SOS4-3, and SES4-3 may be provided to one scan line of the plurality of scan lines SO1-2 to SO4-2 and SE1-2 to SE4-2. Another scan signal output immediately after the one scan signal of the plurality of scan signals SOS1-3, SES1-3, SOS2-3, SES2-3, SOS3-3, SES3-3, SOS4-3, and SES4-3 may be provided to another scan line spaced from the one scan line with at least one intervening scan line among the others of the plurality of scan lines SO1-2 to SO4-2 and SE1-2 to SE4-2 interposed between the one scan line and the another scan line.

For example, the 1-3rd scan signal SOS3-3 may be provided to the fifth scan line SO3-2. The 2-1st scan signal SES1-3, which is output continuously after the 1-3rd scan signal SOS3-3, is provided to the second scan line SE1-2, which is spaced from the fifth scan line SO3-2 with at least one scan line (e.g., SE2-2 and SO2-2) interposed therebetween.

According to an embodiment of the present disclosure, active periods of scan signals of scan lines adjacent to each other among the plurality of scan lines SO1-2 to SO4-2 and SE1-2 to SE4-2 may not overlap each other. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

In FIGS. 10A and 10B, the operation of the scan driver SDV-3 together with a connection relationship between the plurality of pixels PX and the plurality of scan lines SO1 to SOm and SE1 to SEm in FIG. 6C is described. However, according to an embodiment of the present disclosure, the operation of scan driver SDV-3 is not limited thereto. For example, the operation of the scan driver SDV-3 in FIG. 10B may be applied to the connection relationship of the plurality of pixels PX and the plurality of scan lines SO1 to SOm and SE1 to SEm in FIGS. 6C and 6D.

Figure 11A:
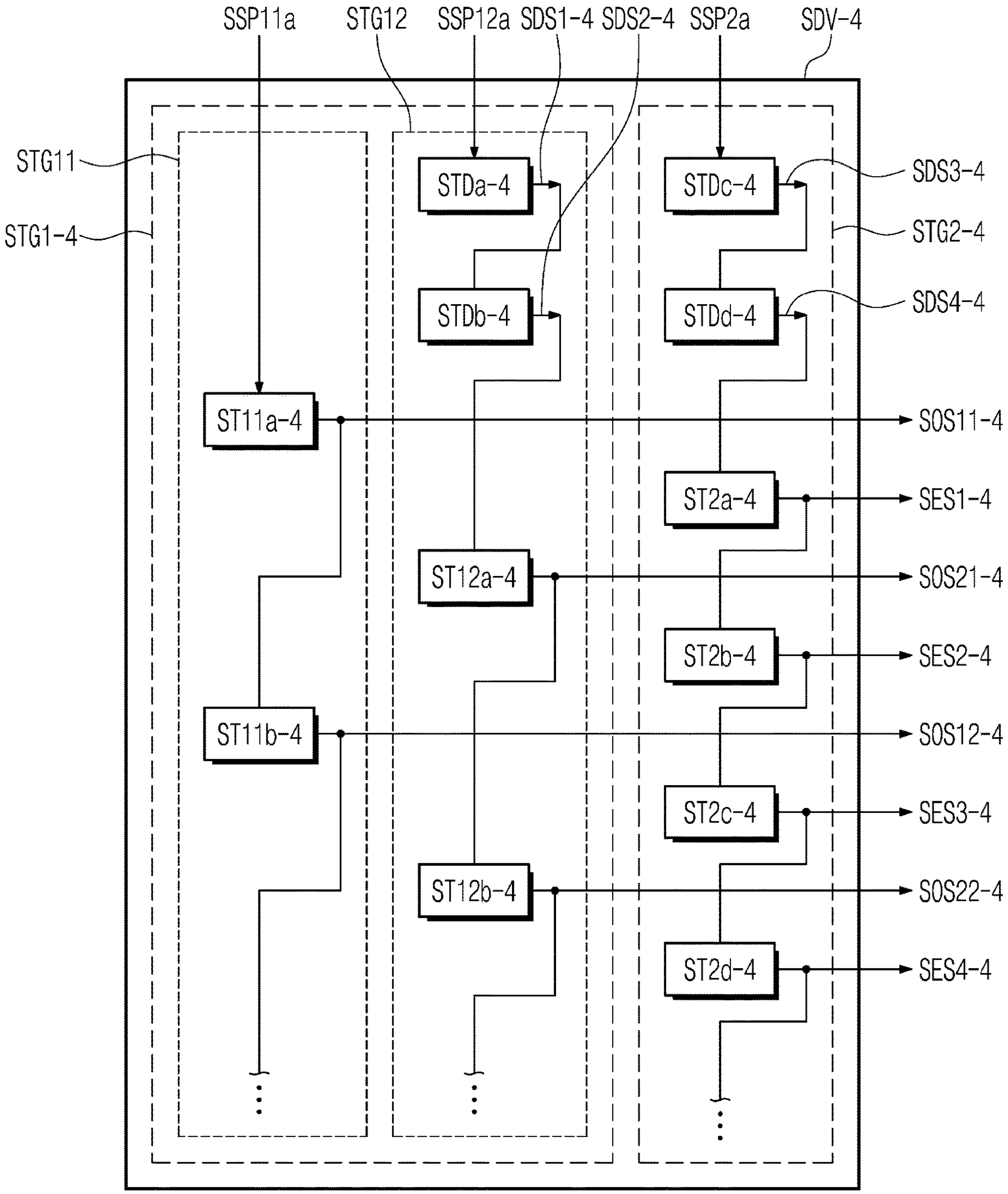
FIG. 11A is a schematic block diagram of a scan driver, according to an embodiment of the present disclosure.
Figure 11B:
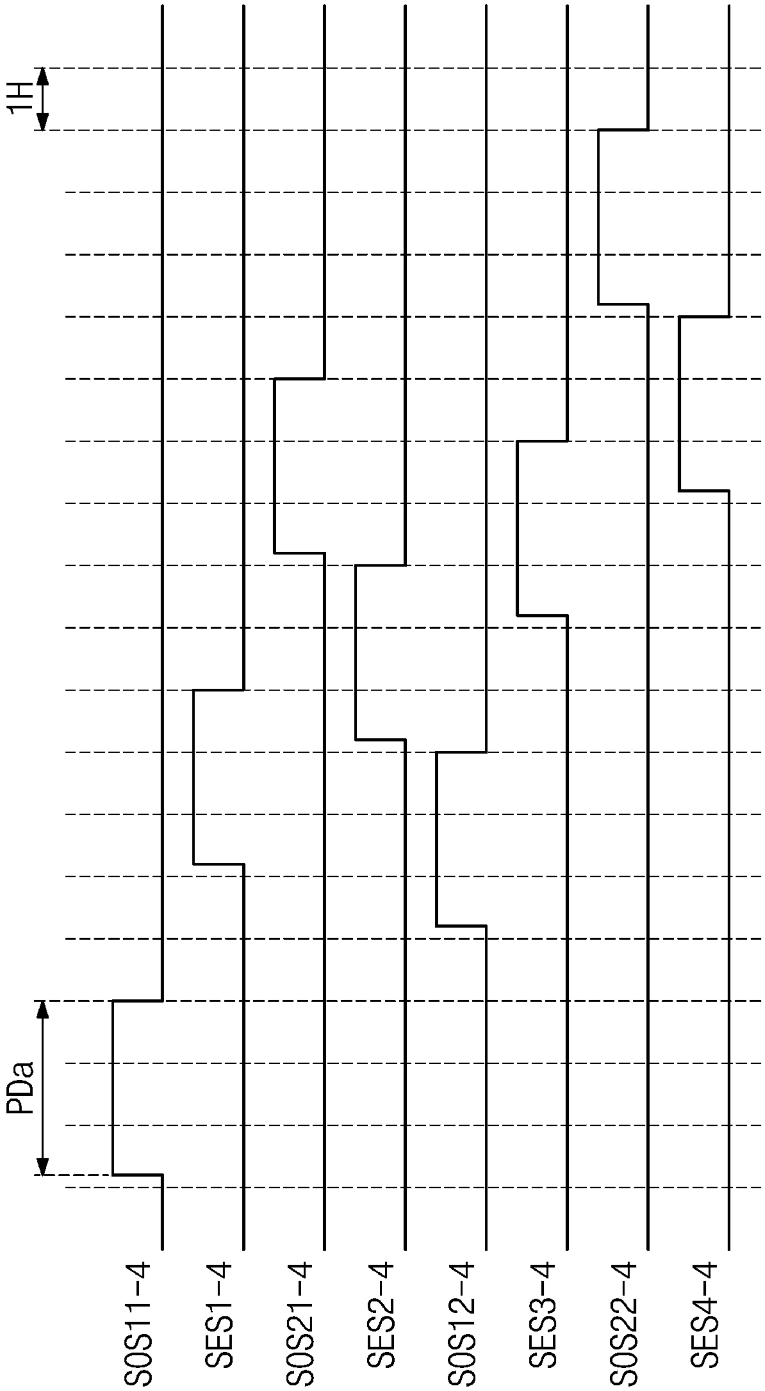
FIG. 11B is a timing diagram illustrating an operation of a scan driver, according to an embodiment of the present disclosure.

FIG. 11A is a schematic block diagram of a scan driver, according to an embodiment of the present disclosure. FIG. 11B is a timing diagram illustrating an operation of a scan driver, according to an embodiment of the present disclosure.

Referring to FIGS. 6A, 11A, and 11B, a scan driver SDV-4 may include a plurality of stages ST11*a*-4, ST11*b*-4, ST12*a*-4, ST12*b*-4, and ST2*a*-4 to ST2*d*-4, which respectively provide scan signal SOS11-4, SES1-4, SOS21-4, SES2-4, SOS12-4, SES3-4, SOS22-4, and SES4-4 to a plurality of scan lines SO1, SE1, SO2, SE2, SO3, SE3, SO4, and SE4, and a plurality of dummy stages STDa-4, STDb-4, STDc-4, and STDd-4.

The plurality of stages ST11*a*-4, ST11*b*-4, ST12*a*-4, ST12*b*-4, and ST2*a*-4 to ST2*d*-4 may include the first stage ST11*a*-4, the second stage ST2*a*-4, the third stage ST12*a*-4, the fourth stage ST2*b*-4, the fifth stage ST11*b*-4, the sixth stage ST2*c*-4, the seventh stage ST12*b*-4, and the eighth stage ST2*d*-4.

The plurality of stages ST11*a*-4, ST11*b*-4, ST12*a*-4, ST12*b*-4, and ST2*a*-4 to ST2*d*-4 may belong to a first stage group STG1-4 or a second stage group STG2-4 that are connected. Among the plurality of stages ST11*a*-4, ST11*b*-4, ST12*a*-4, ST12*b*-4, and ST2*a*-4 to ST2*d*-4, the odd-numbered stages ST11*a*-4, ST11*b*-4, ST12*a*-4, and ST12*b*-4 may be defined as the first stage group STG1-4. For example, the first stage ST11*a*-4, the third stage ST12*a*-4, the fifth stage ST11*b*-4, and the seventh stage ST12*b*-4 may be defined as the first stage group STG1-4.

The first stage group STG1-4 may be defined as a 1-1st stage group STG11 and a 1-2nd stage group STG12. The 1-1st stage group STG11 may include some of the odd-numbered stages ST11*a*-4, ST11*b*-4, ST12*a*-4, and ST12*b*-4. For example, the 1-1st stage group STG11 may include the first stage ST11*a*-4 and the fifth stage ST11*b*-4. The 1-2nd stage group STG12 may include the others of the odd-numbered stages ST11*a*-4, ST11*b*-4, ST12*a*-4, and ST12*b*-4. For example, the 1-2nd stage group STG12 may include the third stage ST12*a*-4 and the seventh stage ST12*b*-4.

Among the plurality of stages ST11*a*-4, ST11*b*-4, ST12*a*-4, ST12*b*-4, and ST2*a*-4 to ST2*d*-4, the even-numbered stages ST2*a*-4 to ST2*d*-4 may be defined as the second stage group STG2-4. For example, the second stage ST2*a*-4, the fourth stage ST2*b*-4, the sixth stage ST2*c*-4, and the eighth stage ST2*d*-4 may be defined as the second stage group STG2-4.

The plurality of stages ST11*a*-4, ST11*b*-4, ST12*a*-4, ST12*b*-4, and ST2*a*-4 to ST2*d*-4 may output a plurality of scan signals SOS11-4, SES1-4, SOS21-4, SES2-4, SOS12-4, SES3-4, SOS22-4, and SES4-4, respectively. Each of the plurality of scan signals SOS11-4, SES1-4, SOS21-4, SES2-4, SOS12-4, SES3-4, SOS22-4, and SES4-4 may have a pulse width PDa greater than 2 horizontal periods and less than 3 horizontal periods. For example, the pulse width PDa may have 2.8 horizontal periods. The scan signals SOS11-4, SES1-4, SOS21-4, SES2-4, SOS12-4, SES3-4, SOS22-4, and SES4-4 output to output terminals of the stages ST11*a*-4, ST11*b*-4, ST12*a*-4, ST12*b*-4, and ST2*a*-4 to ST2*d*-4 may be supplied to the corresponding scan lines, and, at the same time, may be provided to input terminals of subsequent stages as start signals of the subsequent stages.

The plurality of scan signals SOS11-4, SES1-4, SOS21-4, SES2-4, SOS12-4, SES3-4, SOS22-4, and SES4-4 may include the plurality of first scan signals SOS11-4, SOS12-4, SOS21-4, and SOS22-4 output from the first stage group STG1-4, and the plurality of second scan signals SES1-4, SES2-4, SES3-4, and SES4-4 output from the second stage group STG2-4.

The plurality of first scan signals SOS11-4, SOS12-4, SOS21-4, and SOS22-4 may include the plurality of first sub-scan signals SOS11-4 and SOS12-4 output from the 1-1st stage group STG11, and the plurality of second sub-scan signals SOS21-4 and SOS22-4 output from the 1-2nd stage group STG12.

The plurality of first sub-scan signals SOS11-4 and SOS12-4 may include a 1-1st scan signal SOS11-4 and a 1-3rd scan signal SOS12-4. The plurality of second sub-scan signals SOS21-4 and SOS22-4 may include a 1-2nd scan signal SOS21-4 and a 1-4th scan signal SOS22-4.

The plurality of second scan signals SES1-4, SES2-4, SES3-4, and SES4-4 may include the 2-1st scan signal SES1-4, the 2-2nd scan signal SES2-4, the 2-3rd scan signal SES3-4, and the 2-4th scan signal SES4-4.

The plurality of first scan signals SOS11-4, SOS12-4, SOS21-4, and SOS22-4 and the plurality of second scan signals SES1-4, SES2-4, SES3-4, and SES4-4 may be alternately output, respectively. In this case, first to n-th data signals corresponding to first to m-th scan lines are sequentially applied to data lines based on the plurality of scan signals SOS11-4, SES1-4, SOS21-4, SES2-4, SOS12-4, SES3-4, SOS22-4, and SES4-4.

Some of the dummy stages STDa-4, STDb-4, STDc-4, and STDd-4 may belong to the 1-2nd stage group STG12, and the others thereof may belong to the second stage group STG2-4. The dummy stages STDa-4, STDb-4, STDc-4, and STDd-4 may include the first dummy stage STDa-4, the second dummy stage STDb-4, the third dummy stage STDc-4, and the fourth dummy stage STDd-4.

The first dummy stage STDa-4 may be connected to the second dummy stage STDb-4. The second dummy stage STDb-4 may be connected to the third stage ST12*a*-4. The first and second dummy stages STDa-4 and STDb-4 may shift the timing at which the 1-2nd scan signal SOS21-4 is provided.

The third dummy stage STDc-4 may be connected to the fourth dummy stage STDd-4. The fourth dummy stage STDd-4 may be connected to the second stage ST2*a*-4. The third and fourth dummy stages STDc-4 and STDd-4 may shift the timing at which the 2-1st scan signal SES1-4 is provided.

The first stage ST11*a*-4 may receive a 1-1st start signal SSP11*a* from the timing controller T-CON (see FIG. 2). The first stage ST11*a*-4 may be connected to the first scan line SO1. The first stage ST11*a*-4 may output the 1-1st scan signal SOS11-4.

The fifth stage ST11*b*-4 may be connected to the first stage ST11*a*-4. The fifth stage ST11*b*-4 may receive the 1-1st scan signal SOS11-4. The fifth stage ST11*b*-4 may be connected to the fifth scan line SO3. The fifth stage ST11*b*-4 may output the 1-3rd scan signal SOS12-4.

The first dummy stage STDa-4 may receive a 1-2nd start signal SSP12*a* from the timing controller T-CON (see FIG. 2). However, this is an example. For example, a method of receiving the 1-2nd start signal SSP12*a* according to an embodiment of the present disclosure is not limited thereto. For example, the 1-2nd start signal SSP12*a* may be received from one of the stages included in the 1-1st stage group STG11. The first dummy stage STDa-4 may output the first dummy scan signal SDS1-4.

The second dummy stage STDb-4 may be connected to the first dummy stage STDa-4. The second dummy stage STDb-4 may receive the first dummy scan signal SDS1-4. The second dummy stage STDb-4 may output the second dummy scan signal SDS2-4.

The third stage ST12*a*-4 may be connected to the second dummy stage STDb-4. The third stage ST12*a*-4 may receive the second dummy scan signal SDS2-4. The third stage ST12*a*-4 may be connected to the third scan line SO2. The third stage ST12*a*-4 may output the 1-2nd scan signal SOS21-4.

The seventh stage ST12*b*-4 may be connected to the third stage ST12*a*-4. The seventh stage ST12*b*-4 may receive the 1-2nd scan signal SOS21-4. The seventh stage ST12*b*-4 may be connected to the seventh scan line SO4. The seventh stage ST12*b*-4 may output the 1-4th scan signal SOS22-4.

The third dummy stage STDc-4 may receive the second start signal SSP2*a* from the timing controller T-CON (see FIG. 2). The third dummy stage STDc-4 may output a third dummy scan signal SDS3-4.

The fourth dummy stage STDd-4 may be connected to the third dummy stage STDc-4. The fourth dummy stage STDd-4 may receive the third dummy scan signal SDS3-4. The fourth dummy stage STDd-4 may output the fourth dummy scan signal SDS4-4.

The second stage ST2*a*-4 may be connected to the fourth dummy stage STDd-4. The second stage ST2*a*-4 may receive the fourth dummy scan signal SDS4-4. The second stage ST2*a*-4 may be connected to the second scan line SE1. The second stage ST2*a*-4 may output the 2-1st scan signal SES1-4.

The fourth stage ST2*b*-4 may be connected to the second stage ST2*a*-4. The fourth stage ST2*b*-4 may receive the 2-1st scan signal SES1-4. The fourth stage ST2*b*-4 may be connected to the fourth scan line SE2. The fourth stage ST2*b*-4 may output the 2-2nd scan signal SES2-4.

The sixth stage ST2*c*-4 may be connected to the fourth stage ST2*b*-4. The sixth stage ST2*c*-4 may receive the 2-2nd scan signal SES2-4. The sixth stage ST2*c*-4 may be connected to the sixth scan line SE3. The sixth stage ST2*c*-4 may output the 2-3rd scan signal SES3-4.

The eighth stage ST2*d*-4 may be connected to the sixth stage ST2*c*-4. The eighth stage ST2*d*-4 may receive the 2-3rd scan signal SES3-4. The eighth stage ST2*d*-4 may be connected to the eighth scan line SE4. The eighth stage ST2*d*-4 may output the 2-4th scan signal SES4-4.

The 2-1st scan signal SES1-4 provided to the first scan line SE1 may be delayed by 5 horizontal periods or more as compared to the 1-1st scan signal SOS11-4 provided to the second scan line SO1. The 1-2nd scan signal SOS21-4 provided to the third scan line SO2 may be delayed by 10 horizontal periods or more as compared to the 2-1st scan signal SOS11-4 provided to the second scan line SO1. For this reason, active periods of scan signals of scan lines adjacent to each other among the plurality of scan lines SO1 to SO4 and SE1 to SE4 may not overlap. For example, the active period of the 2-1st scan signal SES1-4 provided to the second scan line SE1 may not overlap the active period of each of the 1-1st scan signal SOS11-4 provided to the adjacent first scan line SO1 and the 1-2nd scan signal SOS21-4 provided to the adjacent third scan line SO2.

For example, the 1-1st scan signal SOS11-4, the 1-2nd scan signal SOS21-4, and the 2-1st scan signal SES1-4 may be output in the order of the 1-1st scan signal SOS11-4, the 2-1st scan signal SES1-4, and the 1-2nd scan signal SOS21-4. When the 1-1st scan signal SOS11-4 has a first active period, the 2-1st scan signal SES1-4 has a second active period, and the 1-2nd scan signal SOS21-4 has a third active period, the first active period, the second active period, and the third active period may not overlap each other.

According to an embodiment of the present disclosure, active periods of scan signals of scan lines adjacent to each other among the plurality of scan lines SO1 to SO4 and SE1 to SE4 may not overlap each other. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

In FIGS. 11A and 11B, the operation of the scan driver SDV-4 together with a connection relationship between the plurality of pixels PX and the plurality of scan lines SO1 to SOm and SE1 to SEm in FIG. 6A is described. However, according to an embodiment of the present disclosure, the operation of scan driver SDV-4 is not limited thereto. For example, the operation of the scan driver SDV-4 in FIG. 11B may be applied to the connection relationship of the plurality of pixels PX and the plurality of scan lines SO1 to SOm and SE1 to SEm in FIGS. 6A and 6B.

Figure 12:
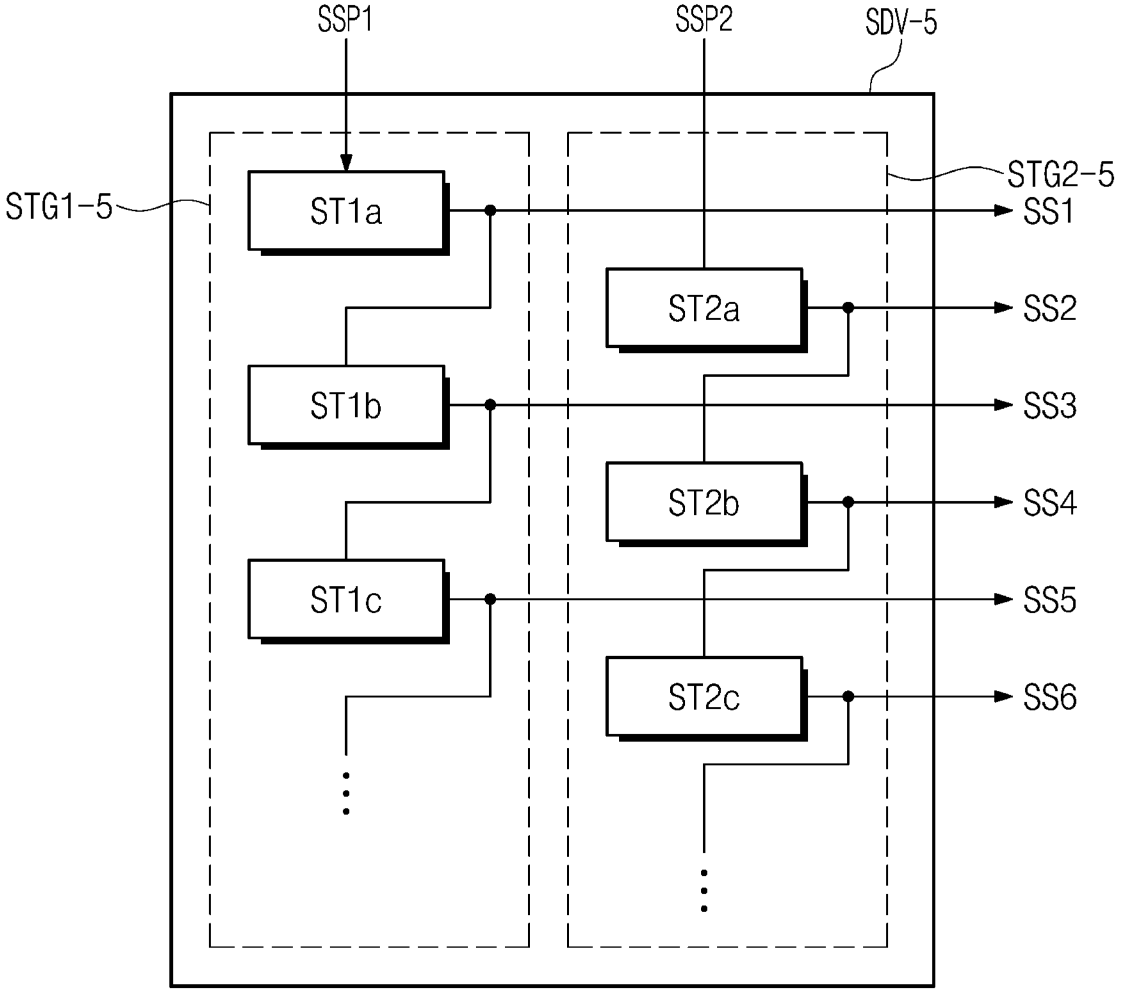
FIG. 12 is a schematic block diagram of a scan driver, according to an embodiment of the present disclosure.

FIG. 12 is a schematic block diagram of a scan driver, according to an embodiment of the present disclosure.

Referring to FIGS. 6A and 12, a scan driver SDV-5 may operate as a shift register, and may include a plurality of stages ST1*a* to ST1*c* and ST2*a* to ST2*c* that respectively provide scan signals SOS1, SES1, SOS2, SES2, SOS3, SES3, SOS4, and SES4 to the plurality of scan lines SO1, SE1, SO2, SE2, SO3, SE3, SO4, and SE4.

Each of the plurality of stages ST1*a* to ST1*c* and ST2*a* to ST2*c* may be connected to a clock line (not shown) to receive a clock signal, of which the phase is delayed by more than 1 horizontal period, from the clock line and to output a scan signal having a pulse width greater than 1 horizontal period to the corresponding scan line. At this time, the 1 horizontal period may be 1.47 μs, and the pulse width may be 1.8 horizontal periods.

The plurality of stages ST1*a* to ST1*d* and ST2*a* to ST2*d* may include the first stage ST1*a*, the second stage ST2*a*, the third stage ST1*b*, the fourth stage ST2*b*, the fifth stage ST1*c*, and the sixth stage ST2*c*.

The plurality of stages ST1*a* to ST1*c* and ST2*a* to ST2*c* may belong to a first stage group STG1-5 or a second stage group STG2-5 that are connected. Among the plurality of stages ST1*a* to ST1*c* and ST2*a* to ST2*c*, the odd-numbered stages ST1*a* to ST1*c* may be defined as the first stage group STG1-5. For example, the first stage ST1*a*, the third stage ST1*b*, and the fifth stage ST1*c* may be defined as the first stage group STG1-5. Among the plurality of stages ST1*a* to ST1*c* and ST2*a* to ST2*c*, the even-numbered stages ST2*a* to ST2*c* may be defined as the second stage group STG2-5. For example, the second stage ST2*a*, the fourth stage ST2*b*, and the sixth stage ST2*c* may be defined as the second stage group STG2-5.

The plurality of stages ST1*a* to ST1*c* and ST2*a* to ST2*c* may output plurality of scan signals SOS1-5, SES1-5, SOS2-5, SES2-5, SOS3-5, and SES3-5, respectively. The scan signals SOS1-5, SES1-5, SOS2-5, SES2-5, SOS3-5, and SES3-output to output terminals of the stages ST1*a* to ST1*c* and ST2*a* to ST2*c* may be supplied to the corresponding scan lines, and, at the same time, may be provided to input terminals of subsequent stages as start signals of the subsequent stages.

The plurality of scan signals SS1, SS2, SS3, SS4, SS5, and SS6 may include the plurality of first scan signals SS1, SS3, and SS5 output from the first stage group STG1-5, and the plurality of second scan signals SS2, SS4, and SS6 output from the second stage group STG2-5. The plurality of first scan signals SS1, SS3, and SS5 may include the 1-1st scan signal SS1, the 1-2nd scan signal SS3, and the 1-3rd scan signal SS5. The plurality of second scan signals SS2, SS4, and SS6 may include the 2-1st scan signal SS2, the 2-2nd scan signal SS4, and the 2-3rd scan signal SS6.

The plurality of first scan signals SS1, SS3, and SS5 and the plurality of second scan signals SS2, SS4, and SS6 may be alternately output, respectively. In this case, first to n-th data signals corresponding to first to m-th scan lines are sequentially applied to data lines based on the plurality of scan signals SS1 to SS6.

The second stage ST1*a* may receive a first start signal SSP1 from the timing controller T-CON (see FIG. 2). The first stage ST1*a* may output the 1-1st scan signal SS1.

The third stage ST1*b* may be connected to the first stage ST1*a*. The third stage ST1*b* may receive the 1-1st scan signal SS1. The third stage ST1*b* may output the 1-2nd scan signal SS3.

The fifth stage ST1*c* may be connected to the third stage ST1*b*. The fifth stage ST1*c* may receive the 1-2nd scan signal SS3. The fifth stage ST1*c* may output the 1-3rd scan signal SS5.

The second stage ST2*a* may receive a second start signal SSP2 from the timing controller T-CON (see FIG. 2). The second start signal SSP2 may be output at a different point in time from the first start signal SSP1. For example, the second start signal SSP2 may be a signal shifted by 1 horizontal period from the first start signal SSP1. The second stage ST2*a* may output the 2-1st scan signal SS2.

The fourth stage ST2*b* may be connected to the second stage ST2*a*. The fourth stage ST2*b* may receive the 2-1st scan signal SS2. The fourth stage ST2*b* may output the 2-2nd scan signal SS4.

The sixth stage ST2*c* may be connected to the fourth stage ST2*b*. The sixth stage ST2*c* may receive the 2-2nd scan signal SS4. The sixth stage ST2*c* may output the 2-3rd scan signal SS6.

When viewed on the time axis, the scan driver SDV-5 may shift the 1-1st scan signal SS1, the 2-1st scan signal SS2, the 1-2nd scan signal SS3, the 2-2nd scan signal SS4, the 1-3rd scan signal SS5, the 2-3rd scan signal SS6 by 1 horizontal period in order, and may output the shifted result. At this time, the 2-1st scan signal SS2 may be defined as being output continuously after the 1-1st scan signal SS1. The 1-2nd scan signal SS3 may be defined as being output continuously after the 2-1st scan signal SS2. The 2-2nd scan signal SS4 may be defined as being output continuously after the 1-2nd scan signal SS3. The 1-3rd scan signal SS5 may be defined as being output continuously after the 2-2nd scan signal SS4. The 2-3rd scan signal SS6 may be defined as being output continuously after the 1-3rd scan signal SS5.

The scan driver SDV-5 may provide a scan signal by grouping 6 pixels PX (see FIG. 3) electrically connected to one data line. However, this is an example. For example, the number of pixels included in one group according to an embodiment of the present disclosure is not limited thereto. For example, the number of pixels included in one group according to an embodiment of the present disclosure may be four or more.

The order in which first to sixth pixels PX1 to PX6 are driven may be defined as a plurality of patterns. For example, one pattern among the plurality of patterns may be driven in the order of the third pixel PX3, the sixth pixel PX6, the second pixel PX2, the fifth pixel PX5, the fourth pixel PX4, and the first pixel PX1. This will be described later.

The scan driver SDV-5 may drive the plurality of pixels PX (see FIG. 3) in units of six pixels by using each of the plurality of patterns as one cycle. In other words, the scan driver SDV-5 may drive the plurality of pixels PX while repeating one pattern among the plurality of patterns, or mixing at least two patterns among the plurality of patterns.

Pixels may be arranged along an N-th line extending in the first direction DR1. In this case, 'N' is a natural number.

A scan line may extend along a (N+1)-th line that is spaced from the N-th line in the negative second direction DR2, and extends in the first direction DR1. The next scan line may extend along a (N+2)-th line that is spaced from the (N+1)-th line in the negative second direction DR2, and extends in the first direction DR1.

Other pixels may be arranged along a (N+3)-th line that is spaced from the (N+2)-th line in the negative second direction DR2 and extends in the first direction DR1. A scan line may extend along a (N+4)-th line that is spaced from the (N+3)-th line in the negative second direction DR2, and extends in the first direction DR1.

A scan line may extend along a (N-1)-th line that is spaced from the N-th line in the positive second direction DR2, and extends in the first direction DR1. The next scan line may extend along a (N-2)-th line that is spaced from the (N-1)-th line in the second direction DR2, and extends in the first direction DR1.

Other pixels may be arranged along a (N-3)-th line that is spaced from the (N-2)-th line in the second direction DR2 and extends in the first direction DR1. A next scan line may extend along a (N-4)-th line that is spaced from the (N-3)-th line in the second direction DR2, and extends in the first direction DR1.

In this case, the first scan signal that is output after a scan signal for driving one of the pixels PX arranged on the N-th line is output may be output from a scan line extending along the previous line of the (N-2)-th line and the subsequent line of the (N+2)-th line. For example, different scan signals may be output from a scan line extending along the (N+4)-th line or a scan line extending along the (N-4)-th line.

For example, the third pixel PX3 and the fourth pixel PX4 may be arranged along the N-th line. The first scan signal that is output after a scan signal for driving the third pixel PX3 is output may be output from the sixth scan line SE3 extending along the subsequent line of the fifth scan line SO3 extending along the (N+2)-th line. The next scan signal continuously output after a scan signal for driving the fourth pixel PX4 is output may be output from the first scan line SO1 extending along the previous line of the second scan line SE1 extending along the (N-2)-th line.

In other words, when the scan driver SDV-5 outputs a scan signal and the next scan signal that is output after the scan signal, at least one scan line may be placed between a scan line for providing the next scan signal and a scan line for providing the scan signal. For example, when the scan signal for driving the third pixel PX3 is output through the fourth scan line SE2, the scan signal output continuously after the scan signal may be output at the sixth scan line SE3. At this time, the at least one scan line SO3 may be positioned between the fourth scan line SE2 and the sixth scan line SE3. Alternatively, when the scan signal for driving the fourth pixel PX4 is output through the third scan line SO2, the next scan signal output continuously after the scan signal may be output at the first scan line SO1. At this time, the at least one scan line SE1 may be positioned between the first scan line SO1 and the third scan line SO2.

FIGS. 13A to 13H are timing diagrams illustrating an operation of a scan driver driven by one pattern among a plurality of patterns, according to an embodiment of the present disclosure.

A plurality of patterns may include a first pattern, a second pattern, a third pattern, a fourth pattern, a fifth pattern, a sixth pattern, a seventh pattern, and an eighth pattern that have different driving orders. FIGS. 13A to 13H show that the plurality of patterns include 8 patterns including first to eighth patterns. However, the number of patterns according to an embodiment of the present disclosure is not limited thereto. For example, the number of patterns may be provided in a variety of ways as long as display quality deterioration due to a kickback voltage is capable of being prevented.

Figure 13A:
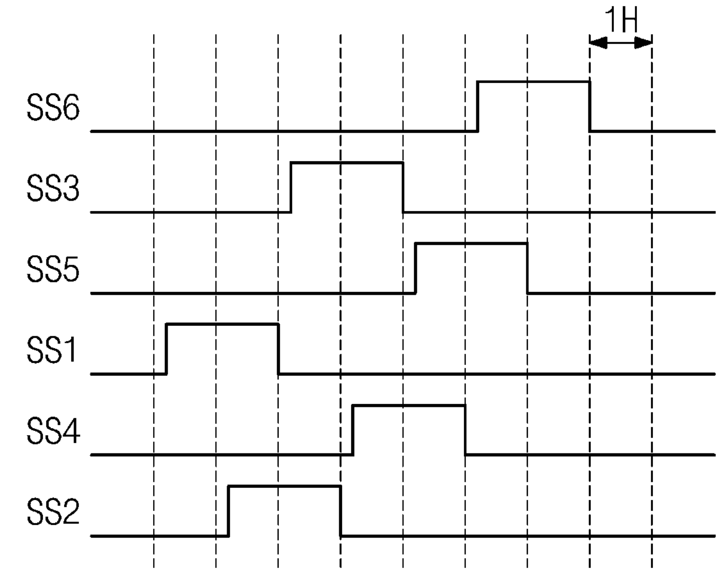
FIGS. 13A to 13H are timing diagrams illustrating an operation of a scan driver driven by one pattern among a plurality of patterns, according to an embodiment of the present disclosure.

Referring to FIGS. 6A, 12, and 13A, each of the plurality of scan signals SS1 to SS6 may have a pulse width greater than 1 horizontal period 1H and less than 2 horizontal periods. For example, the pulse width may have 1.8 horizontal periods.

The first pattern among the plurality of patterns may be driven in the order of the third pixel PX3, the sixth pixel PX6, the second pixel PX2, the fifth pixel PX5, the fourth pixel PX4, and the first pixel PX1.

The first stage ST1*a* may output the 1-1st scan signal SS1. The first stage ST1*a* may be connected to the fourth scan line SE2. The 1-1st scan signal SS1 may be provided to the fourth scan line SE2. The fourth pixel PX4 may be driven in response to the 1-1st scan signal SS1.

The second stage ST2*a* may output the 2-1st scan signal SS2. The second stage ST2*a* may be connected to the sixth scan line SE3. The 2-1st scan signal SS2 may be provided to the sixth scan line SE3. The sixth pixel PX6 may be driven in response to the 2-1st scan signal SS2.

The third stage ST1*b* may output the 1-2nd scan signal SS3. The third stage ST1*b* may be connected to the second scan line SE1. The 1-2nd scan signal SS3 may be provided to the second scan line SE1. The second pixel PX2 may be driven in response to the 1-2nd scan signal SS3.

The fourth stage ST2*b* may output the 2-2nd scan signal SS4. The fourth stage ST2*b* may be connected to the fifth scan line SO3. The 2-2nd scan signal SS4 may be provided to the fifth scan line SO3. The fifth pixel PX5 may be driven in response to the 2-2nd scan signal SS4.

The fifth stage ST1*c* may output the 1-3rd scan signal SS5. The fifth stage ST1*c* may be connected to the third scan line SO2. The 1-3rd scan signal SS5 may be provided to the third scan line SO2. The third pixel PX3 may be driven in response to the 1-3rd scan signal SS5.

The sixth stage ST2*c* may output the 2-3rd scan signal SS6. The sixth stage ST2*c* may be connected to the first scan line SO1. The 2-3rd scan signal SS6 may be provided to the first scan line SO1. The first pixel PX1 may be driven in response to the 2-3rd scan signal SS6.

Unlike an embodiment of the present disclosure, a second scan signal provided to the second scan line SE1 may be affected by a first scan signal provided to the first scan line SO1 by the first parasitic capacitor CP1, and may be affected by a third scan signal provided to the third scan line SO2 by the second parasitic capacitor CP2. For example, when the second scan signal has a turn-on level, in the case where a level of the first scan signal is changed from a turn-on level to a turn-off level on the same time, a voltage of the gate node of the driving transistor T1 (see FIG. 5) of the second pixel PX2 may be changed by the first parasitic capacitor CP1. Moreover, when the third scan signal has a turn-on level, in the case where a level of the second scan signal is changed from a turn-on level to a turn-off level on the same time, the voltage of the gate node of the driving transistor T1 (see FIG. 5) of the third pixel PX3 may be changed by the second parasitic capacitor CP2. That is, when active periods of scan signals of scan lines adjacent to each other among the plurality of scan lines SO1 to SO3 and SE1 to SE3 overlap each other on the same time, the voltage of the gate node of the driving transistor T1 (see FIG. 5) may be affected. As a result, a luminance difference may occur between the plurality of pixels PX1 to PX6 electrically connected to the plurality of scan lines SO1 to SO3 and SE1 to SE3. However, according to an embodiment of the present disclosure, active periods of scan signals of scan lines adjacent to each other among the plurality of scan lines SO1 to SO3 and SE1 to SE3 may not overlap each other on the same time. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13B:
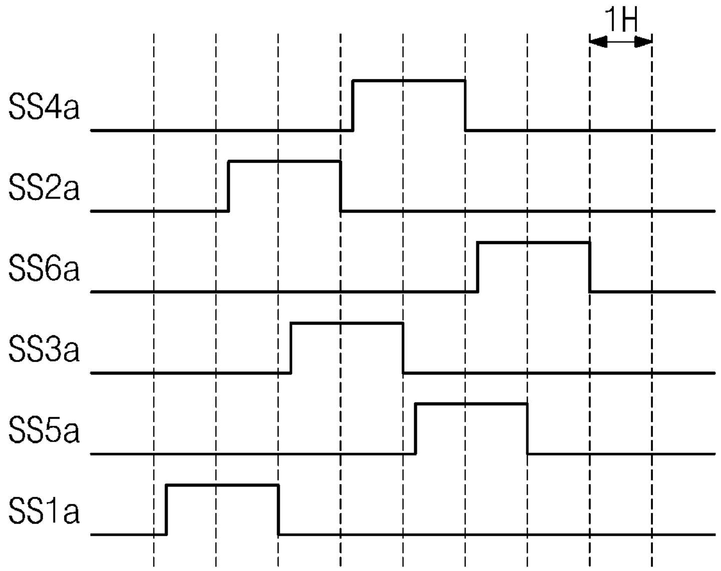

Referring to FIGS. 6A, 12, and 13B, each of a plurality of scan signals SS1*a* to SS6*a* may have a pulse width greater than 1 horizontal period 1H and less than 2 horizontal periods. For example, the pulse width may have 1.8 horizontal periods. The second pattern among the plurality of patterns may be driven in the order of the sixth pixel PX6, the second pixel PX2, the fourth pixel PX4, the first pixel PX1, the fifth pixel PX5, and the third pixel PX3.

The first stage ST1*a* may output the 1-1st scan signal SS1*a*. The first stage ST1*a* may be connected to the sixth scan line SE3. The 1-1st scan signal SS1*a* may be provided to the sixth scan line SE3. The sixth pixel PX6 may be driven in response to the 1-1st scan signal SS1*a*.

The second stage ST2*a* may output the 2-1st scan signal SS2*a*. The second stage ST2*a* may be connected to the second scan line SE1. The 2-1st scan signal SS2*a* may be provided to the second scan line SE1. The second pixel PX2 may be driven in response to the 2-1st scan signal SS2*a*.

The third stage ST1*b* may output the 1-2nd scan signal SS3*a*. The third stage ST1*b* may be connected to the fourth scan line SE2. The 1-2nd scan signal SS3*a* may be provided to the fourth scan line SE2. The fourth pixel PX4 may be driven in response to the 1-2nd scan signal SS3*a*.

The fourth stage ST2*b* may output the 2-2nd scan signal SS4*a*. The fourth stage ST2*b* may be connected to the first scan line SO1. The 2-2nd scan signal SS4*a* may be provided to the first scan line SO1. The first pixel PX1 may be driven in response to the 2-2nd scan signal SS4*a*.

The fifth stage ST1*c* may output the 1-3rd scan signal SS5*a*. The fifth stage ST1*c* may be connected to the fifth scan line SO3. The 1-3rd scan signal SS5*a* may be provided to the fifth scan line SO3. The fifth pixel PX5 may be driven in response to the 1-3rd scan signal SS5*a*.

The sixth stage ST2*c* may output the 2-3rd scan signal SS6*a*. The sixth stage ST2*c* may be connected to the third scan line SO2. The 2-3rd scan signal SS6*a* may be provided to the third scan line SO2. The third pixel PX3 may be driven in response to the 2-3rd scan signal SS6*a*.

According to an embodiment of the present disclosure, active periods of scan signals of scan lines adjacent to each other among the plurality of scan lines SO1 to SO3 and SE1 to SE3 may not overlap each other on the same time. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13C:
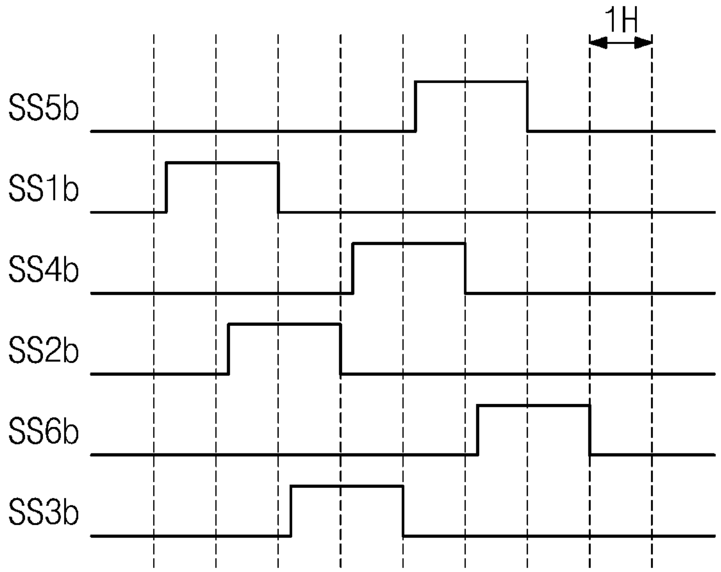

Referring to FIGS. 6A, 12, and 13C, each of a plurality of scan signals SS1*b* to SS6*b* may have a pulse width greater than 1 horizontal period 1H and less than 2 horizontal periods. For example, the pulse width may have 1.8 horizontal periods.

The third pattern among the plurality of patterns may be driven in the order of the second pixel PX2, the fourth pixel PX4, the sixth pixel PX6, the third pixel PX3, the first pixel PX1, and the fifth pixel PX5.

The first stage ST1*a* may output the 1-1st scan signal SS1*b*. The first stage ST1*a* may be connected to the second scan line SE1. The 1-1st scan signal SS1*b* may be provided to the second scan line SE1. The second pixel PX2 may be driven in response to the 1-1st scan signal SS1*b*.

The second stage ST2*a* may output the 2-1st scan signal SS2*b*. The second stage ST2*a* may be connected to the fourth scan line SE2. The 2-1st scan signal SS2*b* may be provided to the fourth scan line SE2. The fourth pixel PX4 may be driven in response to the 2-1st scan signal SS2*b*.

The third stage ST1*b* may output the 1-2nd scan signal SS3*b*. The third stage ST1*b* may be connected to the sixth scan line SE3. The 1-2nd scan signal SS3*b* may be provided to the sixth scan line SE3. The sixth pixel PX6 may be driven in response to the 1-2nd scan signal SS3*b*.

The fourth stage ST2*b* may output the 2-2nd scan signal SS4*b*. The fourth stage ST2*b* may be connected to the third scan line SO2. The 2-2nd scan signal SS4*b* may be provided to the third scan line SO2. The third pixel PX3 may be driven in response to the 2-2nd scan signal SS4*b*.

The fifth stage ST1*c* may output the 1-3rd scan signal SS5*b*. The fifth stage ST1*c* may be connected to the first scan line SO1. The 1-3rd scan signal SS5*b* may be provided to the first scan line SO1. The first pixel PX1 may be driven in response to the 1-3rd scan signal SS5*b*.

The sixth stage ST2*c* may output the 2-3rd scan signal SS6*b*. The sixth stage ST2*c* may be connected to the fifth scan line SO3. The 2-3rd scan signal SS6*b* may be provided to the fifth scan line SO3. The fifth pixel PX5 may be driven in response to the 2-3rd scan signal SS6*b*.

According to an embodiment of the present disclosure, active periods of scan signals of scan lines adjacent to each other among the plurality of scan lines SO1 to SO3 and SE1 to SE3 may not overlap each other. This way, the influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13D:
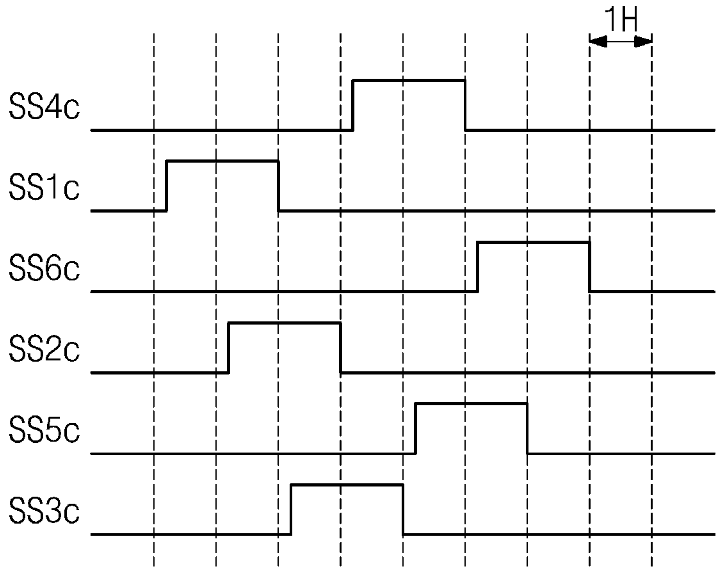

Referring to FIGS. 6A, 12, and 13D, each of a plurality of scan signals SS1*c* to SS6*c* may have a pulse width greater than 1 horizontal period 1H and less than 2 horizontal periods. For example, the pulse width may have 1.8 horizontal periods.

The fourth pattern among the plurality of patterns may be driven in the order of the second pixel PX2, the fourth pixel PX4, the sixth pixel PX6, the first pixel PX1, the fifth pixel PX5, and the third pixel PX3.

The first stage ST1*a* may output the 1-1st scan signal SS1*c*. The first stage ST1*a* may be connected to the second scan line SE1. The 1-1st scan signal SS1*c* may be provided to the second scan line SE1. The second pixel PX2 may be driven in response to the 1-1st scan signal SS1*c*.

The second stage ST2*a* may output the 2-1st scan signal SS2*c*. The second stage ST2*a* may be connected to the fourth scan line SE2. The 2-1st scan signal SS2*c* may be provided to the fourth scan line SE2. The fourth pixel PX4 may be driven in response to the 2-1st scan signal SS2*c*.

The third stage ST1*b* may output the 1-2nd scan signal SS3*c*. The third stage ST1*b* may be connected to the sixth scan line SE3. The 1-2nd scan signal SS3*c* may be provided to the sixth scan line SE3. The sixth pixel PX6 may be driven in response to the 1-2nd scan signal SS3*c*.

The fourth stage ST2*b* may output the 2-2nd scan signal SS4*c*. The fourth stage ST2*b* may be connected to the first scan line SO1. The 2-2nd scan signal SS4*c* may be provided to the first scan line SO1. The first pixel PX1 may be driven in response to the 2-2nd scan signal SS4*c*.

The fifth stage ST1*c* may output the 1-3rd scan signal SS5*c*. The fifth stage ST1*c* may be connected to the fifth scan line SO3. The 1-3rd scan signal SS5*c* may be provided to the fifth scan line SO3. The fifth pixel PX5 may be driven in response to the 1-3rd scan signal SS5*c*.

The sixth stage ST2*c* may output the 2-3rd scan signal SS6*c*. The sixth stage ST2*c* may be connected to the third scan line SO2. The 2-3rd scan signal SS6*c* may be provided to the third scan line SO2. The third pixel PX3 may be driven in response to the 2-3rd scan signal SS6*c*.

According to an embodiment of the present disclosure, active periods of scan signals of scan lines adjacent to each other among the plurality of scan lines SO1 to SO3 and SE1 to SE3 may not overlap each other. This way, the influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13E:
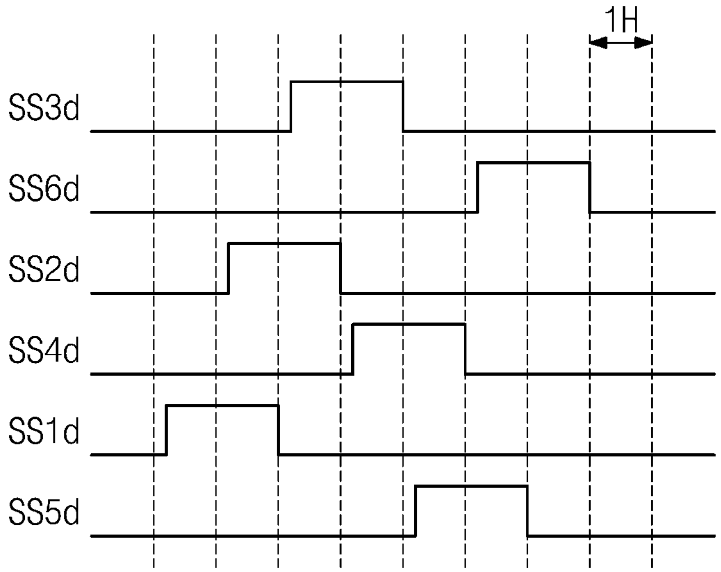

Referring to FIGS. 6A, 12, and 13E, each of a plurality of scan signals SS1*d* to SS6*d* may have a pulse width greater than 1 horizontal period 1H and less than 2 horizontal periods. For example, the pulse width may have 1.8 horizontal periods.

The fifth pattern among the plurality of patterns may be driven in the order of the fifth pixel PX5, the third pixel PX3, the first pixel PX1, the fourth pixel PX4, the sixth pixel PX6, and the second pixel PX2.

The first stage ST1*a* may output the 1-1st scan signal SS1*d*. The first stage ST1*a* may be connected to the fifth scan line SO3. The 1-1st scan signal SS1*d* may be provided to the fifth scan line SO3. The fifth pixel PX5 may be driven in response to the 1-1st scan signal SS1*d*.

The second stage ST2*a* may output the 2-1st scan signal SS2*d*. The second stage ST2*a* may be connected to the third scan line SO2. The 2-1st scan signal SS2*d* may be provided to the third scan line SO2. The third pixel PX3 may be driven in response to the 2-1st scan signal SS2*d*.

The third stage ST1*b* may output the 1-2nd scan signal SS3*d*. The third stage ST1*b* may be connected to the first scan line SO1. The 1-2nd scan signal SS3*d* may be provided to the first scan line SO1. The first pixel PX1 may be driven in response to the 1-2nd scan signal SS3*d*.

The fourth stage ST2*b* may output the 2-2nd scan signal SS4*d*. The fourth stage ST2*b* may be connected to the fourth scan line SE2. The 2-2nd scan signal SS4*d* may be provided to the fourth scan line SE2. The fourth pixel PX4 may be driven in response to the 2-2nd scan signal SS4*d*.

The fifth stage ST1*c* may output the 1-3rd scan signal SS5*d*. The fifth stage ST1*c* may be connected to the sixth scan line SE3. The 1-3rd scan signal SS5*d* may be provided to the sixth scan line SE3. The sixth pixel PX6 may be driven in response to the 1-3rd scan signal SS5*d*.

The sixth stage ST2*c* may output the 2-3rd scan signal SS6*d*. The sixth stage ST2*c* may be connected to the second scan line SE1. The 2-3rd scan signal SS6*d* may be provided to the second scan line SE1. The second pixel PX2 may be driven in response to the 2-3rd scan signal SS6*d*.

According to an embodiment of the present disclosure, active periods of scan signals of scan lines adjacent to each other among the plurality of scan lines SO1 to SO3 and SE1 to SE3 may not overlap each other. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13F:
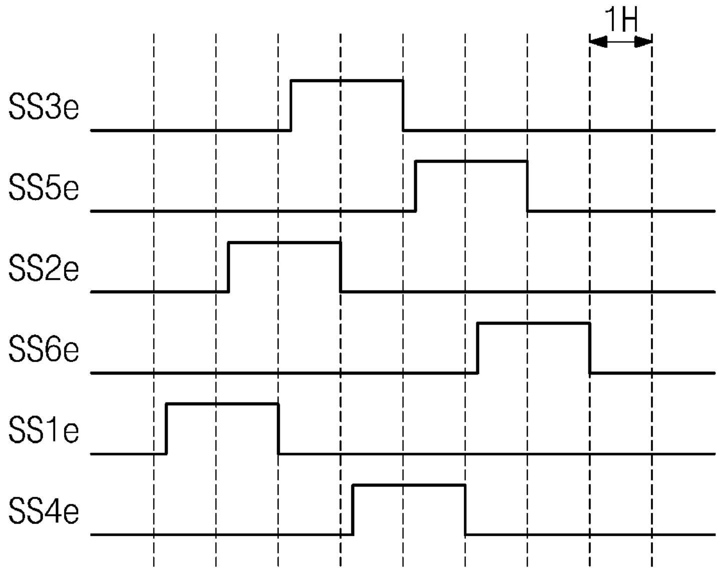

Referring to FIGS. 6A, 12, and 13F, each of a plurality of scan signals SS1*e* to SS6*e* may have a pulse width greater than 1 horizontal period 1H and less than 2 horizontal periods. For example, the pulse width may have 1.8 horizontal periods.

The sixth pattern among the plurality of patterns may be driven in the order of the fifth pixel PX5, the third pixel PX3, the first pixel PX1, the sixth pixel PX6, the second pixel PX2, and the fourth pixel PX4.

The first stage ST1*a* may output the 1-1st scan signal SS1*e*. The first stage ST1*a* may be connected to the fifth scan line SO3. The 1-1st scan signal SS1*e* may be provided to the fifth scan line SO3. The fifth pixel PX5 may be driven in response to the 1-1st scan signal SS1*e*.

The second stage ST2*a* may output the 2-1st scan signal SS2*e*. The second stage ST2*a* may be connected to the third scan line SO2. The 2-1st scan signal SS2*e* may be provided to the third scan line SO2. The third pixel PX3 may be driven in response to the 2-1st scan signal SS2*e*.

The third stage ST1*b* may output the 1-2nd scan signal SS3*e*. The third stage ST1*b* may be connected to the first scan line SO1. The 1-2nd scan signal SS3*e* may be provided to the first scan line SO1. The first pixel PX1 may be driven in response to the 1-2nd scan signal SS3*e*.

The fourth stage ST2*b* may output the 2-2nd scan signal SS4*e*. The fourth stage ST2*b* may be connected to the sixth scan line SE3. The 2-2nd scan signal SS4*e* may be provided to the sixth scan line SE3. The sixth pixel PX6 may be driven in response to the 2-2nd scan signal SS4*e*.

The fifth stage ST1*c* may output the 1-3rd scan signal SS5*e*. The fifth stage ST1*c* may be connected to the second scan line SE1. The 1-3rd scan signal SS5*e* may be provided to the second scan line SE1. The second pixel PX2 may be driven in response to the 1-3rd scan signal SS5*e*.

The sixth stage ST2*c* may output the 2-3rd scan signal SS6*e*. The sixth stage ST2*c* may be connected to the fourth scan line SE2. The 2-3rd scan signal SS6*e* may be provided to the fourth scan line SE2. The fourth pixel PX4 may be driven in response to the 2-3rd scan signal SS6*e*.

According to an embodiment of the present disclosure, active periods of scan signals of scan lines adjacent to each other among the plurality of scan lines SO1 to SO3 and SE1 to SE3 may not overlap each other. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13G:
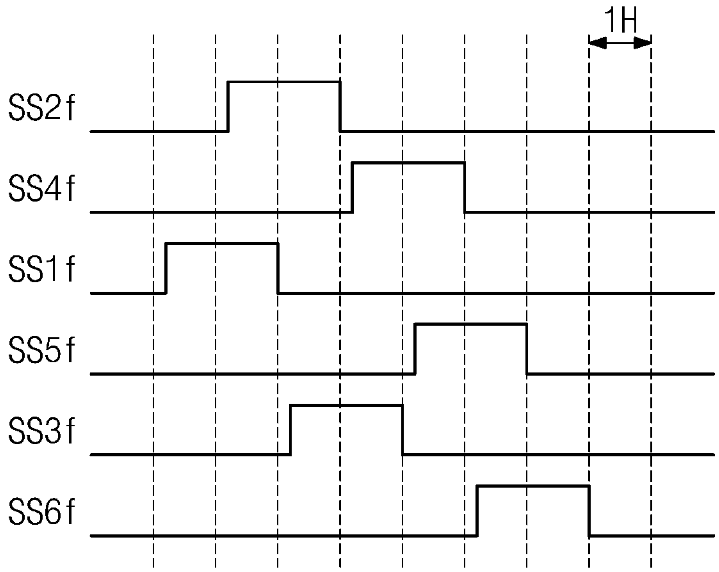

Referring to FIGS. 6A, 12, and 13G, each of a plurality of scan signals SS1*f* to SS6*f* may have a pulse width greater than 1 horizontal period 1H and less than 2 horizontal periods. For example, the pulse width may have 1.8 horizontal periods.

The seventh pattern among the plurality of patterns may be driven in the order of the third pixel PX3, the first pixel PX1, the fifth pixel PX5, the second pixel PX2, the fourth pixel PX4, and the sixth pixel PX6.

The first stage ST1*a* may output the 1-1st scan signal SS1*f*. The first stage ST1*a* may be connected to the third scan line SO2. The 1-1st scan signal SS1*f* may be provided to the third scan line SO2. The third pixel PX3 may be driven in response to the 1-1st scan signal SS1*f*.

The second stage ST2*a* may output the 2-1st scan signal SS2*f*. The second stage ST2*a* may be connected to the first scan line SO1. The 2-1st scan signal SS2*f* may be provided to the first scan line SO1. The first pixel PX1 may be driven in response to the 2-1st scan signal SS2*f*.

The third stage ST1*b* may output the 1-2nd scan signal SS3*f*. The third stage ST1*b* may be connected to the fifth scan line SO3. The 1-2nd scan signal SS3*f* may be provided to the fifth scan line SO3. The fifth pixel PX5 may be driven in response to the 1-2nd scan signal SS3*f*.

The fourth stage ST2*b* may output the 2-2nd scan signal SS4*f*. The fourth stage ST2*b* may be connected to the second scan line SE1. The 2-2nd scan signal SS4*f* may be provided to the second scan line SE1. The second pixel PX2 may be driven in response to the 2-2nd scan signal SS4*f*.

The fifth stage ST1*c* may output the 1-3rd scan signal SS5*f*. The fifth stage ST1*c* may be connected to the fourth scan line SE2. The 1-3rd scan signal SS5*f* may be provided to the fourth scan line SE2. The fourth pixel PX4 may be driven in response to the 1-3rd scan signal SS5*f*.

The sixth stage ST2*c* may output the 2-3rd scan signal SS6*f*. The sixth stage ST2*c* may be connected to the sixth scan line SE3. The 2-3rd scan signal SS6*f* may be provided to the sixth scan line SE3. The sixth pixel PX6 may be driven in response to the 2-3rd scan signal SS6*f*.

According to an embodiment of the present disclosure, active periods of scan signals of scan lines adjacent to each other among the plurality of scan lines SO1 to SO3 and SE1 to SE3 may not overlap each other. The influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

Figure 13H:
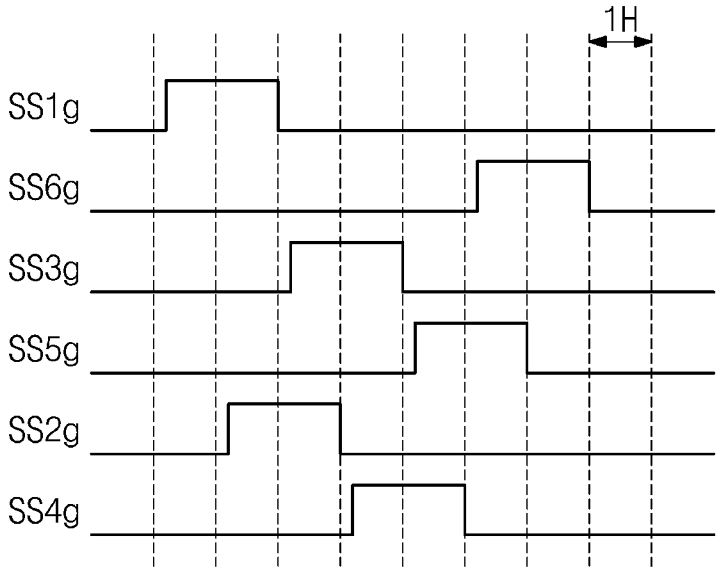

Referring to FIGS. 6A, 12, and 13H, each of the plurality of scan signals SS1*g* to SS6*g* may have a pulse width greater than 1 horizontal period 1H and less than 2 horizontal periods. For example, the pulse width may have 1.8 horizontal periods.

The eighth pattern among the plurality of patterns may be driven in the order of the first pixel PX1, the fifth pixel PX5, the third pixel PX3, the sixth pixel PX6, the fourth pixel PX4, and the second pixel PX2.

The first stage ST1*a* may output the 1-1st scan signal SS1*g*. The first stage ST1*a* may be connected to the first scan line SO1. The 1-1st scan signal SS1*g* may be provided to the first scan line SO1. The first pixel PX1 may be driven in response to the 1-1st scan signal SS1*g*.

The second stage ST2*a* may output the 2-1st scan signal SS2*g*. The second stage ST2*a* may be connected to the fifth scan line SO3. The 2-1st scan signal SS2*g* may be provided to the fifth scan line SO3. The fifth pixel PX5 may be driven in response to the 2-1st scan signal SS2*g*.

The third stage ST1*b* may output the 1-2nd scan signal SS3*g*. The third stage ST1*b* may be connected to the third scan line SO2. The 1-2nd scan signal SS3*g* may be provided to the third scan line SO2. The third pixel PX3 may be driven in response to the 1-2nd scan signal SS3*g*.

The fourth stage ST2*b* may output the 2-2nd scan signal SS4*g*. The fourth stage ST2*b* may be connected to the sixth scan line SE3. The 2-2nd scan signal SS4*g* may be provided to the sixth scan line SE3. The sixth pixel PX6 may be driven in response to the 2-2nd scan signal SS4*g*.

The fifth stage ST1*c* may output the 1-3rd scan signal SS5*g*. The fifth stage ST1*c* may be connected to the fourth scan line SE2. The 1-3rd scan signal SS5*g* may be provided to the fourth scan line SE2. The fourth pixel PX4 may be driven in response to the 1-3rd scan signal SS5*g*.

The sixth stage ST2*c* may output the 2-3rd scan signal SS6*g*. The sixth stage ST2*c* may be connected to the second scan line SE1. The 2-3rd scan signal SS6*g* may be provided to the second scan line SE1. The second pixel PX2 may be driven in response to the 2-3rd scan signal SS6*g*.

According to an embodiment of the present disclosure, active periods of scan signals of scan lines adjacent to each other among the plurality of scan lines SO1 to SO3 and SE1 to SE3 may not overlap each other. This way, the influence of a parasitic capacitor formed between one scan line and another adjacent scan line may be reduced or prevented. The degradation of display quality due to a kickback voltage may be prevented. Accordingly, the display device DD (see FIG. 1) with improved display quality may be provided.

In FIGS. 13A and 13B, the operation of the scan driver SDV-5 together with a connection relationship between the plurality of pixels PX and the plurality of scan lines SO1 to SO3 and SE1 to SE3 in FIG. 6A is described. However, according to an embodiment of the present disclosure, the operation of scan driver SDV-5 is not limited thereto. For example, the operation of the scan driver SDV-5 in FIGS. 13A to 13H may be applied to the connection relationship of the plurality of pixels PX and the plurality of scan lines SO1 to SO3 and SE1 to SE3 in FIGS. 6A and 6B.

FIGS. 14A to 14F are timing diagrams illustrating an operation of a scan driver driven by one pattern among a plurality of patterns, according to an embodiment of the present disclosure.

A plurality of patterns may include a 1-1st pattern, a 2-1st pattern, a 3-1st pattern, a 4-1st pattern, a 5-1st pattern, and a 6-1st pattern that have different driving orders. FIGS. 14A to 14F show that the plurality of patterns include 6 patterns including 1-1st to 6-1st patterns. However, the number of patterns according to an embodiment of the present disclosure is not limited thereto. For example, the number of patterns may be provided in a variety of ways as long as display quality deterioration due to a kickback voltage is capable of being prevented.

Figure 14A:
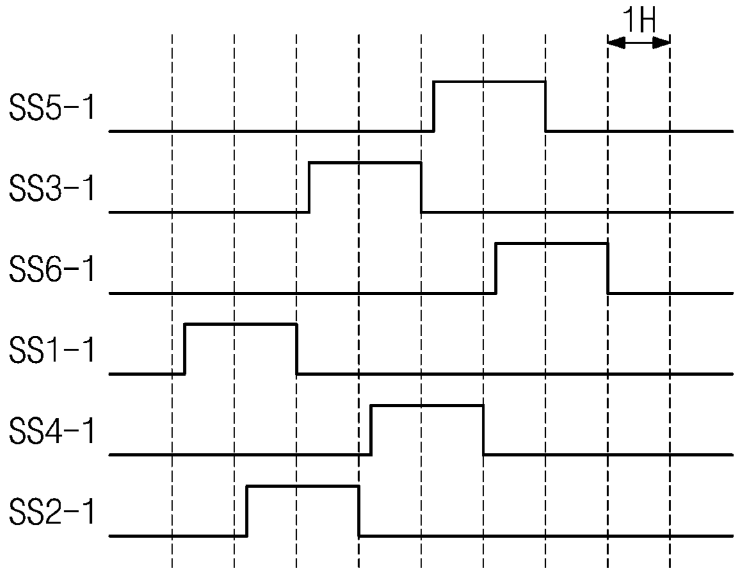
FIGS. 14A to 14F are timing diagrams illustrating an operation of a scan driver driven by one pattern among a plurality of patterns, according to an embodiment of the present disclosure.

Referring to FIGS. 6C, 12, and 14A, each of the plurality of scan signals SS1-1 to SS6-1 may have a pulse width greater than 1 horizontal period 1H and less than 2 horizontal periods. For example, the pulse width may have 1.8 horizontal periods.

The 1-1st pattern among the plurality of patterns may be driven in the order of a fourth pixel PX4-2, a sixth pixel PX6-2, a second pixel PX2-2, a fifth pixel PX5-2, a first pixel PX1-2, and a third pixel PX3-2.

The first stage ST1*a* may output the 1-1st scan signal SS1-1. The first stage ST1*a* may be connected to the fourth scan line SE2-2. The 1-1st scan signal SS1-1 may be provided to the fourth scan line SE2-2. The fourth pixel PX4-2 may be driven in response to the 1-1st scan signal SS1-1.

The second stage ST2*a* may output the 2-1st scan signal SS2-1. The second stage ST2*a* may be connected to the sixth scan line SE3-2. The 2-1st scan signal SS2-1 may be provided to the sixth scan line SE3-2. The sixth pixel PX6-2 may be driven in response to the 2-1st scan signal SS2-1.

The third stage ST1*b* may output the 1-2nd scan signal SS3-1. The third stage ST1*b* may be connected to the second scan line SE1-2. The 1-2nd scan signal SS3-1 may be provided to the second scan line SE1-2. The second pixel PX2-2 may be driven in response to the 1-2nd scan signal SS3-1.

The fourth stage ST2*b* may output the 2-2nd scan signal SS4-1. The fourth stage ST2*b* may be connected to the fifth scan line SO3-2. The 2-2nd scan signal SS4-1 may be provided to the fifth scan line SO3-2. The fifth pixel PX5-2 may be driven in response to the 2-2nd scan signal SS4-1.

The fifth stage ST1*c* may output the 1-3rd scan signal SS5-1. The fifth stage ST1*c* may be connected to the first scan line SO1-2. The 1-3rd scan signal SS5-1 may be provided to the first scan line SO1-2. The first pixel PX1-2 may be driven in response to the 1-3rd scan signal SS5-1.

The sixth stage ST2*c* may output the 2-3rd scan signal SS6-1. The sixth stage ST2*c* may be connected to the third scan line SO2-2. The 2-3rd scan signal SS6-1 may be provided to the third scan line SO2-2. The third pixel PX3-2 may be driven in response to the 2-3rd scan signal SS6-1.

According to an embodiment of the present disclosure, scan lines that receive scan signals with active periods that overlap each other may be spaced from each other by a predetermined distance or more to reduce or remove the influence of the parasitic capacitors CP1 and CP2 (see FIG. 6A). The predetermined interval may be 50 μm. The scan driver SDV-5 may be driven such that a distance between scan lines, of which active periods of scan signals overlap with each other on the same time satisfies the predetermined interval or more. The degradation of display quality due to a kickback voltage may be prevented. Accordingly, the display device DD (see FIG. 1) with improved display quality may be provided.

Figure 14B:
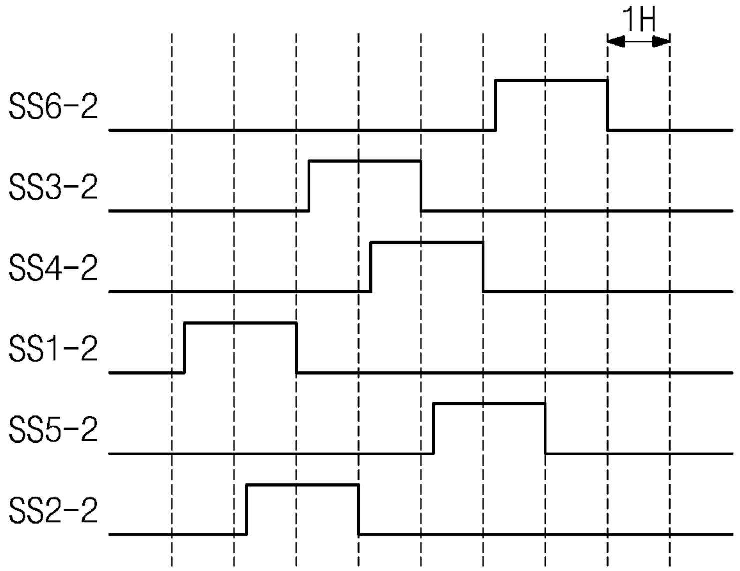

Referring to FIGS. 6C, 12, and 14B, each of the plurality of scan signals SS1-2 to SS6-2 may have a pulse width greater than 1 horizontal period 1H and less than 2 horizontal periods. For example, the pulse width may have 1.8 horizontal periods.

The 2-1st pattern among the plurality of patterns may be driven in the order of the fourth pixel PX4-2, the sixth pixel PX6-2, the second pixel PX2-2, the third pixel PX3-2, the fifth pixel PX5-2, and the first pixel PX1-2.

The first stage ST1*a* may output the 1-1st scan signal SS1-2. The first stage ST1*a* may be connected to the fourth scan line SE2-2. The 1-1st scan signal SS1-2 may be provided to the fourth scan line SE2-2. The fourth pixel PX4-2 may be driven in response to the 1-1st scan signal SS1-2.

The second stage ST2*a* may output the 2-1st scan signal SS2-2. The second stage ST2*a* may be connected to the sixth scan line SE3-2. The 2-1st scan signal SS2-2 may be provided to the sixth scan line SE3-2. The sixth pixel PX6-2 may be driven in response to the 2-1st scan signal SS2-2.

The third stage ST1*b* may output the 1-2nd scan signal SS3-2. The third stage ST1*b* may be connected to the second scan line SE1-2. The 1-2nd scan signal SS3-2 may be provided to the second scan line SE1-2. The second pixel PX2-2 may be driven in response to the 1-2nd scan signal SS3-2.

The fourth stage ST2*b* may output the 2-2nd scan signal SS4-2. The fourth stage ST2*b* may be connected to the third scan line SO2-2. The 2-2nd scan signal SS4-2 may be provided to the third scan line SO2-2. The third pixel PX3-2 may be driven in response to the 2-2nd scan signal SS4-2.

The fifth stage ST1*c* may output the 1-3rd scan signal SS5-2. The fifth stage ST1*c* may be connected to the fifth scan line SO3-2. The 1-3rd scan signal SS5-2 may be provided to the fifth scan line SO3-2. The fifth pixel PX5-2 may be driven in response to the 1-3rd scan signal SS5-2.

The sixth stage ST2*c* may output the 2-3rd scan signal SS6-2. The sixth stage ST2*c* may be connected to the first scan line SO1-2. The 2-3rd scan signal SS6-2 may be provided to the first scan line SO1-2. The first pixel PX1-2 may be driven in response to the 2-3rd scan signal SS6-2.

According to an embodiment of the present disclosure, scan lines that receive scan signals with active periods that overlap each other may be spaced from each other by a predetermined distance or more to reduce or remove the influence of the parasitic capacitors CP1 and CP2 (see FIG. 6A). The predetermined interval may be 50 μm. The scan driver SDV-5 may be driven such that a distance between scan lines that receive scan signals with active periods that overlap with each other satisfies the predetermined minimum interval. The degradation of display quality due to a kickback voltage may be prevented. Accordingly, the display device DD (see FIG. 1) with improved display quality may be provided.

Figure 14C:
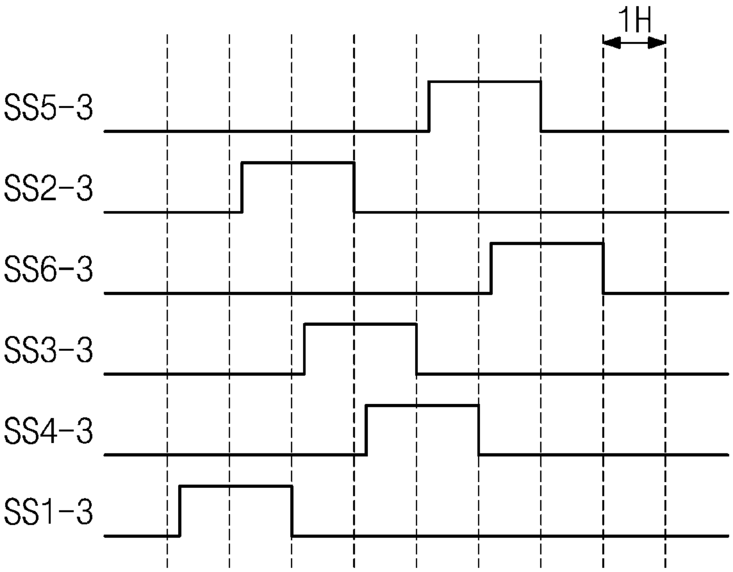

Referring to FIGS. 6C, 12, and 14C, each of the plurality of scan signals SS1-3 to SS6-3 may have a pulse width greater than 1 horizontal period 1H and less than 2 horizontal periods. For example, the pulse width may have 1.8 horizontal periods.

The 3-1st pattern among the plurality of patterns may be driven in the order of the sixth pixel PX6-2, the second pixel PX2-2, the fourth pixel PX4-2, the fifth pixel PX5-2, the first pixel PX1-2, and the third pixel PX3-2.

The first stage ST1*a* may output the 1-1st scan signal SS1-3. The first stage ST1*a* may be connected to the sixth scan line SE3-2. The 1-1st scan signal SS1-3 may be provided to the sixth scan line SE3-2. The sixth pixel PX6-2 may be driven in response to the 1-1st scan signal SS1-3.

The second stage ST2*a* may output the 2-1st scan signal SS2-3. The second stage ST2*a* may be connected to the second scan line SE1-2. The 2-1st scan signal SS2-3 may be provided to the second scan line SE1-2. The second pixel PX2-2 may be driven in response to the 2-1st scan signal SS2-3.

The third stage ST1*b* may output the 1-2nd scan signal SS3-3. The third stage ST1*b* may be connected to the fourth scan line SE2-2. The 1-2nd scan signal SS3-3 may be provided to the fourth scan line SE2-2. The fourth pixel PX4-2 may be driven in response to the 1-2nd scan signal SS3-3.

The fourth stage ST2*b* may output the 2-2nd scan signal SS4-3. The fourth stage ST2*b* may be connected to the fifth scan line SO3-2. The 2-2nd scan signal SS4-3 may be provided to the fifth scan line SO3-2. The fifth pixel PX5-2 may be driven in response to the 2-2nd scan signal SS4-3.

The fifth stage ST1*c* may output the 1-3rd scan signal SS5-3. The fifth stage ST1*c* may be connected to the first scan line SO1-2. The 1-3rd scan signal SS5-3 may be provided to the first scan line SO1-2. The first pixel PX1-2 may be driven in response to the 1-3rd scan signal SS5-3.

The sixth stage ST2*c* may output the 2-3rd scan signal SS6-3. The sixth stage ST2*c* may be connected to the third scan line SO2-2. The 2-3rd scan signal SS6-3 may be provided to the third scan line SO2-2. The third pixel PX3-2 may be driven in response to the 2-3rd scan signal SS6-3.

According to an embodiment of the present disclosure, scan lines that receive scan signals having active periods that overlap each other may be spaced from each other by a predetermined distance or more to reduce or remove the influence of the parasitic capacitors CP1 and CP2 (see FIG. 6A). The predetermined minimum distance may be 50 μm. The scan driver SDV-5 may be driven such that a distance between scan lines that receive scan signals with overlapping active periods satisfies the predetermined minimum interval. The degradation of display quality due to a kickback voltage may be prevented. Accordingly, the display device DD (see FIG. 1) with improved display quality may be provided.

Figure 14D:
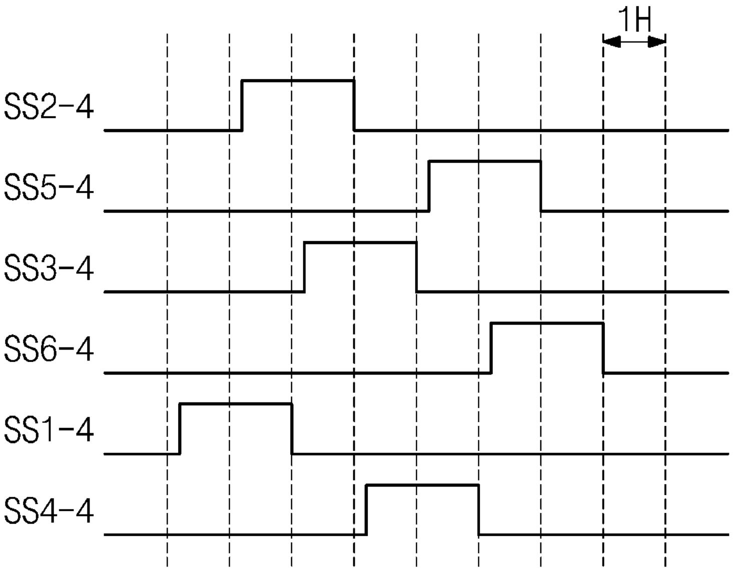

Referring to FIGS. 6C, 12, and 14D, each of the plurality of scan signals SS1-4 to SS6-4 may have a pulse width greater than 1 horizontal period 1H and less than 2 horizontal periods. For example, the pulse width may have 1.8 horizontal periods.

The 4-1st pattern among the plurality of patterns may be driven in the order of the fifth pixel PX5-2, the first pixel PX1-2, the third pixel PX3-2, the sixth pixel PX6-2, the second pixel PX2-2, and the fourth pixel PX4-2.

The first stage ST1*a* may output the 1-1st scan signal SS1-4. The first stage ST1*a* may be connected to the fifth scan line SO3-2. The 1-1st scan signal SS1-4 may be provided to the fifth scan line SO3-2. The fifth pixel PX5-2 may be driven in response to the 1-1st scan signal SS1-4.

The second stage ST2*a* may output the 2-1st scan signal SS2-4. The second stage ST2*a* may be connected to the first scan line SO1-2. The 2-1st scan signal SS2-4 may be provided to the first scan line SO1-2. The first pixel PX1-2 may be driven in response to the 2-1st scan signal SS2-4.

The third stage ST1*b* may output the 1-2nd scan signal SS3-4. The third stage ST1*b* may be connected to the third scan line SO2-2. The 1-2nd scan signal SS3-4 may be provided to the third scan line SO2-2. The third pixel PX3-2 may be driven in response to the 1-2nd scan signal SS3-4.

The fourth stage ST2*b* may output the 2-2nd scan signal SS4-4. The fourth stage ST2*b* may be connected to the sixth scan line SE3-2. The 2-2nd scan signal SS4-4 may be provided to the sixth scan line SE3-2. The sixth pixel PX6-2 may be driven in response to the 2-2nd scan signal SS4-4.

The fifth stage ST1*c* may output the 1-3rd scan signal SS5-4. The fifth stage ST1*c* may be connected to the second scan line SE1-2. The 1-3rd scan signal SS5-4 may be provided to the second scan line SE1-2. The second pixel PX2-2 may be driven in response to the 1-3rd scan signal SS5-4.

The sixth stage ST2*c* may output the 2-3rd scan signal SS6-4. The sixth stage ST2*c* may be connected to the fourth scan line SE2-2. The 2-3rd scan signal SS6-4 may be provided to the fourth scan line SE2-2. The fourth pixel PX4-2 may be driven in response to the 2-3rd scan signal SS6-4.

According to an embodiment of the present disclosure, scan lines that receive scan signals with active periods that overlap each other may be spaced from each other by a predetermined distance or more to reduce or remove the influence of the parasitic capacitors CP1 and CP2 (see FIG. 6A). The predetermined minimum distance may be 50 μm. The scan driver SDV-5 may be driven such that a distance between scan lines that receive scan signals with overlapping active periods satisfies the predetermined minimum distance. The degradation of display quality due to a kickback voltage may be prevented. Accordingly, the display device DD (see FIG. 1) with improved display quality may be provided.

Figure 14E:
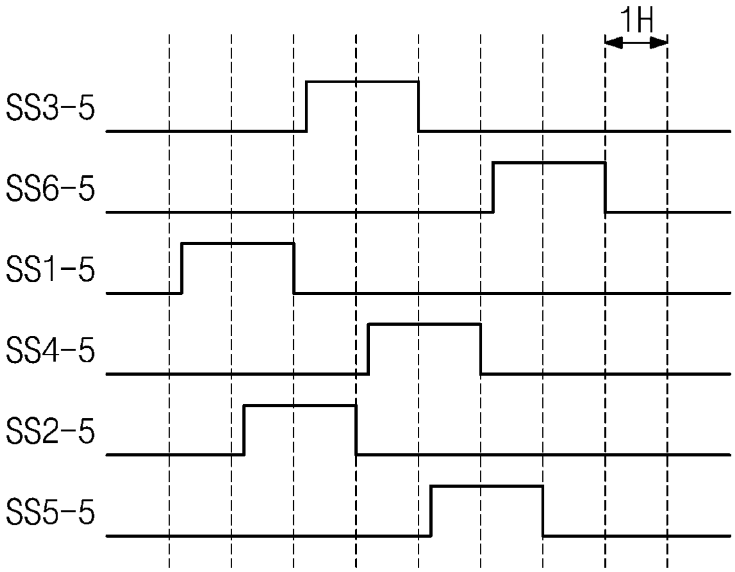

Referring to FIGS. 6C, 12, and 14E, each of the plurality of scan signals SS1-5 to SS6-5 may have a pulse width greater than 1 horizontal period 1H and less than 2 horizontal periods. For example, the pulse width may have 1.8 horizontal periods.

The 5-1st pattern among the plurality of patterns may be driven in the order of the third pixel PX3-2, the fifth pixel PX5-2, the first pixel PX1-2, the fourth pixel PX4-2, the sixth pixel PX6-2, and the second pixel PX2-2.

The first stage ST1*a* may output the 1-1st scan signal SS1-5. The first stage ST1*a* may be connected to the third scan line SO2-2. The 1-1st scan signal SS1-5 may be provided to the third scan line SO2-2. The third pixel PX3-2 may be driven in response to the 1-1st scan signal SS1-5.

The second stage ST2*a* may output the 2-1st scan signal SS2-5. The second stage ST2*a* may be connected to the fifth scan line SO3-2. The 2-1st scan signal SS2-5 may be provided to the fifth scan line SO3-2. The fifth pixel PX5-2 may be driven in response to the 2-1st scan signal SS2-5.

The third stage ST1*b* may output the 1-2nd scan signal SS3-5. The third stage ST1*b* may be connected to the first scan line SO1-2. The 1-2nd scan signal SS3-5 may be provided to the first scan line SO1-2. The first pixel PX1-2 may be driven in response to the 1-2nd scan signal SS3-5.

The fourth stage ST2*b* may output the 2-2nd scan signal SS4-5. The fourth stage ST2*b* may be connected to the fourth scan line SE2-2. The 2-2nd scan signal SS4-5 may be provided to the fourth scan line SE2-2. The fourth pixel PX4-2 may be driven in response to the 2-2nd scan signal SS4-5.

The fifth stage ST1*c* may output the 1-3rd scan signal SS5-5. The fifth stage ST1*c* may be connected to the sixth scan line SE3-2. The 1-3rd scan signal SS5-5 may be provided to the sixth scan line SE3-2. The sixth pixel PX6-2 may be driven in response to the 1-3rd scan signal SS5-5.

The sixth stage ST2*c* may output the 2-3rd scan signal SS6-5. The sixth stage ST2*c* may be connected to the second scan line SE1-2. The 2-3rd scan signal SS6-5 may be provided to the second scan line SE1-2. The second pixel PX2-2 may be driven in response to the 2-3rd scan signal SS6-5.

According to an embodiment of the present disclosure, scan lines that receive scan signals with active periods that overlap each other may be spaced from each other by a predetermined minimum distance to reduce or remove the influence of the parasitic capacitors CP1 and CP2 (see FIG. 6A). The predetermined minimum distance may be 50 μm. The scan driver SDV-5 may be driven such that a distance between scan lines that receive scan signals with overlapping active periods satisfies the predetermined minimum distance. The degradation of display quality due to a kickback voltage may be prevented. Accordingly, the display device DD (see FIG. 1) with improved display quality may be provided.

Figure 14F:
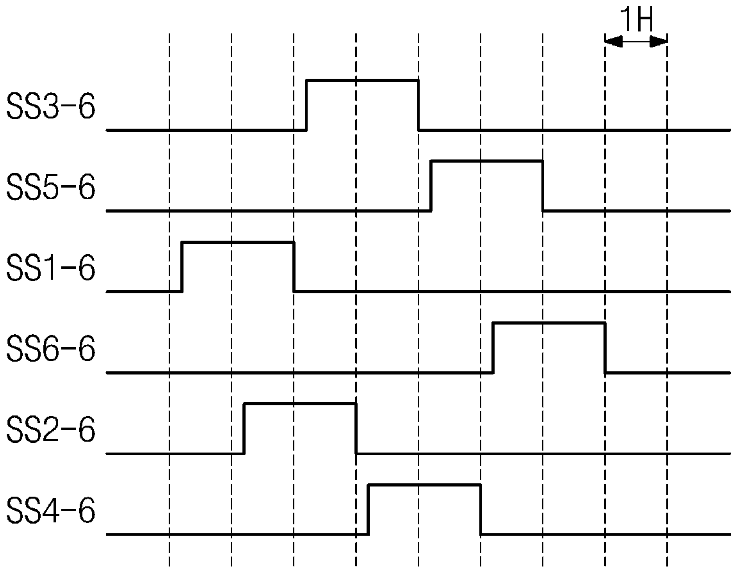

Referring to FIGS. 6C, 12, and 14F, each of the plurality of scan signals SS1-6 to SS6-6 may have a pulse width greater than 1 horizontal period 1H and less than 2 horizontal periods. For example, the pulse width may have 1.8 horizontal periods.

The 6-1st pattern among the plurality of patterns may be driven in the order of the third pixel PX3-2, the fifth pixel PX5-2, the first pixel PX1-2, the sixth pixel PX6-2, the second pixel PX2-2, and the fourth pixel PX4-2.

The first stage ST1*a* may output the 1-1st scan signal SS1-6. The first stage ST1*a* may be connected to the third scan line SO2-2. The 1-1st scan signal SS1-6 may be provided to the third scan line SO2-2. The third pixel PX3-2 may be driven in response to the 1-1st scan signal SS1-6.

The second stage ST2*a* may output the 2-1st scan signal SS2-6. The second stage ST2*a* may be connected to the fifth scan line SO3-2. The 2-1st scan signal SS2-6 may be provided to the fifth scan line SO3-2. The fifth pixel PX5-2 may be driven in response to the 2-1st scan signal SS2-6.

The third stage ST1*b* may output the 1-2nd scan signal SS3-6. The third stage ST1*b* may be connected to the first scan line SO1-2. The 1-2nd scan signal SS3-6 may be provided to the first scan line SO1-2. The first pixel PX1-2 may be driven in response to the 1-2nd scan signal SS3-6.

The fourth stage ST2*b* may output the 2-2nd scan signal SS4-6. The fourth stage ST2*b* may be connected to the sixth scan line SE3-2. The 2-2nd scan signal SS4-6 may be provided to the sixth scan line SE3-2. The sixth pixel PX6-2 may be driven in response to the 2-2nd scan signal SS4-6.

The fifth stage ST1*c* may output the 1-3rd scan signal SS5-6. The fifth stage ST1*c* may be connected to the second scan line SE1-2. The 1-3rd scan signal SS5-6 may be provided to the second scan line SE1-2. The second pixel PX2-2 may be driven in response to the 1-3rd scan signal SS5-6.

The sixth stage ST2*c* may output the 2-3rd scan signal SS6-6. The sixth stage ST2*c* may be connected to the fourth scan line SE2-2. The 2-3rd scan signal SS6-6 may be provided to the fourth scan line SE2-2. The fourth pixel PX4-2 may be driven in response to the 2-3rd scan signal SS6-6.

According to an embodiment of the present disclosure, scan lines that receive scan signals with overlapping active periods may be spaced from each other by a predetermined minimum distance to reduce or remove the influence of the parasitic capacitors CP1 and CP2 (see FIG. 6A). The predetermined distance may be 50 μm. The scan driver SDV-5 may be driven such that a distance between scan lines that receive scan signals with overlapping active periods satisfies the predetermined minimum distance. The degradation of display quality due to a kickback voltage may be prevented.

Accordingly, the display device DD (see FIG. 1) with improved display quality may be provided.

In FIGS. 14A and 14B, the operation of the scan driver SDV-5 together with a connection relationship between the plurality of pixels PX and the plurality of scan lines SO1-2 to SO3-2 and SE1-2 to SE3-2 in FIG. 6C is described. However, according to an embodiment of the present disclosure, the operation of scan driver SDV-5 is not limited thereto. For example, the operation of the scan driver SDV-5 in FIGS. 14A and 14B may be applied to the connection relationship of the plurality of pixels PX and the plurality of scan lines SO1-2 to SO3-2 and SE1-2 to SE3-2 in FIGS. 6C and 6D.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, one data line may be electrically connected to two adjacent pixels in each of a plurality of pixel rows. As compared to a case where one data line is electrically connected to one pixel in each of a plurality of pixel rows, the number of data lines output from a data driver may be relatively small. The number of data lines connected to the data driver may be reduced. As a result, the size of the data driver may be reduced. Accordingly, the area size of the peripheral area of the display device may be reduced.

Moreover, as described above, active periods of scan signals of scan lines adjacent to each other among a plurality of scan lines may not overlap each other. This way, the influence of a parasitic capacitor formed between one scan line and another adjacent scan line may be reduced or prevented. The degradation of display quality due to a kickback voltage may be prevented. Accordingly, a display device having improved display quality may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a display panel including a plurality of pixels, a plurality of scan lines, and a scan driver, wherein the plurality of pixels includes:

a first pixel, a second pixel, a third pixel, and a fourth pixel spaced apart from one another and arranged in a matrix configuration;

wherein the plurality of scan lines includes:

a first scan line including a first main line extending in a first direction, and a first branch line electrically connected to the first main line and the first pixel and extending in a second direction crossing the first direction;

a second scan line including a second main line spaced from the first scan line in the second direction and extending in the first direction, and a second branch line electrically connected to the second main line and the second pixel and extending in the second direction;

a third scan line including a third main line spaced from the second scan line in the second direction and extending in the first direction, and a third branch line electrically connected to the third main line and extending in the second direction;

a fourth scan line including a fourth main line spaced from the third scan line in the second direction and extending in the first direction, and a fourth branch line electrically connected to the fourth main line and extending in the second direction, wherein the scan driver includes a plurality of stages that are respectively connected to the plurality of scan lines and outputs a plurality of scan signals, and the plurality of scan lines are arranged in the order of the first scan line, the second scan line, the third scan line, and the fourth scan line along the second direction, wherein scan lines that are positioned adjacent to each other among the plurality of scan lines receive scan signals of active period at mutually exclusive times, wherein odd-numbered stages among the plurality of stages are defined as a first stage group, wherein even-numbered stages among the plurality of stages are defined as a second stage group, wherein the plurality of scan signals includes a plurality of first scan signals output from the first stage group, and a plurality of second scan signals output from the second stage group, and wherein the plurality of first scan signals and the plurality of second scan signals are alternately output, respectively, wherein a 1-1st scan signal having a first active period among the plurality of first scan signals is applied to the first scan line, wherein a 2-1st scan signal having a second active period among the plurality of second scan signals is applied to the second scan line, wherein a 1-2nd scan signal having a third active period among the plurality of first scan signals is applied to the third scan line, and wherein the plurality of scan signals are output in an order of the 2-1st scan signal, the 1-1st scan signal, and the 1-2nd scan signal.

2. The electronic device of claim 1, further comprising:

a data line extending in the second direction, wherein the data line is electrically connected to the first pixel, the second pixel, the third pixel, and the fourth pixel.

3. The electronic device of claim 1, wherein the third branch line is electrically connected to the fourth pixel, and wherein the fourth branch line is electrically connected to the third pixel.

4. The electronic device of claim 1, wherein the third branch line is electrically connected to the third pixel, and wherein the fourth branch line is electrically connected to the fourth pixel.

5. The electronic device of claim 1, wherein each of the plurality of scan signals has a pulse width greater than 1 horizontal period.

6. The electronic device of claim 5, wherein the scan driver further includes at least one dummy stage, and wherein the at least one dummy stage outputs a dummy scan signal to a next dummy stage or a stage.

7. The electronic device of claim 6, wherein the first active period, the second active period, and the third active period are mutually exclusive time periods.

8. The electronic device of claim 7, wherein the at least one dummy stage is connected to a first odd-numbered stage among the odd-numbered stages.

* * * * *